United States Patent
Satoyama et al.

(10) Patent No.: US 9,075,534 B2
(45) Date of Patent: Jul. 7, 2015

(54) COMPUTER SYSTEM AND ITS DATA CONTROL METHOD

(71) Applicants: Ai Satoyama, Sagamihara (JP);
Yoshiaki Eguchi, Yokohama (JP)

(72) Inventors: Ai Satoyama, Sagamihara (JP);
Yoshiaki Eguchi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 74 days.

(21) Appl. No.: 13/793,178

(22) Filed: Mar. 11, 2013

(65) Prior Publication Data
US 2013/0262803 A1 Oct. 3, 2013

Related U.S. Application Data

(63) Continuation of application No. 12/527,409, filed as application No. PCT/JP2009/059924 on May 25, 2009, now Pat. No. 8,396,835.

(51) Int. Cl.
*G06F 7/00* (2006.01)
*G06F 3/06* (2006.01)

(52) U.S. Cl.
CPC ............ *G06F 3/0647* (2013.01); *G06F 3/0608* (2013.01); *G06F 3/065* (2013.01); *G06F 3/067* (2013.01)

(58) Field of Classification Search
CPC .............. G06F 3/0641; G06F 11/1453; G06F 17/3015; G06F 17/30156; G06F 17/30489; G06F 11/1448; G06F 11/1458; G06F 11/1469; G06F 17/30073; G06F 17/30076; G06F 17/30123

USPC ............................ 707/640, 649, 693, 999.101
See application file for complete search history.

(56) References Cited

U.S. PATENT DOCUMENTS

| | | | |
|---|---|---|---|
| 5,212,784 A | 5/1993 | Sparks | |
| 5,305,384 A * | 4/1994 | Ashby et al. | 380/29 |
| 5,659,614 A * | 8/1997 | Bailey, III | 713/165 |
| 7,111,136 B2 | 9/2006 | Yamagami | |
| 7,219,144 B2 * | 5/2007 | Matsuki et al. | 709/223 |
| 7,222,233 B1 * | 5/2007 | Rubin | 713/168 |
| 7,243,197 B2 | 7/2007 | Yamagami | |
| 7,594,051 B2 | 9/2009 | Abe | |
| 7,725,765 B2 | 5/2010 | Arakawa et al. | |
| 7,747,799 B2 * | 6/2010 | Nakagawa et al. | 710/68 |
| 7,934,066 B2 * | 4/2011 | Mu et al. | 711/162 |
| 7,991,783 B2 | 8/2011 | Flynn et al. | |
| 8,037,027 B2 | 10/2011 | Satoyama | |

(Continued)

FOREIGN PATENT DOCUMENTS

| | | |
|---|---|---|
| EP | 1 785 833 A2 | 5/2007 |
| EP | 1 818 798 A2 | 8/2007 |

(Continued)

*Primary Examiner* — Mohammed R Uddin
(74) *Attorney, Agent, or Firm* — Foley & Lardner LLP

(57) ABSTRACT

Provided are a computer system and its data control method that enable safe backup of data and reduction in the capacity of data to be backed up. A control processor refers to a differential and, if a differential bit is "0," encrypts data of an online VOL with an encryption circuit by using key information, and transfers the encrypted data to a second storage system. If the differential bit is "1," the control processor performs redundancy elimination processing to journal data, thereafter compresses the journal data with a compression circuit, encrypts the compressed journal data with an encryption circuit according to the key information, and transfers the journal data that was encrypted after compression to the second storage system.

8 Claims, 54 Drawing Sheets

(56) References Cited

U.S. PATENT DOCUMENTS

| | | | |
|---|---|---|---|
| 8,554,743 B2 * | 10/2013 | Tevis et al. | 707/692 |
| 2003/0177422 A1 | 9/2003 | Tararoukhine et al. | |
| 2004/0049700 A1 | 3/2004 | Yoshida | |
| 2005/0131990 A1 | 6/2005 | Jewell | |
| 2005/0177603 A1 | 8/2005 | Shavit | |
| 2006/0173848 A1 * | 8/2006 | Peterson et al. | 707/9 |
| 2006/0206542 A1 | 9/2006 | Wolfgang et al. | |
| 2007/0043944 A1 | 2/2007 | Okamoto | |
| 2007/0067586 A1 | 3/2007 | Mikami | |
| 2007/0113025 A1 * | 5/2007 | Ozaki et al. | 711/154 |
| 2007/0174536 A1 | 7/2007 | Nakagawa et al. | |
| 2007/0174669 A1 | 7/2007 | Ebata et al. | |
| 2007/0277012 A1 | 11/2007 | Hara et al. | |
| 2008/0016303 A1 | 1/2008 | Okumoto et al. | |
| 2008/0082593 A1 * | 4/2008 | Komarov et al. | 707/204 |
| 2008/0109448 A1 * | 5/2008 | Aboel-Nil et al. | 707/10 |
| 2008/0133828 A1 | 6/2008 | Saito | |
| 2008/0229118 A1 | 9/2008 | Kasako et al. | |
| 2008/0313371 A1 | 12/2008 | Kedem et al. | |
| 2009/0183002 A1 | 7/2009 | Rohrer et al. | |

FOREIGN PATENT DOCUMENTS

| | | |
|---|---|---|
| JP | 2005-018738 A | 1/2005 |
| JP | 2006-260563 A | 9/2006 |
| JP | 2007-018401 A | 1/2007 |
| JP | 2007-080131 A | 3/2007 |
| JP | 2007-133471 A | 5/2007 |
| JP | 2007-199891 A | 8/2007 |
| JP | 2007-317186 A | 12/2007 |
| JP | 2008-140002 A | 6/2008 |

* cited by examiner

FIG.4D

| P-VOL# ,461 | SNAPSHOT ACQUIRED TIME ,462 | BACKUP ACQUIRED TIME ,463 | 224 |
|---|---|---|---|
|  |  |  |  |

FIG.4E

| P-VOL# ,471 | P-VOL STORING APPARATUS NUMBER ,472 | REPLICATED P-VOL # ,473 | REPLICATED P-VOL CREATED TIME ,474 | JNL-VOL# ,475 | REPLICATED P-VOL/JOURNAL PAIR NUMBER ,476 | 225 |
|---|---|---|---|---|---|---|
|  |  |  |  |  |  |  |

FIG. 5

| P-VOL# | P-VOL STORING APPARATUS NUMBER | GENERATION NUMBER | JOURNAL STORING EXTERNAL APPARATUS NUMBER | EXTERNAL GENERATION NUMBER | REPLICATED P-VOL # | EXTERNAL JOURNAL VOL # | BACKUP ACQUIRED TIME |
|---|---|---|---|---|---|---|---|
| 501 | 502 | 503 | 504 | 505 | 506 | 507 | 508 |
| | | | | | | | |

FIG.6

| 521 | 522 | 523　226 | 524 |
|---|---|---|---|
| P-VOL# | P-VOL STORING APPARATUS NUMBER | HOST INFORMATION (APP) | ENCRYPTION KEY |
|  |  |  |  |

FIG.21
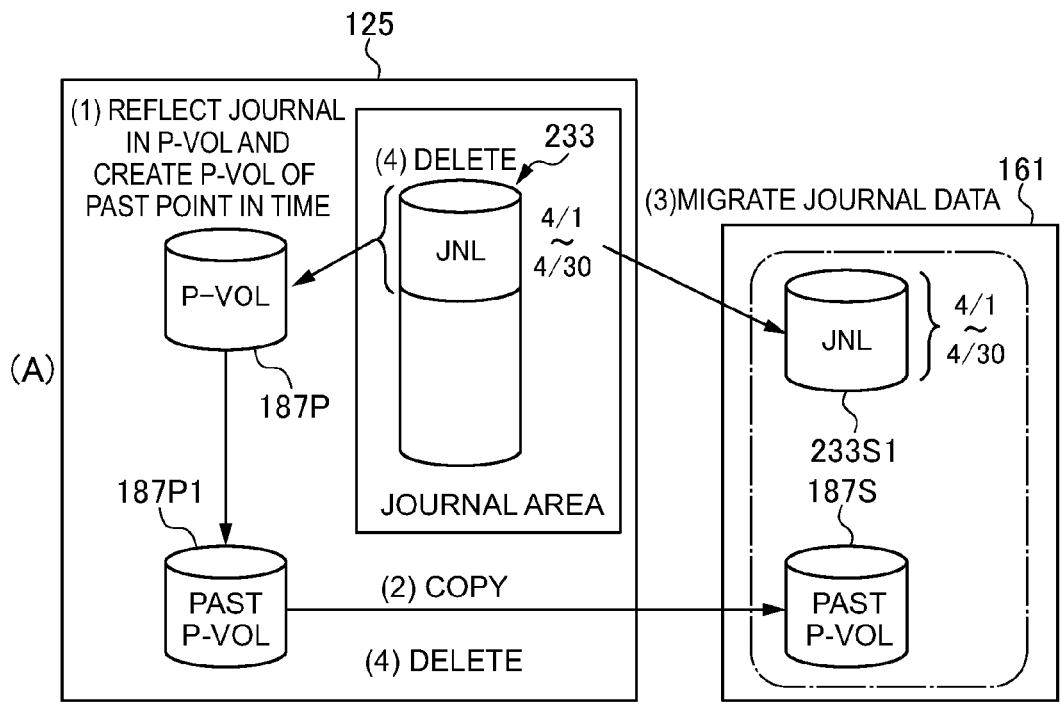
(A)
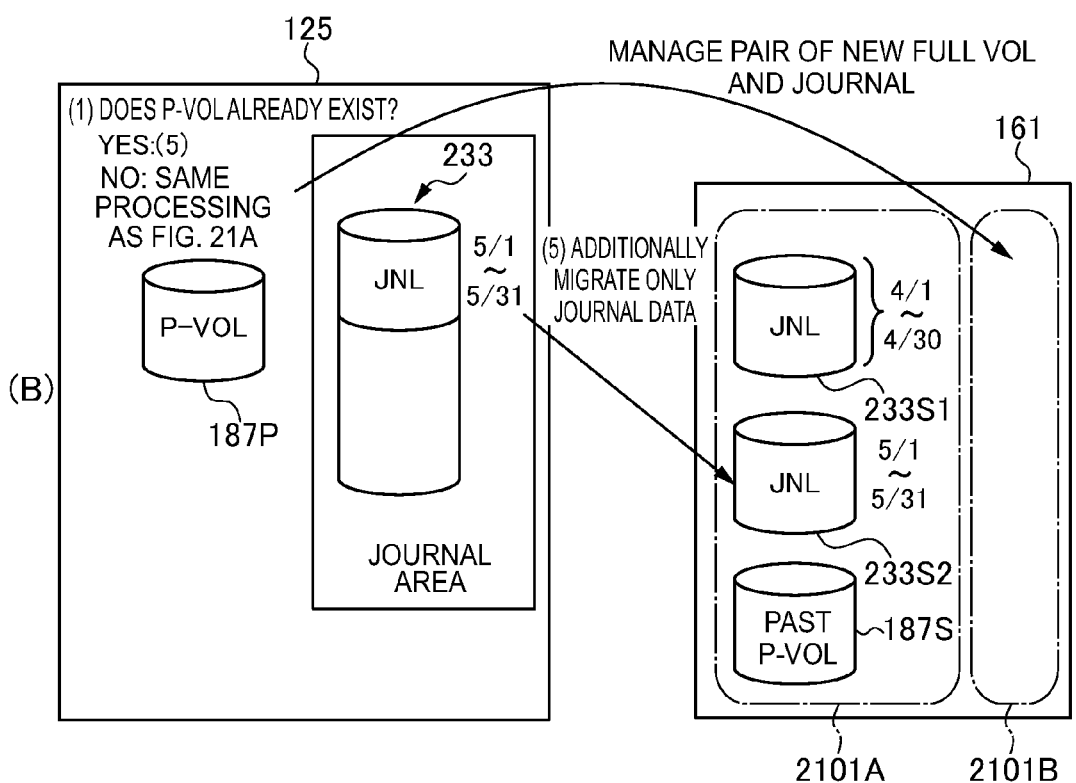
(B)

FIG.50

| PAGE # | ADDRESS # |
|--------|-----------|
| 0 | × × × |
| 1 | |

571, 227, 572

COMPUTER SYSTEM AND ITS DATA CONTROL METHOD

CROSS-REFERENCE TO RELATED PATENT APPLICATIONS

This application is a Continuation of U.S. application Ser. No. 12/527,409 (National Stage of PCT/JP2009/059924), filed Aug. 14, 2009, incorporated herein by reference in its entirety.

TECHNICAL FIELD

The present invention relates to data management technology in a computer system configuring a storage system.

BACKGROUND ART

As functions loaded in a computer system configuring a storage system, for instance, a snapshot function and a journal function are known.

A snapshot function is a function for retaining an image of a certain logical volume at a certain point in time; for instance, at the time that a snapshot acquisition request is received from a host. As a result of periodically executing the snapshot function, a replication (i.e., backup) of data in the logical volume can be intermittently acquired. Moreover, the snapshot function can be used to restore a logical volume of the point in time that the snapshot was acquired.

A journal function is a function of creating, upon writing write data into a logical volume that is designated in a write command from a host computer, data (journal) containing such write data and control information concerning the writing of such write data, and storing the created journal.

Patent Document 1 discloses recovery processing to be executed at a point in time other than the point in time that a snapshot was created by writing write data in a journal into the snapshot that was acquired with the snapshot function. In Patent Document 1, by giving consideration to the fact that the journal volume will become full if the acquisition of journals is repeated and subsequent data recovery will become impossible, if the unused amount of the journal volume falls below a threshold limit, the snapshot is updated by applying a journal entry to the snapshot so as to increase the unused capacity in the journal volume.

Patent Document 2 discloses the switching of a snapshot and a journal. In Patent Document 2, if it becomes difficult to secure the time length for backup, the mode is switched from a snapshot mode to a journal mode for effectively performing backup and restoration.

Patent Document 3 discloses the operation of a snapshot restoration volume. In Patent Document 3, during the restoration processing, since only update differential data is copied from the differential volume to the operation volume, it is possible to reduce the amount of data to be transferred, and consequently reduce the load of the storage apparatus during the restoration processing.

RELATED ART DOCUMENTS

[Patent Document 1]
Japanese Patent Laid-Open Publication No. 2005-18738
[Patent Document 2]
Japanese Patent Laid-Open Publication No. 2007-80131
[Patent Document 3]
Japanese Patent Laid-Open Publication No. 2007-133471

DISCLOSURE OF THE INVENTION

Nevertheless, with foregoing Patent Documents 1, 2, and 3, no consideration is given to reducing the data amount upon storing data. Specifically, upon storing data; for instance, upon storing data that was acquired with the snapshot function, when the generations of backup to be stored increase, the data amount to be stored will also increase, and the disk device capacity of the storage system will become insufficient. In the foregoing case, it is possible to store data in a compressed state.

Moreover, if data is to be encrypted in consideration of data safety, and data is encrypted and then subsequently compressed, it is not possible to efficiently compress the data, and there is a problem in that it will be difficult to reduce the capacity of the data to be backed up.

The present invention was devised in view of the foregoing problems encountered in the conventional technology. Thus, an object of this invention is to provide a computer system and its data control method capable of reducing the capacity of data that is to be stored upon being encrypted and then subsequently compressed.

In order to achieve the foregoing the object, the present invention is characterized in compressing and then subsequently encrypting backup data upon migrating such backup data to a backup destination with a first storage system.

According to the present invention, it is possible to safely back up data and reduce the capacity of data to be backed up.

BRIEF DESCRIPTION OF THE DRAWINGS

FIG. 4D is an explanatory diagram of a journal information table according to the first embodiment of the present invention;

FIG. 4E is an explanatory diagram of a P-VOL/journal pair information table according to the first embodiment of the present invention;

FIG. 5 is an explanatory diagram showing a format of a catalog management information table according to the first embodiment of the present invention;

FIG. 6 is an explanatory diagram showing a format of an encryption key management information table according to the first embodiment of the present invention;

FIG. 21 is an explanatory diagram showing a specific example of processing for migrating data to an external storage system to be executed according to the first embodiment of the present invention;

FIG. 50 is an explanatory diagram showing the format of a P-VOL management information table.

BEST MODE FOR CARRYING OUT THE INVENTION

Figure 1:
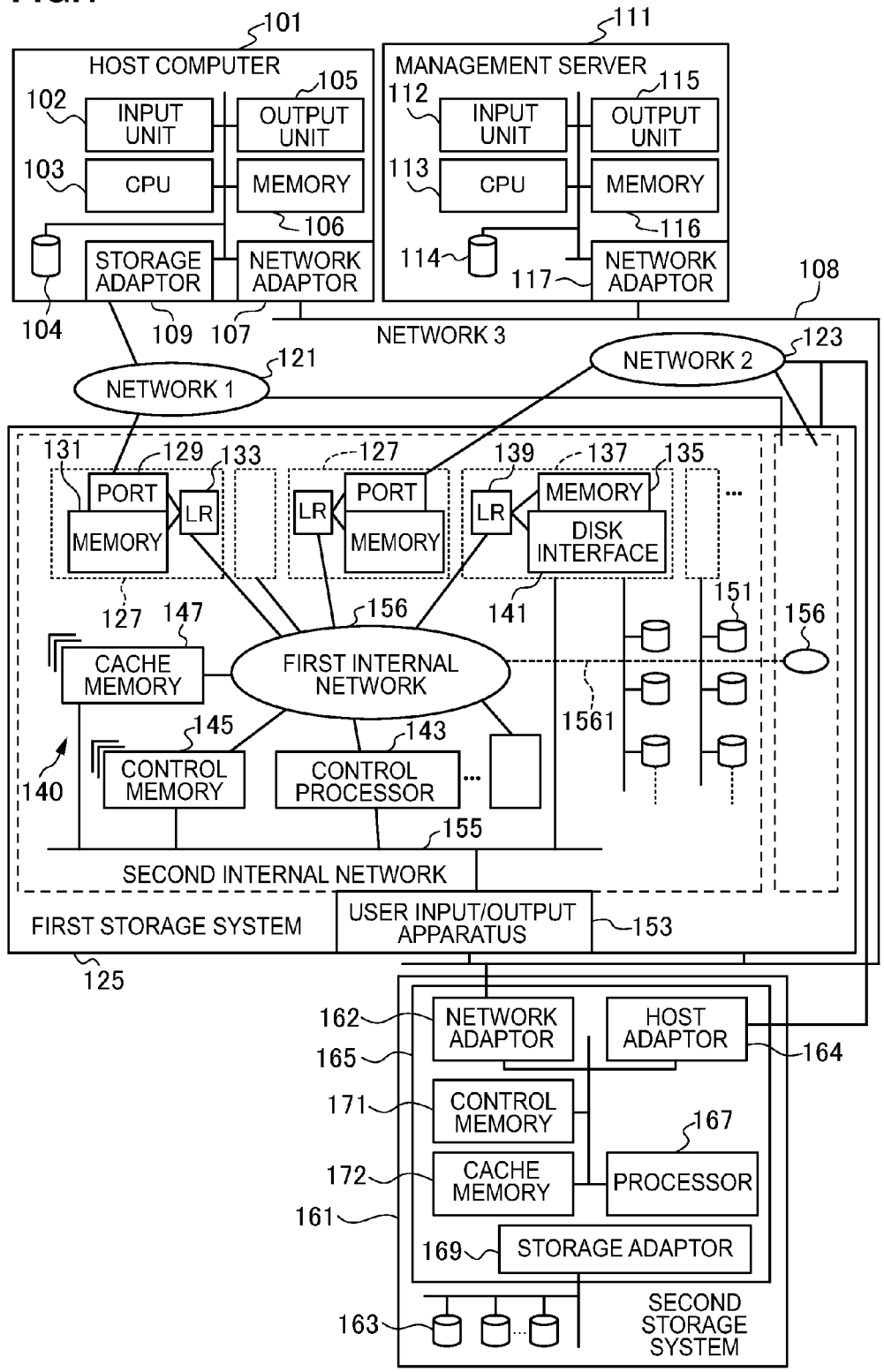
FIG. 1 is a block diagram showing the configuration of a computer system according to the present invention.

In this embodiment, backup data is compressed and then encrypted upon migrating such backup data to a backup destination with a first storage system.

The computer system of this embodiment comprises one or more host computers 101, a management server 111, a first storage system 125, and a second storage system 161. The first storage system 125 is connected to the host computer 101 via a first network 121. The second storage system 161 is connected to the first storage system 125 via a second network 123. The one or more host computers 101, the management server 111, the first storage system 125, and the second storage system 161 are mutually connected via a third network 108.

The first network 121, the second network 123, and the third network 108 may be any kind of network. For instance, the first network 121 and the second network 123 may be a so-called SAN (Storage Area Network), and the third network 108 may be a so-called LAN (Local Area Network).

The host computer 101 is a computer for accessing a logical volume that is provided by the storage system 125. The host computer 101 comprises a CPU (Central Processing Unit) 103, a memory 106, an auxiliary storage device 104, an input unit (for instance, a keyboard and a pointing device) 102, an output unit (for instance, a display device) 105, a storage adapter (for instance, a host bus adapter) 109 that is connected to the first network 121, and a network adapter 107 that is connected to the third network 108.

The memory 106 stores programs to be executed by the CPU 103. The memory 106 of this embodiment stores at least an application program (AP) 601 and a storage system agent program 602.

The CPU 103 to execute the programs stored in the memory 106 sends, as needed, an I/O command (write command or read command) designating an address via the storage adapter 109.

The management server 111 is a computer for managing the host computer 101, the first storage system 125, and the second storage system 161 that are connected to the third network 108. The management server 111 comprises a CPU 113, a memory 116, an auxiliary storage device 114, an input unit (for instance, a keyboard and a pointing device) 112, an output unit (for instance, a display device) 115, and a network adapter 117 that is connected to the third network 108.

The CPU 113 sends, via the network adapter 117, commands to the host computer 101, the first storage system 125 or the second storage system 161 that is connected to the third network 108. The memory 116 is a memory for storing the computer programs and information shown in FIG. 3.

The first storage system 125 comprises a plurality of controllers 140 and a storage device group. Each controller 140 as the first controller comprises, for example, a plurality of front-end interfaces 127, a plurality of back-end interfaces 137, a first internal network 156, one or more cache memories 147, one or more control memories 145, and one or more control processors 143. The storage device group is configured from a plurality of physical storage devices (hereinafter referred to as "PDEVs") 151. Each controller 140 is connected to another controller 140 via a path (or a switch or a network) 1561. The control processor 143 of each controller 140 is able to read and write data in the cache memory 147 of a self-controller 140 or in the cache memory 147 of another controller 140.

The front-end interface 127 is an interface circuit for communicating with the host computer 101 or the second storage system 161 that is connected to the storage system 125 via a network. Accordingly, the storage system 125 comprises at least two front-end interfaces 127, and one front-end interface 127 is connected to the first network 121, and the other front-end interface 127 is connected to the second network 123.

The front-end interface 127 comprises, for example, a port 129 that is connected to the first network 121 or the second network 123, a memory 131, and a local router (hereinafter abbreviated as "LR") 133. The port 129 and the memory 131 are connected to the LR 133.

The LR 133 distributes the data that was received via the port 129 for processing with an arbitrary control processor 143. Specifically, for instance, the control processor 143 sets the LR 133 so as to cause that control processor 143 to execute an I/O command designating a certain address. In accordance with such setting, the LR 133 distributes the I/O command and data.

Moreover, the LR 133 comprises an encryption circuit 1331 for encrypting data, a decryption circuit 1332 for decrypting the encrypted data, a compression circuit 1333 for compressing data, and a decompression circuit 1334 for decompressing the compressed data.

The back-end interface 137 is an interface circuit for communicating with the PDEV 151. The back-end interface 137 comprises, for example, a disk device interface 141 that is connected to the PDEV 151, a memory 135, and an LR 139. The disk device interface 141 and the memory 135 are connected to the LR 139.

The first internal network 156 is configured, for instance, from a switch (for instance, a cross-bar switch) or a bus. Connected to the first internal network 156 are a plurality of front-end interfaces 127, a plurality of back-end interfaces 137, one or more cache memories 147, one or more control memories 145, and one or more control processors 143. Communication between these elements is conducted via the first internal network 156.

The cache memory 147 is a memory for temporarily storing data to be read or written according to an I/O command from the host computer 101.

The control memory 145 is a memory for storing various types of computer programs and information. Details concerning the computer programs and information that are stored in the control memory 145 will be explained later (refer to FIG. 2, etc.).

The control processor 143 is a processor for realizing the control to be performed by the controller. Specifically, the control processor 143 performs the processing described later by executing the various types of computer programs that are stored in the control memory 145.

The PDEV 151 is a nonvolatile storage device and, for instance, is configured from a hard disk device (HDD) or a flash memory device (FM). A RAID (Redundant Array of Independent Disks) group as a PDEV group that follows the RAID rules may also be configured from two or more PDEVs 151.

A second internal network (for instance, a LAN) 155 is connected to the front-end interface 127, the back-end interface 137, the cache memory 147, the control memory 145, and the control processor 143 as the constituent elements of a controller, and a user input/output apparatus 153 is connected to the second internal network 155. The user input/output apparatus 153 is also connected to the third network 108, and is a computer for maintaining or managing the storage system 125. A maintenance worker of the storage system 125 may, for example, operate the user input/output apparatus 153 (or the management server 111 that is communicable with the user input/output apparatus 153) and define the various types of information stored in the control memory 145.

The second storage system 161 comprises a controller 165 and a PDEV 163. The controller 165 as the second controller comprises, for example, a network adapter 162, a host adapter 164, a cache memory 172, a control memory 171, a processor 167, and a storage adapter 169.

The network adapter 162 is an interface that is connected to the third network 108 and is used for communicating with the management server 111.

The host adapter 164 is an interface that is connected to the second network 123 and is used for communicating with the first storage system 125. The host adapter 164 may also be configured the same as the front-end interface 127 of the first storage system 125.

The control memory 171 is a memory for storing various types of computer programs and information.

The cache memory 172 is a memory for temporarily storing data that is read or written according to an I/O command from the first storage system 125.

The processor 167 executes the various types of computer programs that are stored in the control memory 171. In the least, the processor 167 controls the reading and writing of data from and into the cache memory 172 and the PDEV 163 according to an I/O command from the first storage system 125.

The PDEV 163 is a physical storage device and, for instance, may be configured the same as the PDEV 151 of the first storage system, or the PDEV may also be a tape storage medium.

The first storage system 125 of this embodiment comprises a so-called external connection function. The second storage system 161 is externally connected to the first storage system 125 according to the foregoing function. The foregoing external connection is explained below.

As described above, the first storage system 125 provides one or more logical volumes to the host computer 101. Each logical volume is recognized as one storage device by the host computer 101. For example, a logical volume provided by the first storage system 125 may be associated with the PDEV 151 in the first storage system 125. Here, if the first storage system 125 receives a write command for writing data into the logical volume, it stores data in the PDEV 151 associated with that logical volume. This kind of logical volume is also referred to as a normal volume in the following explanation.

A logical volume provided by the first storage system 125 may also be associated with the PDEV 163 in the second storage system 161. Here, if first storage system 125 receives a write command for writing data into the logical volume, it creates a write command for writing data into the PDEV 163 that is associated with that logical volume, and sends the created write command to the second storage system 161. The second storage system 161 stores data in the PDEV 163 according to the write command received from the first storage system 125. This kind of logical volume is also referred to as a virtual volume in the following explanation.

Thus, the function of storing data, which is stored in a logical volume provided by the first storage system 125, in the second storage system 161 that is actually connected outside of the first storage system 125 is referred to as the external connection function.

Incidentally, in the following explanation, a storage system that is externally connected using the foregoing external connection function is also referred to as an external storage system. In the first embodiment, the second storage system 161 is the external storage system.

Figure 2:
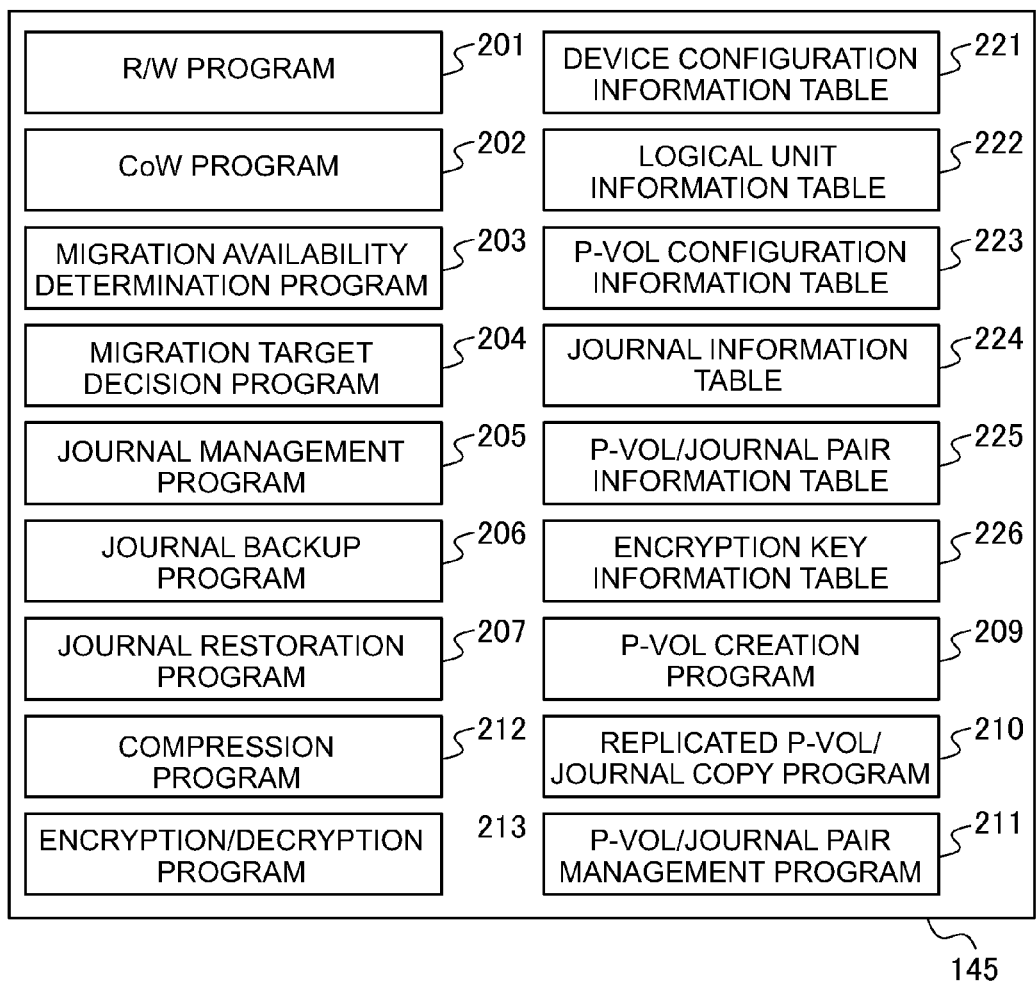
FIG. 2 is an explanatory diagram showing computer programs and information that are stored in a control memory of a first storage system according to the present invention.

FIG. 2 is an explanatory diagram showing the computer programs and information that are stored in the control memory 145 of the first storage system 125 according to the first embodiment of the present invention.

In the following explanation, the processing to be executed by a program is actually the processing to be performed by the control processor 143 that will execute such program.

The control memory 145 stores a R/W program 201, a CoW (Copy on Write) program 202, a migration availability determination program 203, a migration target decision program 204, a journal management program 205, a journal backup program 206, a journal restoration program 207, a journal merge program 208, a P-VOL creation program 209, a replicated P-VOL/journal copy program 210, a P-VOL/journal pair management program 211, a compression program 212, an encryption/decryption program 213, a device configuration information table 221, a logical unit information table 222, a P-VOL configuration information table 223, a journal information table 224, a P-VOL/journal pair information table 225, and an encryption key information table 226.

The R/W program 201 controls the I/O according to an I/O command from the host computer 101. The journal merge program 208 merges intergenerational differential data of a plurality of generations. The journal backup program 206 creates an environment for backing up journal data to the second storage system 161. The journal restoration program 207 restores the journal data that was backed up to the second storage system 161 as a volume of a generation that is designated in the storage system 125.

Figure 3:
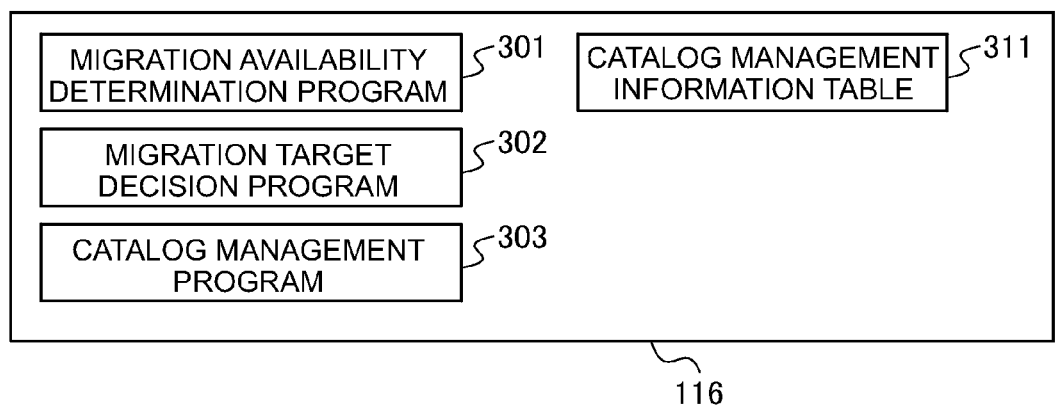
FIG. 3 is an explanatory diagram showing computer programs and information that are stored in a control memory of a management server according to the present invention.

FIG. 3 is an explanatory diagram showing the computer programs and information that are stored in the memory 116 of the management server 111 according to the first embodiment of the present invention.

The memory 116 stores a migration availability determination program 301, a migration target decision program 302, a catalog management program 303, and a catalog management information table 311.

The format of journal data in this embodiment is now explained with reference to FIG. 4A to FIG. 4E.

In this embodiment, journal data is data that is created with the snapshot function of the first storage system 125 for storing an image of the P-VOL at an intended point in time. Incidentally, a P-VOL (Primary Volume) is a logical volume that is designated as a target for the data I/O by the host computer 101. As described later, for example, by reflecting the journal data in the data of the current P-VOL, data that is stored in the P-VOL of the designated generation (in other words, the P-VOL at a designated time in the past).

Figure 4A:
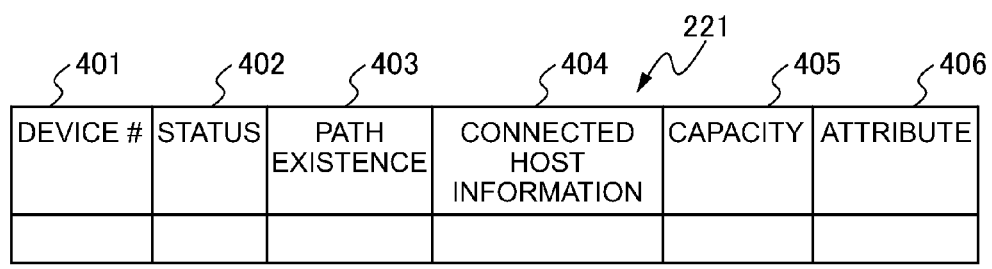
FIG. 4A is an explanatory diagram of a device configuration information table according to the first embodiment of the present invention.
Figure 4B:
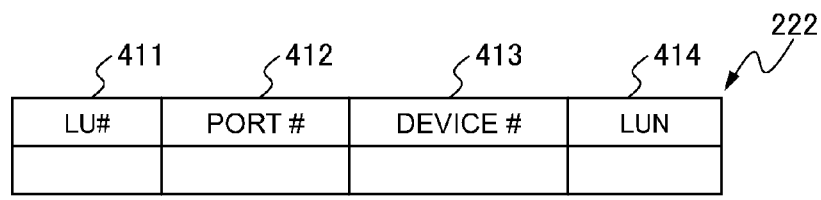
FIG. 4B is an explanatory diagram of a logical unit information table according to the first embodiment of the present invention.
Figure 4C:
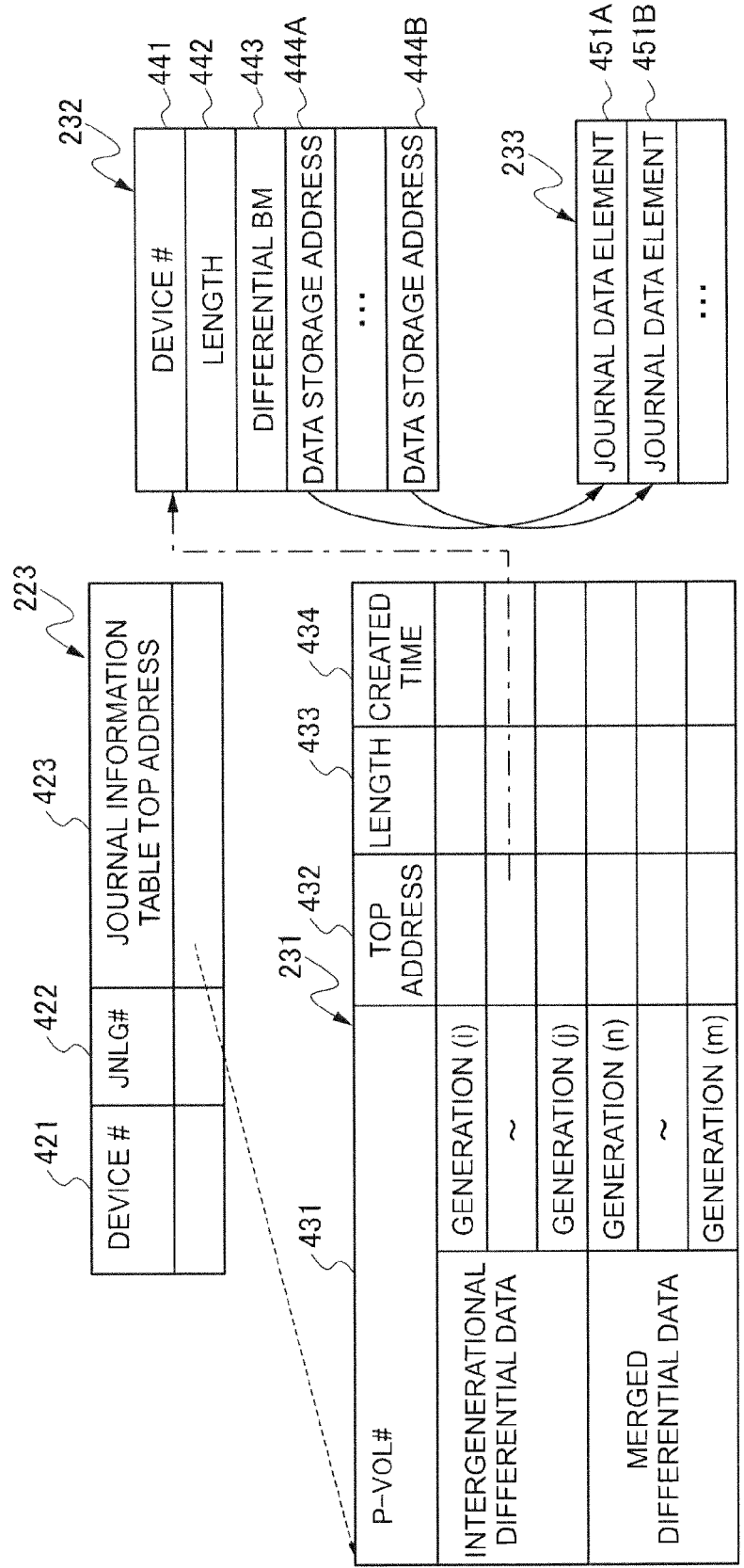
FIG. 4C is an explanatory diagram of a P-VOL configuration information table and its related tables according to the first embodiment of the present invention.

Specifically, FIG. 4A to FIG. 4E show examples of the device configuration information table 221, the logical unit information table 222, the P-VOL configuration information table 223, the journal information table 224, and the P-VOL/journal pair information table 225 shown in FIG. 2. Incidentally, although FIG. 4C shows the journal information table 231, the journal control information table 232 and the journal data 233 that are not shown in FIG. 2, these are not stored in the control memory 145, and are stored in the PDEV 151.

FIG. 4A is an explanatory diagram of the device configuration information table 221 according to the first embodiment of the present invention.

The device configuration information table 221 is a table that is prepared for each P-VOL. The device configuration information table 221 stores, for each P-VOL, a disk device #401, a status 402, a path existence 403, connected host information 404, a capacity 405 and an attribute 406.

The disk device #401 is an identifier of each P-VOL.

The status 402 is information showing the status of each P-VOL. As information showing the status of each P-VOL, for instance, there is information showing the access restriction (specifically, prohibition of writing and reading, or reading only, etc.) that is set in each P-VOL.

The path existence 403 is information showing whether an access path has been defined between each P-VOL and the host computer 101.

The connected host information 404 is information showing the type of the host computer 101 to access each P-VOL, and, for instance, is information showing the type of operating system that is running on the host computer 101.

The capacity 405 is information showing the capacity of each P-VOL.

The attribute 406 is information showing whether each P-VOL is a normal volume or a virtual volume.

FIG. 4B is an explanatory diagram of the logical unit information table 222 according to the first embodiment of the present invention.

The logical unit information table 222 is a table that is prepared for the logical unit that is used by an open host for input and output of data. The logical unit information table 222 stores, for each logical unit, a logical unit #411, a port #412, a disk device #413, and a LUN #414.

The logical unit #411 is an identifier of each logical unit.

The port #412 is the number of the port 129 allocated to the target device corresponding to the P-VOL that is identified based on the disk device #413.

The disk device #413 is an identifier of the P-VOL corresponding to each logical unit.

The LUN #414 is a logical unit number (LUN: Logical Unit Number) and an identifier for identifying each logical unit.

Incidentally, the logical unit #411 is unique in relation to the port #412. In other words, although a different logical unit #411 is assigned to each of a plurality of logical units that are allocated to the same port 129, if two logical units are respectively allocated to different ports 129, there are cases where the same logical unit #411 is assigned to those logical units. Meanwhile, the LUN #414 is unique within the first storage system 125.

FIG. 4C is an explanatory diagram of the P-VOL configuration information table 223 and its related tables according to the first embodiment of the present invention.

The P-VOL configuration information table 223 is a table that is prepared for a P-VOL in which the attribute 406 of the device configuration information table 221 is a "normal volume." The P-VOL configuration information table 223 stores a disk device #421, a journal G #422 and a journal information table top address 423.

The disk device #421 is an identifier of each P-VOL.

The journal G #422 is a number of a journal group (journal G) to which a journal corresponding to each P-VOL belongs. The generations of a plurality of journal data (or volumes) belonging to the same journal group are switched at the same timing.

The journal information table top address 423 shows the top address of an area storing the journal information table 231 concerning a journal corresponding to each P-VOL.

The journal information table 231 is prepared for each P-VOL, and is a table for managing the intergenerational differential data (i.e., journal data) corresponding to the P-VOL. The journal information table 231 stores, for each generation regarding the intergenerational differential data, a top address 432, a length 433, and a created time 434.

The top address 432 shows the top address of an area storing the journal control information table 232 corresponding to each generation.

The length 433 shows the data size and number of elements corresponding to each generation of the intergenerational differential data.

The created time 434 shows the time that the differential of each generation is to be stored; for instance, the reception time of a marker that became the source for establishing the newest generation. A marker is a command that the host computer 101 sends to the first storage system 125 for establishing an image of the P-VOL as the generation of backup data. The storage system 125 that received the marker uses the snapshot function to establish an image of the P-VOL, which was designated in the marker, as the newest generation at the point in time that the marker was received.

Moreover, the journal information table 231 also manages merged differential data that was created by merging a plurality of intergenerational differential data. The journal information table 231 also stores, for each generation regarding the merged differential data, a top address 432, a length 433, and a created time 434. Incidentally, the "generation" in the merged differential data is a certain generation (for instance, newest or oldest generation) among the plurality of generation corresponding to the merged differential data, and the created time 434 is the time that the corresponding merged differential data was stored in the journal area.

By referring to the top address 432 corresponding to the intergenerational differential data and the merged differential data, it is possible to refer to the journal control information table 232 corresponding to that intergenerational differential data or the merged differential data.

The journal control information table 232 exists for each generation regarding the intergenerational differential data and the merged differential data, respectively. The journal control information table 232 is a table for managing the differential bitmap (BM) corresponding to the generation and the location of the data element.

Specifically, for instance, the journal control information table 232 stores a disk device #441, a length 442, a differential BM 443, and a data storage address 444 corresponding to each journal data element 451 configuring the corresponding journal data 233.

The disk device #441 is an identifier of the P-VOL corresponding to the journal shown in the journal control information table 232.

The length 442 shows the length of the journal data (i.e., intergenerational differential data or merged differential data) corresponding to each generation.

The differential BM 443 is a differential BM corresponding to each generation.

The data storage address 444 shows the address of an area storing each journal data element 451 configuring the journal data 233 corresponding to each generation. If the journal data 233 corresponding to each generation includes a plurality of journal data elements 451 (for instance, journal data element 451A and journal data element 451B), the data storage address 444 will include a plurality of addresses (for instance, data storage address 444A and data storage address 444B) corresponding to such plurality of journal data elements 451.

FIG. 4D is an explanatory diagram of the journal information table 224 according to the first embodiment of the present invention.

The journal information table 224 is prepared for each P-VOL, and is a table for managing the backup data concerning the P-VOL. The journal information table 224 stores, for example, a P-VOL #461, a snapshot acquired time 462, and a backup acquired time 463.

The P-VOL #461 is a number (identifier) of the P-VOL. The same identifier as the disk device #401 may be used as the P-VOL #461.

The snapshot acquired time 462 shows the time that the S-VOL (Secondary Volume), which configures a pair with the P-VOL, was created. For example, the first storage system 125 that received a marker may create an S-VOL corresponding to the generation of the snapshot that is created according to that request, and store the journal data 233 corresponding to that generation in the created S-VOL.

The backup acquired time 463 shows the time that the backup was acquired; that is, the reception time of the marker that became the source for establishing the generation of the snapshot shown in the snapshot acquired time 462.

Moreover, although not shown in FIG. 4D, the journal information table 224 may also store the number of acquired generations, backup period, number of merged generations, and the like. The number of acquired generations shows the number of generations of the backup that was acquired regarding the P-VOL. The number of merged generations is the threshold value of the number of generations showing when to execute the merge processing when how many generations worth of the intergenerational differential data have been accumulated.

FIG. 4E is an explanatory diagram of the P-VOL/journal pair information table 225 according to the first embodiment of the present invention.

The P-VOL/journal pair information table 225 includes information for managing the pair configured from each P-VOL and a journal corresponding to that P-VOL. Specifically, the P-VOL/journal pair information table 225 stores a P-VOL #471, a P-VOL storing apparatus number 472, a replicated P-VOL #473, a replicated P-VOL created time 474, a journal VOL #475, and a replicated P-VOL/journal pair number 476.

The P-VOL #471 is a number (identifier) of the P-VOL. The same identifier as the disk device #401 may be used as the P-VOL #471.

The P-VOL storing apparatus number 472 is an apparatus identifier of the storage system that is storing the P-VOL (that is, the storage system that is providing that P-VOL to the host computer 101).

The replicated P-VOL #473 is an identifier of the P-VOL replication that is identified based on the P-VOL #471. As described later, it is possible to create a replication of an arbitrary P-VOL, and store such replication (hereinafter also referred to as the "replicated P-VOL") in a separate storage system that is externally connected to the storage system that is storing the original P-VOL. The replicated P-VOL #473 is an identifier of the replicated P-VOL that was replicated as described above and stored in an external storage system.

The replicated P-VOL created time 474 shows the time (or period) that the replicated P-VOL was created.

The journal VOL #475 is an identifier of the logical volume storing journal data corresponding to the replicated P-VOL that is identified based on the replicated P-VOL #473.

The replicated P-VOL/journal pair number is a number for identifying the pair configured from a replicated P-VOL and its corresponding journal data.

FIG. 5 is an explanatory diagram of the format of the catalog management information table 311 according to the first embodiment of the present invention.

The catalog management information table 311 is information showing in which apparatus the journal data of each generation of each P-VOL is stored. Specifically, the catalog management information table 311 stores a P-VOL #501, a P-VOL storing apparatus number 502, a generation number 503, a journal storing external apparatus number 504, an external generation number 505, a replicated P-VOL #506, an external journal VOL number 507, and a backup acquired time 508.

The P-VOL #501 is a number (identifier) of each P-VOL that is stored in the storage system under the control of the management server 111. The same identifier as the disk device #401 may also be used as the P-VOL #501.

The P-VOL storing apparatus number 502 is an apparatus identifier of the storage system storing each P-VOL (that is, the storage system that is providing that P-VOL to the host computer 101).

The generation number 503 is a number of the generation of the snapshot that was created in correspondence with each P-VOL. If the snapshot of a plurality of generations corresponding to each P-VOL is created (that is, if journal data for restoring an image at a plurality of points in time of one P-VOL is stored), a plurality of values (i.e., numbers of the plurality of created generations) are stored in the generation number 503 corresponding to one P-VOL #501.

The journal storing external apparatus number 504 is an apparatus identifier of the storage system storing the replication of the journal data of the created generation. As described later, the replication of the journal data may also be stored in the storage system (i.e., external storage system) that is externally connected to the storage system storing the P-VOL, and the original journal data may be deleted. In the foregoing case, the identifier of the storage system storing the replication of the journal data is stored as the journal storing external apparatus number 504.

The external generation number 505 is a generation number that is assigned by the external storage system in order to management the replication of journal data when the replication of such journal data is stored in the external storage system as described above.

The replicated P-VOL #506 is an identification of the P-VOL replication. If the replication of the journal data is stored in the external storage system as described above, the P-VOL replication may be additionally created and then stored in the external storage system. The replicated P-VOL #506 is an identifier of the replication that was created as described above.

The external journal VOL number 507 is an identifier of the logical volume in the external storage system storing the replication of the journal data.

The backup acquired time 508 shows the time that the replication of the journal data was stored in the external storage system.

A specific example of the catalog management information table 311 is now explained.

For example, a case where the apparatus identifier of the first storage system 125 is "ST1," the apparatus identifier of the second storage system 161 is "ST2," and the identifier of the P-VOL (this is referred to as the "relevant P-VOL" in the explanation of FIG. 5 below; provided, however, that this P-VOL is a normal volume) stored in the first storage system 125. Here, "P-VOL 01" is stored as the P-VOL #501, and "ST1" is stored as the corresponding P-VOL storing apparatus number 502.

In this example, if the snapshot of the relevant P-VOL has been created twice in the past, the generation number "1" of the first (i.e., old) snapshot and the generation number "2" of the second (i.e., new) snapshot are stored as the generation number 503 corresponding to the "P-VOL 01."

The journal data of the snapshot of each generation (at least the journal data 233 of such generation) is normally stored in one of the logical volumes in the first storage system 125 (that is, the storage system storing the relevant P-VOL). Nevertheless, at least one replication among the above may be stored in the logical volume of the second storage system 161. After the replication is stored in the logical volume of the second storage system 161, the journal data of that replication source may be deleted from the first storage system 125.

For example, if the journal data of the generation of the second snapshot is deleted from the first storage system 125, and that replication is stored in the logical volume that is identified based on the identifier "journal VOL 11" of the second storage system 161, "ST2" and "journal VOL 11" are respectively stored as the journal storing external apparatus number 504 corresponding to the value "2" of the generation number 503, and the external journal VOL number 507. In addition, if that journal data is managed as the first generation in the second storage system 161, "1" is stored as the external generation number 505 corresponding to the value "2" of the generation number 503.

In the foregoing case, the time that the replication of the journal data of the second generation was stored in the second storage system 161 is stored as the backup acquired time 508 corresponding to the value "2" of the generation number 503.

Moreover, the replication of the relevant P-VOL may additionally be created and stored in the second storage system 161. For example, if the replication of the relevant P-VOL is to be stored as the logical volume to be identified based on the identifier "P-VOL 11" of the second storage system 161, "P-VOL 11" is stored as the replicated P-VOL #506 corresponding to "P-VOL 01."

Incidentally, in the example illustrated in FIG. 2, although only the memory 116 of the management server 111 stores the catalog management information table 311, information that is equivalent to the catalog management information table 311 may also be stored in the memory 106 of the host computer 101, or stored in the control memory 145 of the first storage system 125, or stored in the control memory 171 of the second storage system 161.

FIG. 6 is an explanatory diagram of the format of the encryption key management information table 226 according to the first embodiment of the present invention. In FIG. 6, the encryption key management information table 226 is information showing which encryption key to use upon restoring data of each generation of each P-VOL. Specifically, the encryption key management information table 226 stores a P-VOL #521, a P-VOL storing apparatus number 522, host information (APP) 523, and an encryption key 524.

The P-VOL #521 is a number (identifier) of each P-VOL stored in the storage system under the control of the management server 111. The same identifier as the disk device #401 may be used as the P-VOL #521.

The P-VOL storing apparatus number 522 is an apparatus identifier of the storage apparatus storing each P-VOL (that is, the storage apparatus providing that P-VOL to the host computer 101). This identifier is used as information to be checked upon verifying the restoration destination so that, upon restoring data, such data is not stored in the wrong location.

The host information 523 is information showing the type of software resource, such as the operating system, to be used in the host computer 101.

The encryption key 524 is an encryption key to be used upon encrypting the P-VOL (copy of the online VOL at that point in time) and generation data (journal data).

The outline of processing for storing journal data is now explained.

Figure 7:
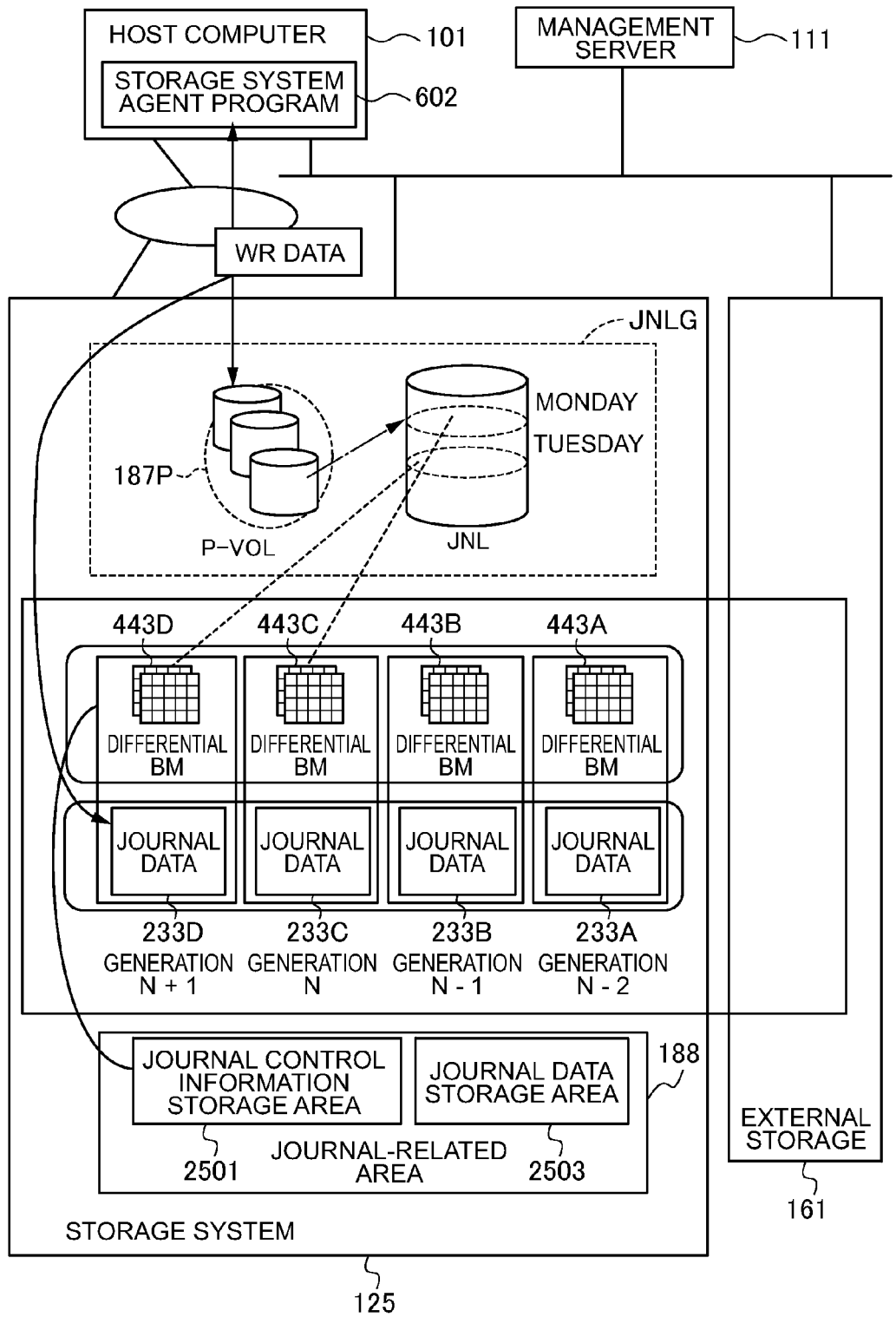
FIG. 7 is an explanatory diagram showing the outline of processing for storing a journal data element according to the first embodiment of the present invention.

FIG. 7 is an explanatory diagram showing the outline of processing for storing a journal data element according to the first embodiment of the present invention.

In the example illustrated in FIG. 7, a P-VOL 187P is stored in the first storage system 125. The P-VOL 187P is a primary logical volume (that is, an online logical volume). The P-VOL 187P is updated as a result of the host computer 101 writing the write data therein.

The journal-related area 188 is a storage area allocated to any one of the logical volumes of the first storage system 125, and includes a journal control information storage area 2501 and a journal data storage area 2503. The journal control information storage area 2501 stores, as shown in FIG. 7, the journal control information table 232 including a differential BM 443 (BM is the abbreviation of "bitmap") corresponding to each of the established generations. The journal data storage area 2503 stores the journal data 233 corresponding to each of the established generations.

In the example illustrated in FIG. 7, a differential BM 443A and journal data 233A corresponding to the generation (N−2), a differential BM 443B and journal data 233B corresponding to the generation (N−1), a differential BM 443C and journal data 233C corresponding to the generation (N), and a differential BM 443D and journal data 233D corresponding to the generation (N+1) are stored. In the explanation of FIG. 7, if the explanation commonly applies to the differential BMs 443A to 443D, they may also be collectively referred to as the "differential BM 443." If the explanation commonly applies to the journal data 233A to 233D, they may also be collectively referred to as the "journal data 233."

Incidentally, although FIG. 7 illustrates the differential BM 443 and the journal data 233 as the representative elements of journal data, in reality, various types of necessary information are stored as shown in FIG. 4C.

Here, the term "generation" refers to a certain point in time regarding the P-VOL 187P. For example, the generation (N) is the point in time that a prescribed generation establishment event regarding the P-VOL 187P occurs (in this embodiment, when the marker described later is received from the host computer 101) after the lapse of the point in time of the generation (N−1).

Incidentally, in the example illustrated in FIG. 7, since the newest generated that has been established is the generation (N), the unestablished generation is the generation (N+1). When the marker is subsequently received, the generation (N+1) is established. Consequently, the generation (N+1) becomes the newest generation that has been established, and the unestablished generation is the generation (N+2).

When the generation is updated as described above, an entry concerning the newly established generation is added to the journal information table 231.

As explained with reference to FIG. 4C, the journal data 233 is an aggregate of one or more journal data elements 451. The journal data element 451 is the data element that was saved from the P-VOL 187P due to a data element being written into the P-VOL 187P.

Specifically, for example, if the unestablished generation is the generation (N), the generation (N) will be established when the storage system 125 receives the marker from the host computer 101, and the unestablished generation becomes the generation (N+1). Here, the journal data 233B (that is, data that corresponds to the differential of the P-VOL 187P of the generation (N) and the P-VOL 187P of the generation (N−1)) that is accumulated in the journal data storage area 2503 is saved in the journal data storage area 2503 as the journal data element 451 for restoring the P-VOL of the immediately preceding generation (generation (N−1) in this example).

Consequently, the journal data 233 (that is, data corresponding to the differential of the generation (N) and the generation (N−1)) corresponding to the generation (N) is accumulated in the journal data storage area 2503.

The differential BM 443 is a bitmap representing the inter-generational differential of the logical volume. Specifically, for instance, in the example illustrated in FIG. 7, the differential BM 443 corresponding to the generation (N) is a bitmap representing the differential of the P-VOL 187P of the generation (N) and the P-VOL 187P of the generation (N−1).

More specifically, if a write data element is written into a certain block in the P-VOL 187P for the first time at a certain point in time that is after the generation (N−1), the bit (bit within the differential BM 443 corresponding to the generation (N)) corresponding to that certain block is turned ON (that is, updated to a value ("1" for example) representing the occurrence of writing), and the journal data element 451 corresponding to that write data element is stored in the journal data storage area 2503. Incidentally, the respective bits configuring the differential BM 443 correspond to the respective blocks of the P-VOL 187P.

In the example illustrated in FIG. 7, the differential BM 443 corresponding to the write data element written on Monday and its corresponding journal data 233 are treated as "Monday's journal," and the differential BM 443 corresponding to the write data element written on Tuesday and its corresponding journal data 233 are treated as "Tuesday's journal."

The method of acquiring journal data is now explained.

There are two methods of acquiring a journal. According to the method shown in FIG. 8, the write data element is stored in the P-VOL, and data of the P-VOL before being updated based on the foregoing storage is stored as the journal data 233. The journal that is created as described above is also referred to as a "Before Journal." Meanwhile, according to the method shown in FIG. 10, the write data element is stored in the P-VOL, and, at the point in time that the marker is received, the update data is stored as the journal data 233. The journal that is created as described above is also referred to as an "After Journal."

Figure 8:
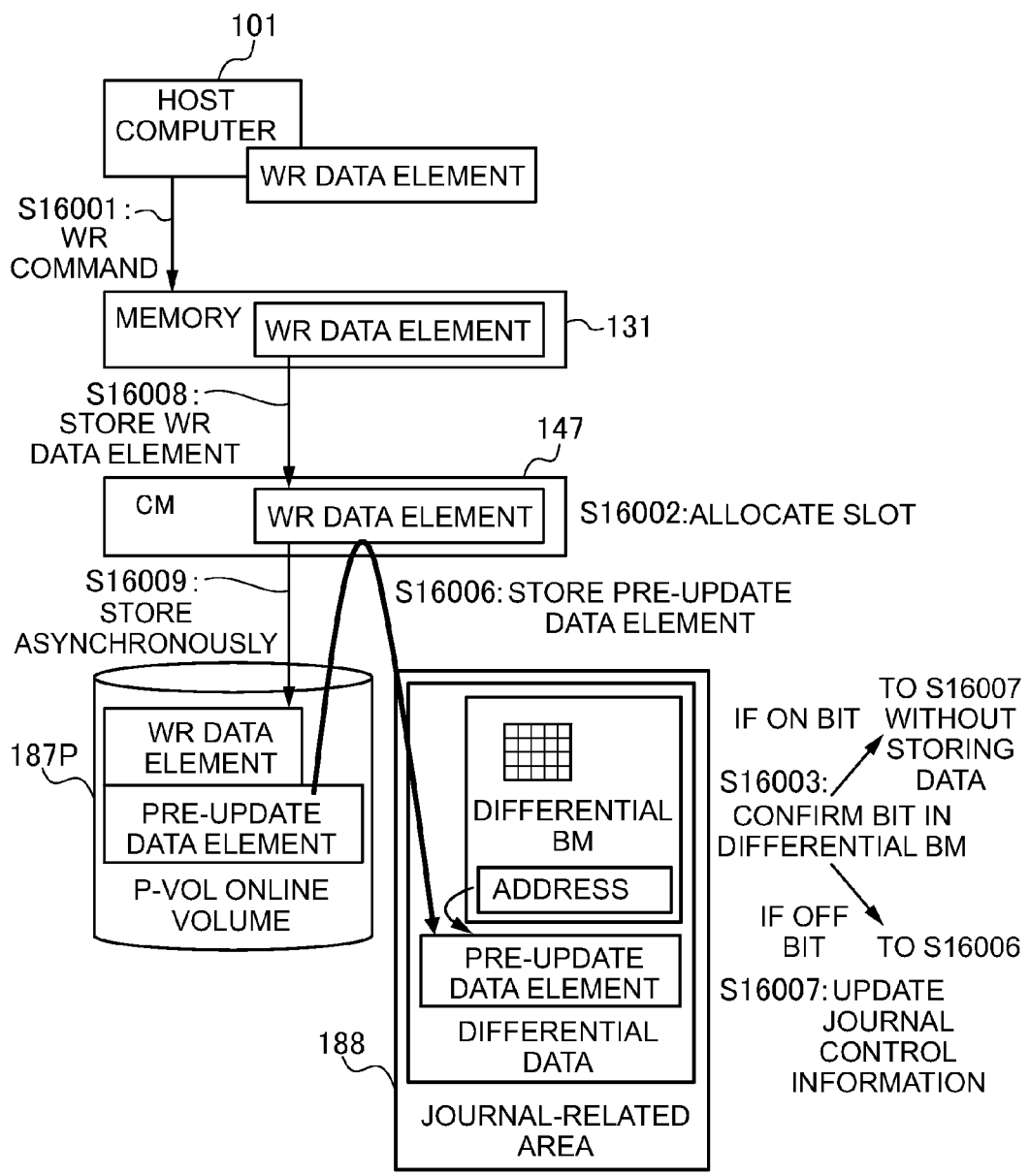
FIG. 8 is an explanatory diagram of write processing for writing a write data element into a P-VOL when a Before Journal is to be created according to the first embodiment of the present invention.

FIG. 8 is an explanatory diagram of the writing processing for writing the write data element into the P-VOL when a Before Journal is to be created according to the first embodiment of the present invention.

In the explanation of FIG. 8, the P-VOL that is designated as the write destination in the write command is referred to as the "target P-VOL."

When the R/W program 201 receives a write command (which designates the P-VOL 187P as the write destination, for instance) from the host computer 101 (S16001), it allocates a slot for storing the write data element (S16002). A "slot" is a unit management area of the cache memory 147.

Moreover, the R/W program 201 refers to the bit corresponding to the write destination block that is designated in the write command and located in the differential BM 443 (S16003).

If the reference target is an ON bit as a result of S16003, the data stored in the write destination block that is designated in the write command has been updated at least once during the period from the previous marker reception to the current time. In the foregoing case, the R/W program 201 executes the processing of S16008 onward. Specifically, the R/W program 201 proceeds to S16007 without saving the data element that is stored in the write destination block.

Meanwhile, if the reference target is an OFF bit as a result of S16003, the data stored in the write destination block that is designated in the write command has never been updated during the period from the previous marker reception to the current time. In other words, the data stored in the write destination block that is designated in the write command is the data that was stored in that block at the time of the previous marker reception. In order to restore the target P-VOL 187P at the time of the previous marker reception, it is necessary to store that data. Thus, the R/W program 201 stores (i.e., saves) the data element that is stored in the write destination block as the journal data element 451 in the journal data storage area 2503 (S16006).

Subsequently, the R/W program 201 updates the journal control information table 232 so that the storage at S16006 is reflected therein (S16007). Specifically, the R/W program 201 turns ON the bit of the differential BM 443 corresponding to the write destination block, and adds, as the data storage address corresponding to that write destination block, an address of the area in which the journal data element 451 was stored at S16006.

The R/W program 201 thereafter writes the write data element that is stored in the memory 131 of the front-end interface 127 into the slot allocated at S16002 (S16008).

The R/W program 201 writes the write data element, which is written into that slot, into the write destination block in the P-VOL (S16009).

Figure 9:
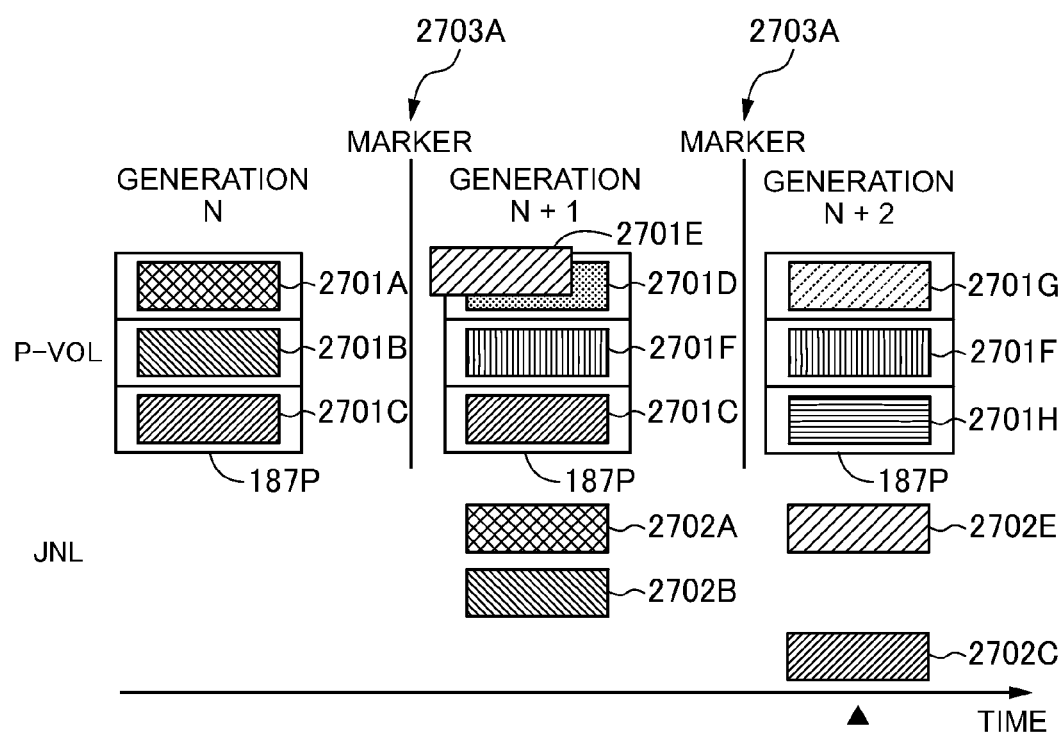
FIG. 9 is an explanatory diagram showing an example of the created journal data when a Before Journal is to be created according to the first embodiment of the present invention.

FIG. 9 is an explanatory diagram showing an example of the created journal data when a Before Journal is to be created according to the first embodiment of the present invention.

Specifically, FIG. 9 illustrates the transition of the data stored in the P-VOL 187P.

At the oldest point in time shown in FIG. 9, the P-VOL 187P stores data 2701A, data 2701B, and data 2701C (generation N). In order to simplify the explanation, let it be assumed that the data 2701A, the data 2701B and the data 2701C are respectively stored in each of the three blocks of the P-VOL 187P.

Subsequently, the first storage system 125 receives a marker 2703A from the host computer 101. The generation N is established at this point in time.

Subsequently, the data 2701A is updated to the data 2701D according to a write command from the host computer 101. In the foregoing case, the first storage system 125 stores a replication of the data 2701A as a journal data element 2702A in the journal data storage area 2503. Incidentally, the journal data element 2702A corresponds to one of the journal data elements 451 (journal data element 451A, 451B, etc.) explained with reference to FIG. 4C. The same applies to the journal data element 2702B and the like explained later.

Similarly, when the data 2701B is updated to the data 2701F, a replication of the data 2701B is stored as a journal data element 2702B in the journal data storage area 2503.

Moreover, although not shown in FIG. 9, the bits of the differential BM 443 respectively corresponding to the block that was storing the data 2701A and the block that was storing the data 2701B are updated to ON.

Subsequently, the data 2701D is further updated to the data 2701E. Nevertheless, in the foregoing case, since the replication of the data 2701A (that is, data that was stored at the point in time the marker 2703A was received) is already stored as the journal data element 2702A, the replication of the data 2701D is not stored.

Subsequently, the first storage system 125 receives a marker 2703B from the host computer 101. The generation N+1 is established at this point in time. Since the differential BM 443 and the journal data elements 2702A and 2702B of this point in time are required for restoring the P-VOL 187P of the generation N, they are retained without change until the generation N is abandoned or merged.

Subsequently, the data 2701E is updated to the data 2701G, and the data 2701C is updated to the data 2701H. In the foregoing case, a replication of the data 2701E is stored as a journal data element 2702E and a replication of the data 2701C is stored as a journal data element 2702C in a newly prepared area within the journal data storage area 2503.

Moreover, the differential BM 443 is newly prepared, and the bits respectively corresponding to the block that was storing the data 2701E and the block that was storing the data 2701C are updated to ON.

Let it be assumed that, as a result of the foregoing update, the P-VOL 187P at the current time is storing the data 2701G, the data 2701F, and the data 2701H. The P-VOL 187P at the current time corresponds to the generation N+2, but is not established until the next marker (not shown) is received.

By respectively substituting the data 2701G and the data 2701H of the P-VOL 187P at the current time with the journal data element 2702E and the journal data element 2702C, the P-VOL 187P of the established generation N+1 can be restored. Moreover, by respectively substituting the journal data elements 2702E and data 2701F of the restored P-VOL 187P of the generation N+1 with the journal data element 2702A and the journal data element 2702B, the P-VOL 187P of the generation N can be restored.

This substitution may be physically executed by overwriting the data, or virtually executed by changing the access target.

For example, to explain the case where the data 2701G of the P-VOL 187P is substituted with the journal data element 2702E as described above, the journal data element 2702E may be written over the data 2701G of the P-VOL 187P. Or, when the R/W program 201 receives a read request to a block storing the data 2701G, in substitute for reading the data 2701G from the requested block, it may read the journal data element 2702E from the storage area storing the journal data element 2702E, and send it as the reply to the read request.

Incidentally, in the explanation of this embodiment, if there is a description to the effect of "reflecting the journal data in the P-VOL," the term "reflecting" means the substitution described above.

Figure 10:
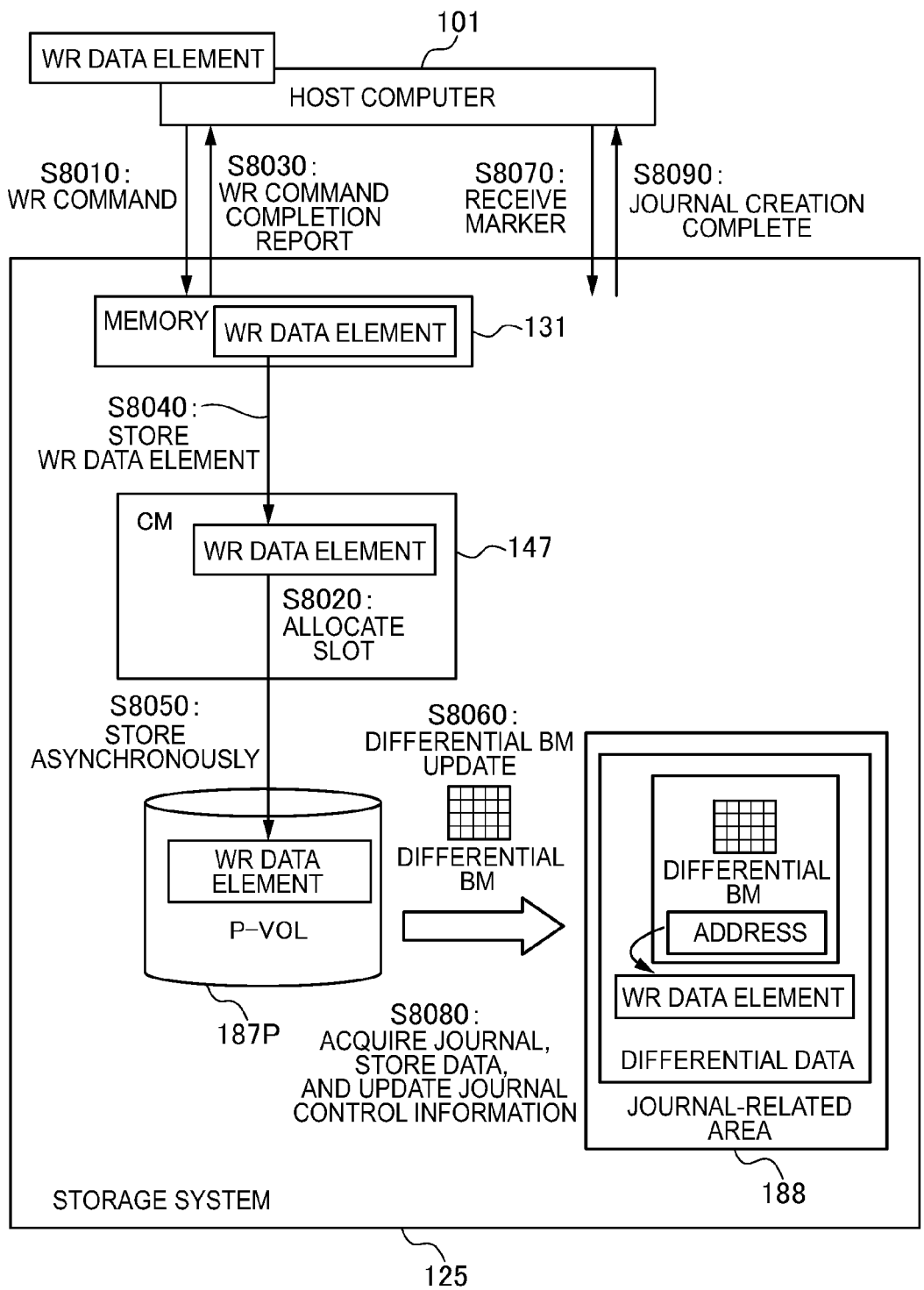
FIG. 10 is an explanatory diagram of write processing for writing a write data element into a P-VOL when an After Journal is to be created according to the first embodiment of the present invention.

FIG. 10 is an explanatory diagram of the write processing for writing a write data element into a P-VOL when an After Journal is to be created according to the first embodiment of the present invention.

In the explanation of FIG. 10, the P-VOL that is designated in the write command is referred to as the "target P-VOL." Moreover, in order to prevent a redundant explanation below, the target corresponding to the generation K may be indicated by adding a (K) after the name of the target. Specifically, for example, the journal control information corresponding to the generation (J) may be indicated as the "journal control information (J)."

The front-end interface 127 receives a write command and a write data element from the host computer 101, and stores the write data element in the memory 131 (S8010). The write command is transferred to the control processor 143.

The R/W program 201 allocates a slot from the cache memory 147 in response to the reception of the write command (S8020).

The R/W program 201 sends a write command completion report to the host computer 101 that sent the write command (S8030). In response, a write data element is sent from the host computer 101, and stored in the memory 131 of the front-end interface 127.

The R/W program 201 writes the write data element stored in the memory 131 of the front-end interface 127 into the allocated slot (S8040).

The R/W program 201 writes the write data element in the slot into the write destination block of the target P-VOL 187P (S8050). Further, the R/W program 201 turns ON, among the bits of the differential BM 443 of the P-VOL 187P, the bits corresponding to the updated blocks (S8060).

Subsequently, at arbitrary timing, the host computer 101 sends a marker to the P-VOL 187P. When the storage system 125 receives the marker (S8070), it acquires a journal (S8080). Specifically, the storage system 125 copies the data of the blocks corresponding to the bits that are turned ON, among the bits of the differential BM 443 corresponding to the target P-VOL 187P, as the journal data 233 to the journal data storage area 2503. The storage system 125 manages the address of the copy destination area as the data storage address 444.

When the creation of the journal is completed based on the foregoing processing, the storage system 125 sends a completion report to the host computer 101 (S8090).

Unless otherwise specified, the following explanation refers to the case of creating a Before Journal, but the present invention can also be applied to the case of creating an After Journal based on the same processing.

The processing for migrating journal data to an external storage system is now explained. Migrating the journal data to the external storage system means storing a replication of the journal data (at least the journal control information table 232 and the journal data 233), which is stored in the first storage system 125, in the second storage system 161, and deleting the original journal data from the first storage system 125.

Figure 11:
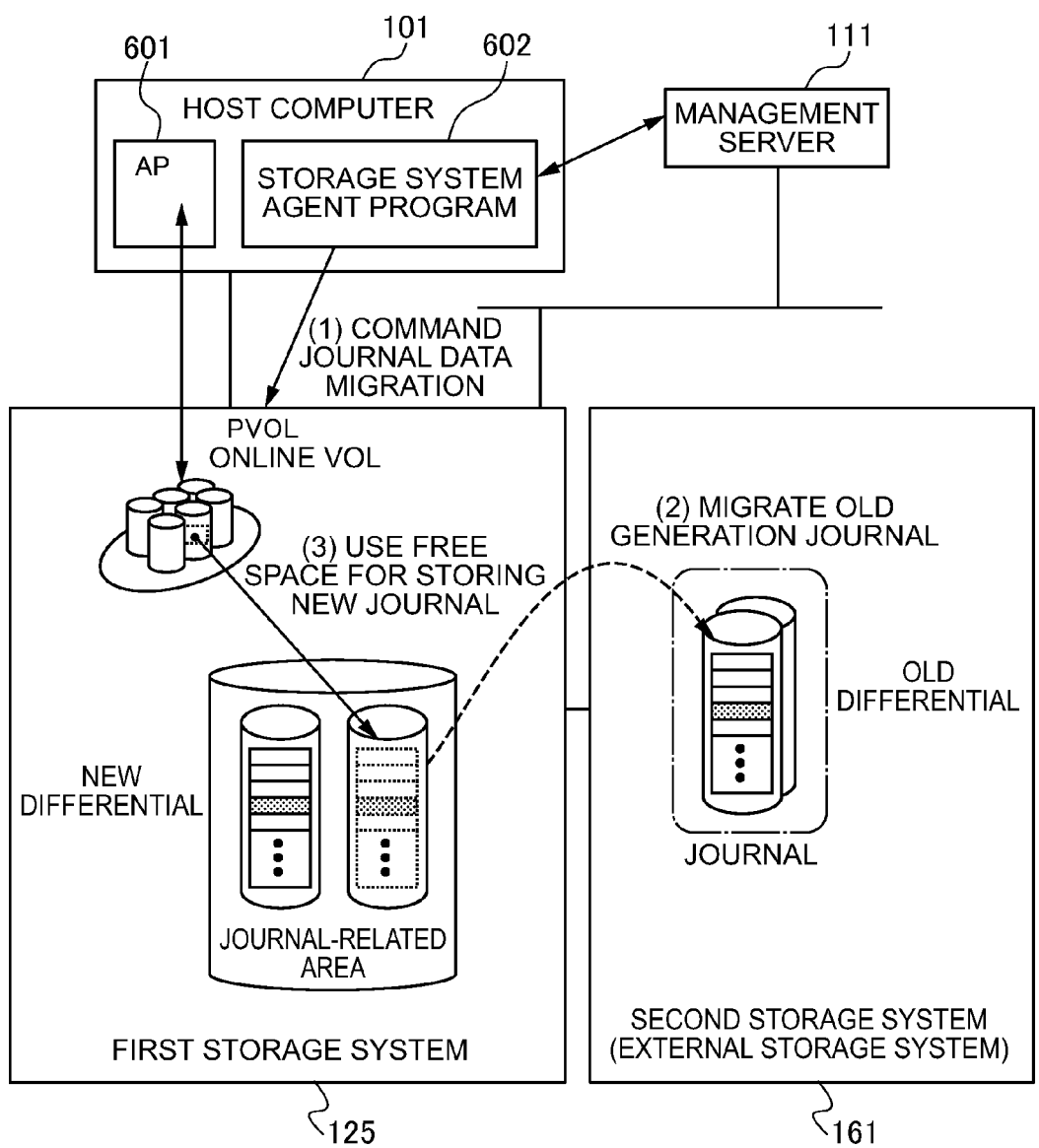
FIG. 11 is an explanatory diagram showing the outline of processing for migrating journal data to an external storage system to be executed according to the first embodiment of the present invention.

FIG. 11 is an explanatory diagram showing the outline of processing for migrating journal data to an external storage system to be executed according to the first embodiment of the present invention.

In the example illustrated in FIG. 11, if a prescribed condition is satisfied, the management server 111 sends a journal data migration command to the storage system agent program 602 of the host computer 101.

The host computer 101 sends a journal data migration command to the first storage system 125.

The first storage system 125 sends a replication of the journal data (for instance, oldest generation journal data) that was designated in the received command to the second storage system 161.

The second storage system 161 stores the received replication of the journal data in a logical volume.

When the replication of the journal data is stored in the second storage system 161, the first storage system 125 deletes the designated journal data from the journal-related area 188 of the first storage system 125. The area that became free as a result of the foregoing deletion can be used for storing journal data of a new generation.

Figure 12:
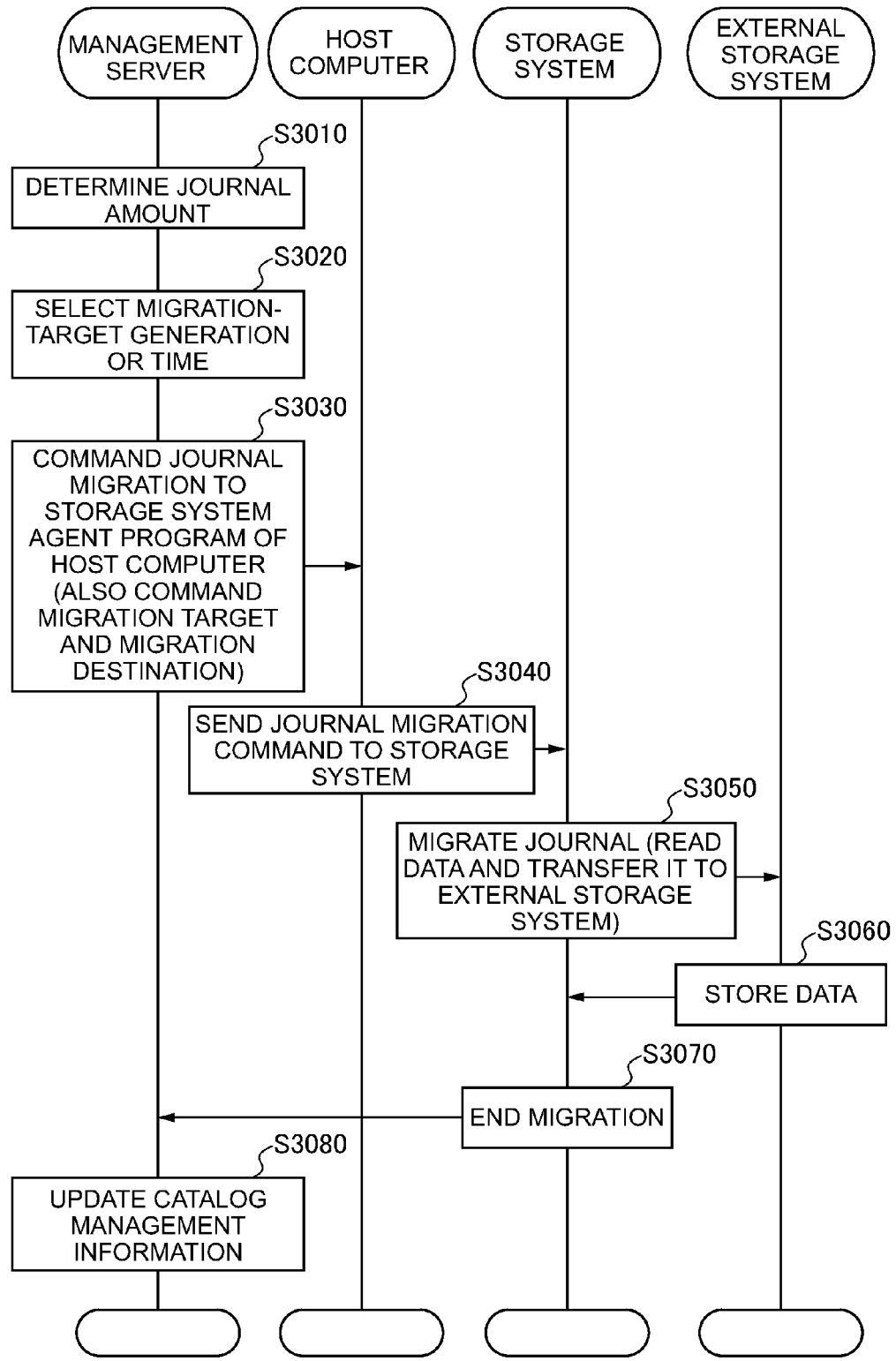
FIG. 12 is a flowchart showing the processing for migrating journal data to an external storage system to be executed according to the first embodiment of the present invention.

FIG. 12 is a flowchart showing the processing for migrating journal data to an external storage system to be executed according to the first embodiment of the present invention.

FIG. 12 is a diagram showing the details of the processing illustrated in FIG. 11.

Foremost, the migration availability determination program 301 of the management server 111 determines whether it is necessary to migrate the journal data to the external storage system (S3010). Specifically, the migration availability determination program 301 may determine whether a prescribed condition will be satisfied, and, when it determines that a prescribed condition will be satisfied, it may determine that it is necessary to migrate the journal data to the external storage system.

For example, the migration availability determination program 301 may monitor the journal data amount that is stored in the first storage system 125, and, if such journal data amount exceeds a prescribed threshold value, it may determine that a prescribed condition has been satisfied.

The journal data amount that is stored in the first storage system 125 is calculated, for example, by totaling the values of the length 442 stored in the journal control information table 232 of all generations. The migration availability determination program 301 may monitor the journal data amount by acquiring the value or total value of the length 442 from the first storage system 125.

If the journal data amount acquired as described above exceeds a prescribed threshold value, the migration availability determination program 301 may determine that a prescribed condition has been satisfied (that is, it is necessary to migrate the journal data to the external storage system).

Otherwise, the migration availability determination program 301 may determine that a prescribed condition has been satisfied when the entire data amount stored in the first storage system 125 exceeds a prescribed threshold value.

Otherwise, the migration availability determination program 301 may monitor the access frequency of the journal data stored in the first storage system 125, and, if the access frequency of a certain journal data falls below a prescribed threshold value, it may determine that a prescribed condition has been satisfied (that is, it is necessary to migrate the journal data to the external storage system). Incidentally, the access frequency may also be calculated according to the method described later (refer to S3020).

Otherwise, the migration availability determination program 301 may determine that a prescribed condition has been satisfied upon receiving a command for migrating the journal data from the user.

If it is determined that a prescribed condition has been satisfied at S3010, the migration target decision program 302 of the management server 111 selects the journal data to be migrated (S3020). Specifically, the migration target decision program 302 selects the generation or the created time of the journal data 233 to be migrated.

The migration target decision program 302 can migrate journal data of an arbitrary generation to an external storage system. However, in order to restore the P-VOL of the intended generation using the journal data that was migrated to the external storage system, time is required for copying the journal data from the external storage system to the first storage system 125. In order to reduce the time required for performing the foregoing copy, it is desirable to migrate journal data with low access frequency (in other words, journal data of a generation with a low restoration frequency) to the external storage system.

Generally speaking, it is assumed that the need for restoring an old generation arising is unlikely. Thus, the oldest generation journal data may be selected at S3020.

Otherwise, the migration target decision program 302 may acquire the access frequency of each generation, and select the journal data of the generation with the lowest access frequency. In the foregoing case, the first storage system 125 needs to provide information showing the access frequency of each generation to the management server 111. For example, the journal information table 231 may additionally store the access count for each generation (that is, the number of times that the generation was restored), and the access frequency may be calculated based on such access count (not shown) and the created time 434.

Otherwise, the migration target decision program 302 may select the journal data that was designated by the user at S3020. The user may input information for designating an arbitrary generation using the input unit 112 of the management server 111. In the foregoing case, the migration target decision program 302 will select the journal data of the generation that was designated by the user.

Moreover, the migration target decision program 302 selects the migration destination of the selected journal data at S3020. Specifically, for instance, the migration target decision program 302 may select, among the logical volumes of the second storage system 161, a logical volume having a free capacity that is equal to or greater than the amount of the selected journal data as the migration destination.

Subsequently, the management server 111 sends a journal data migration command to the host computer 101 (S3030). This journal data migration command includes the designation of the journal data to be migrated and the migration destination (that is, the journal data and the migration destination that were selected at S3020).

The host computer 101 sends the journal data migration command received from the management server 111 to the first storage system 125 (S3040).

The journal backup program of the first storage system 125 migrates the designated journal data to the designated migration destination according to the received journal data migration command (S3050). Specifically, for example, if the generation of the journal data to be migrated is designated, the journal backup program reads the journal data (at least the differential BM 443 and the journal data 233) corresponding to the designated generation from the journal-related area 188, and sends a command to the second storage system 161 for storing the read journal data in the designated migration destination.

The second storage system 161 (i.e., external storage system) stores the sent journal data in the designated migration destination according to the sent command (S3060). When this storage is complete, the second storage system 161 sends a storage completion report to the first storage system 125.

When the first storage system 125 confirms that the sent journal data has been stored in the second storage system 161 based on the foregoing report, it sends a journal data migration completion report to the management server 111 (S3070).

Moreover, the first storage system 125 deletes the designated journal data from the journal-related area 188. The first storage system 125 may execute this deletion at S3050, or after confirming that the sent journal data has been stored in the second storage system 161 (that is, after receiving the report at S3070).

In addition, the journal management program 205 of the first storage system 125 updates the journal information table 224. Specifically, the identifier of the P-VOL corresponding to the migrated journal data is stored as the P-VOL #461. The value of the created time 434 corresponding to the migrated journal data is stored as the snapshot acquired time 462. The time that the storage of S3060 was executed is stored as the backup acquired time 463.

When the catalog management program 303 of the management server 111 receives the report at S3070, it updates the catalog management information table 311 so as to reflect the journal data migration that was executed from S3050 to S3060 (S3080).

Specifically, the journal storing external apparatus number 504, the external generation number 505, the external journal VOL number 507, and the backup acquired time 508 corresponding to the journal data that was migrated at S3050 are updated as follows. In other words, the identifier of the second storage system 161 is stored as the journal storing external apparatus number 504. The generation number that the second storage system 161 assigned to the journal data after the migration is stored as the external generation number 505. The identifier of the migration destination logical volume of the journal data is stored as the external journal VOL number 507. The time that the storage at S3060 was executed is stored as the backup acquired time 508.

The processing for migrating journal data to an external storage system is thereby complete.

As described above, free capacity of the first storage system 125 can be allocated by migrating journal data to an external storage system. Consequently, the amount of backup data and the number of generations to be maintained and managed can be increased.

Figure 13:
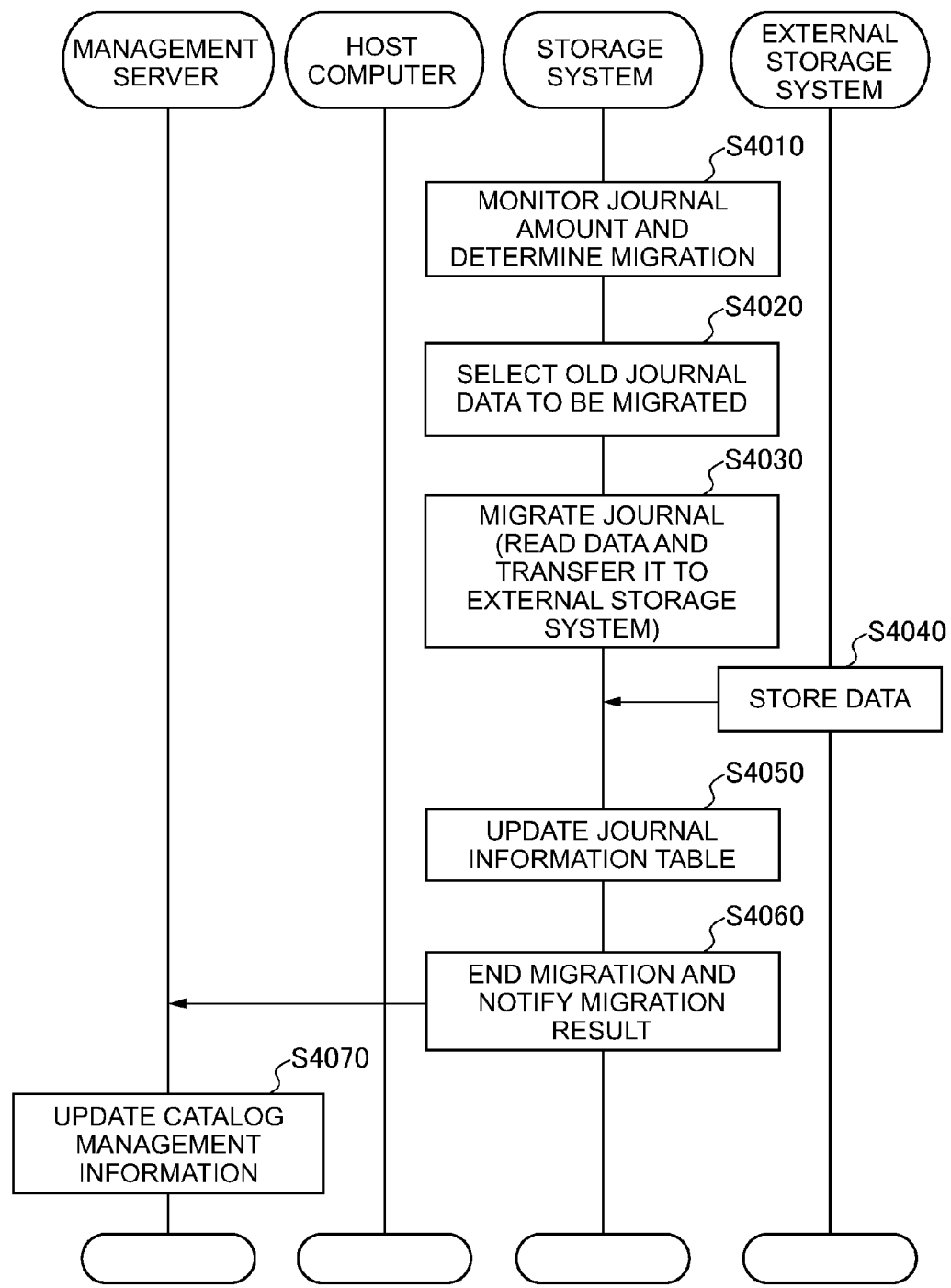
FIG. 13 is a flowchart showing another example of processing for migrating journal data to an external storage system to be executed according to the first embodiment of the present invention.

FIG. 13 is a flowchart showing another example of processing for migrating journal data to an external storage system to be executed according to the first embodiment of the present invention.

FIG. 13 is a modified example of the processing shown in FIG. 11 and FIG. 12. In FIG. 11 and FIG. 12, the management server 111 determined whether to migrate the journal data, and selected the journal data to be migrated and the migration destination. Meanwhile, in FIG. 13, the first storage system 125 determines whether to migrate the journal data, and selects the journal data to be migrated and the migration destination. The processing illustrated in FIG. 13 is now explained.

Foremost, the migration availability determination program 203 of the first storage system 125 determines whether it is necessary to migrate journal data to an external storage system (S4010). This determination may be executed according to the same processing as S3010 of FIG. 12.

Subsequently, the migration target decision program 204 of the first storage system 125 selects the journal data to be migrated (S4020). This selection may be executed according to the same processing as S3020 of FIG. 12.

Subsequently, the journal backup program of the first storage system 125 migrates the selected journal data to the selected migration destination (S4030). This migration may be executed according to the same processing as S3050 of FIG. 12.

The second storage system 161 stores the sent journal data in the designated migration destination according to a command sent from the first storage system 125 (S4040). When this storage is complete, the second storage system 161 sends a storage completion report to the first storage system 125.

When the journal management program 205 of the first storage system 125 receives the foregoing report, it updates the journal information table 224 (S4050). Specifically, the identifier of the P-VOL corresponding to the migrated journal data is stored as the P-VOL #461. The value of the created time 434 corresponding to the migrated journal data is stored as the snapshot acquired time 462. The time that the storage of S3060 was executed is stored as the backup acquired time 463.

Moreover, after confirming that the sent journal data has been stored in the second storage system 161, the first storage system 125 deletes the designated journal data from the journal-related area 188.

Subsequently, the first storage system 125 sends a journal data migration completion report to the management server 111 (S4060).

When the catalog management program 303 of the management server 111 receives the report at S4060, it updates the catalog management information table 311 so as to reflect the journal data migration executed from S4030 to S4040 (S4070). This update may be executed according to the same processing as S3080 of FIG. 12.

The processing for migrating journal data to an external storage system is thereby complete.

Figure 14:
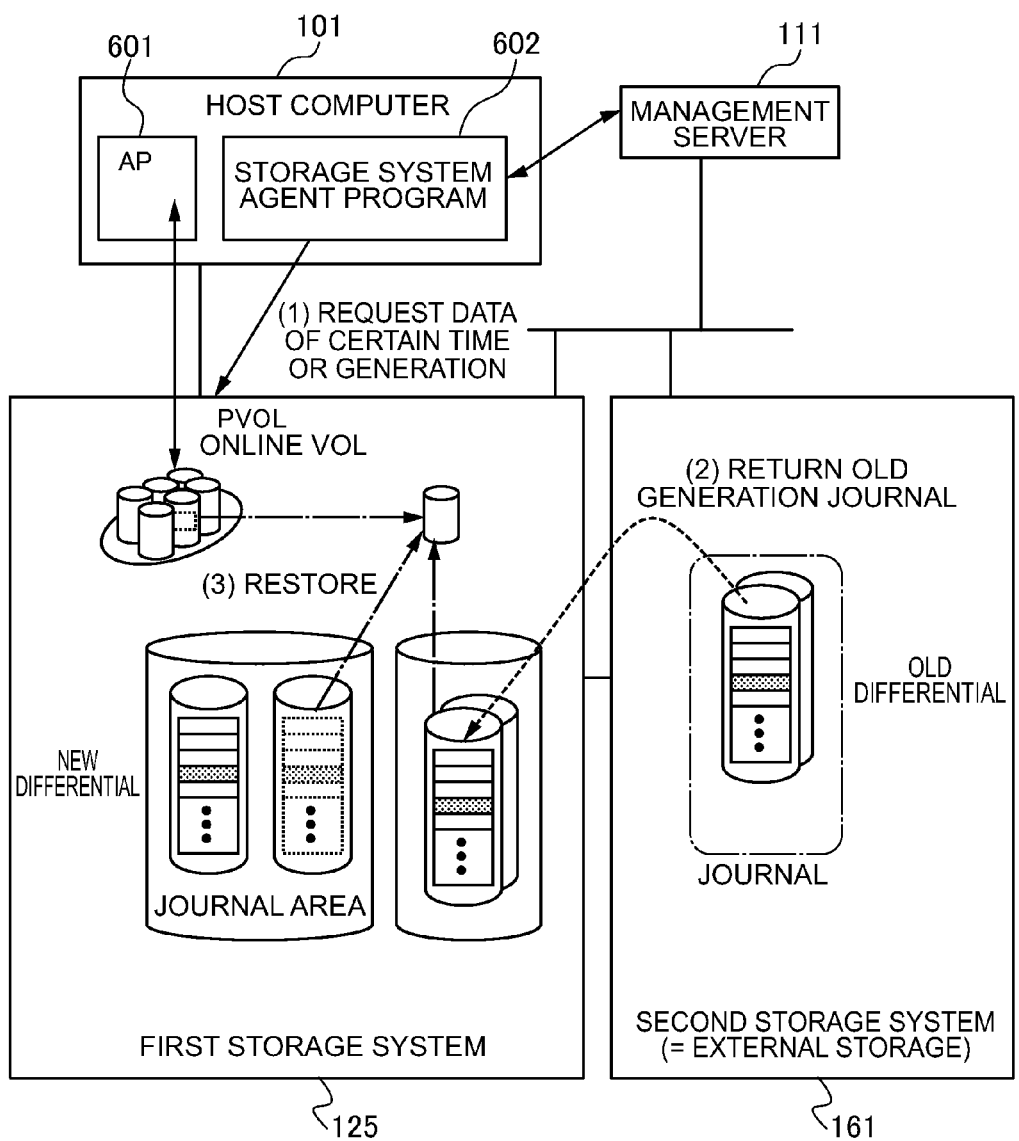
FIG. 14 is an explanatory diagram showing the outline of processing for restoring journal data from an external storage system to be executed according to the first embodiment of the present invention.

FIG. 14 is an explanatory diagram showing the outline of processing for restoring journal data from an external storage system to be executed according to the first embodiment of the present invention.

If journal data is migrated to the external storage system according to the method shown in FIG. 11 to FIG. 13, in order to restore the P-VOL of the intended generation using that journal data, it is necessary to return the migrated journal data to the first storage system 125. The outline of the processing for returning the migrated journal data is now explained with reference to FIG. 14.

Foremost, the management server 111 requests the host computer 101 to send data of the logical volume of a certain generation (or time). More specifically, the management server 111 requests for the data that was stored in the P-VOL of a certain generation in the past, and not in the current P-VOL.

The host computer 101 sends the request received from the management server 111 to the first storage system 125.

If it is necessary to use the journal data stored in the external storage system (i.e., second storage system 161) in order to restore the requested generation, the first storage system 125 requests the second storage system 161 to send the necessary journal data. Then, first storage system 125 uses the journal data that was sent according to that request, restores the logical volume of the requested generation, and returns the requested data.

Figure 15:
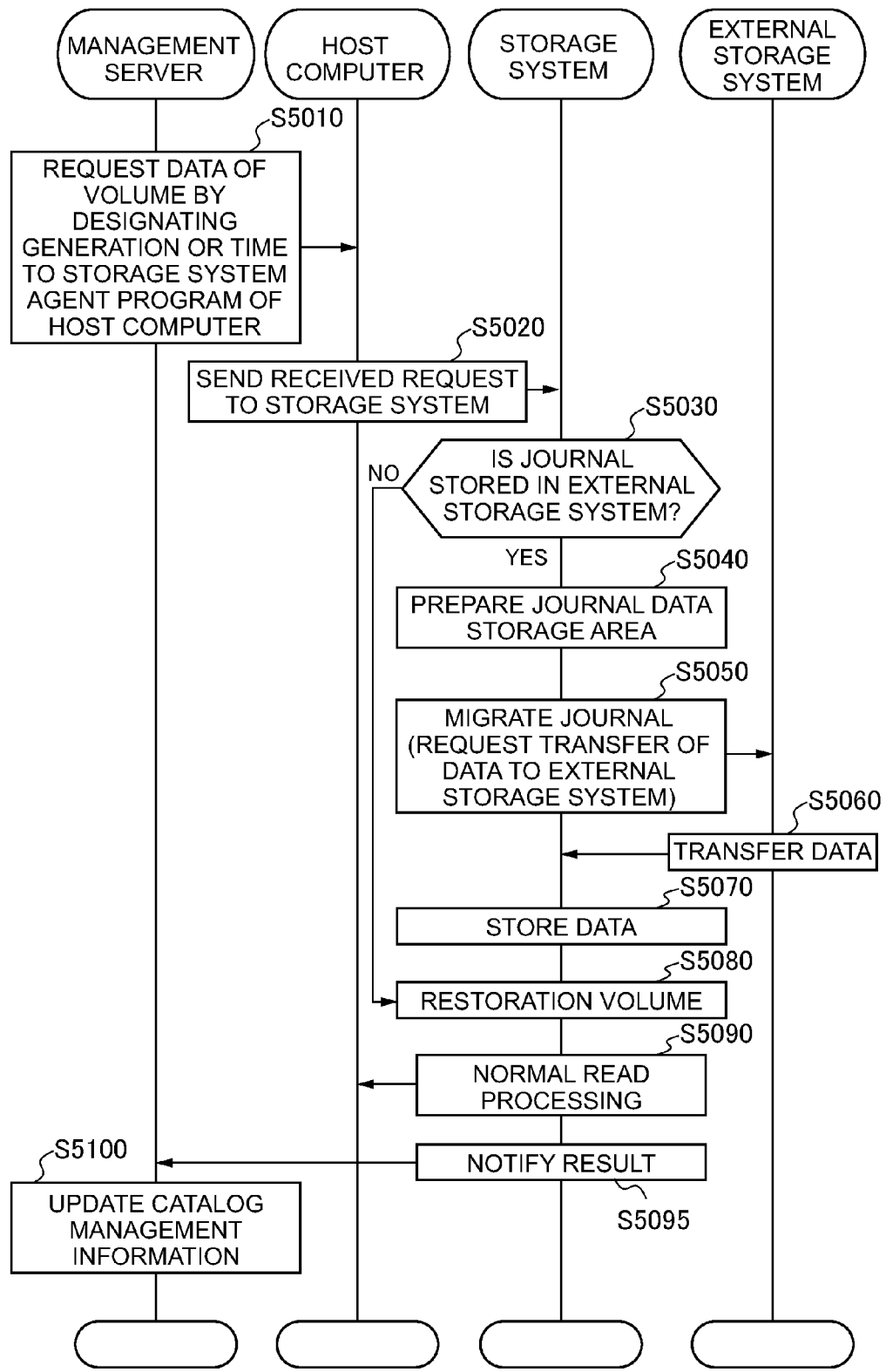
FIG. 15 is a flowchart showing the processing for restoring journal data from an external storage system to be executed according to the first embodiment of the present invention.

FIG. 15 is a flowchart showing the processing for restoring journal data from an external storage system to be executed according to the first embodiment of the present invention.

FIG. 15 is a diagram showing the details of the processing illustrated in FIG. 14.

Foremost, the management server 111 requests the host computer 101 to send data of a logical volume of a certain generation (or time) (S5010). More specifically, the management server 111 requests for the data stored in the P-VOL of a certain generation in the past, and not in the current P-VOL.

The host computer 101 sends the request received from the management server 111 to the first storage system 125 (S5020).

The first storage system 125 that received the request from the host computer 101 determines whether the journal data that is necessary for restoring the requested generation is stored in the second storage system 161 (S5030).

Where the journal data is stored can be known by referring to the catalog management information table 311. For example, the management server 111 may send the information showing the location of the journal data that is necessary for restoring the requested generation by including such information in the request of S5010. In the foregoing case, the first storage system 125 is able to determine whether the necessary journal data is stored in the second storage system 161 based on the sent request.

Otherwise, the first storage system 125 may also make an inquiry to the management server 111 regarding the location of the necessary journal data.

Otherwise, the first storage system 125 may also retain information that is equivalent to the catalog management information table 311 in the control memory 145. In the foregoing case, the first storage system 125 may execute the determination at S5030 based on the information retained in the control memory 145.

If it is determined that the necessary journal data is stored in the second storage system 161, it is necessary to copy the necessary journal data from the second storage system 161 to the first storage system 125. Thus, the first storage system 125 foremost allocates an area for storing the necessary journal data in the first storage system 125 (S5040).

Subsequently, the first storage system 125 requests the second storage system 161 to transfer the necessary journal data (S5050).

The second storage system 161 that received the foregoing request reads the requested journal data and sends it to the first storage system 125 (S5060).

The first storage system 125 stores the journal data received from the second storage system 161 in the area that was allocated at S5040 (S5070).

Subsequently, the first storage system 125 uses the necessary journal data and restores the P-VOL of the requested generation (S5080).

Meanwhile, if it is determined at S5030 that the necessary journal data is not stored in the second storage system 161 (that is, the necessary journal data is stored in the first storage system 125), the first storage system 125 executes S5080 without executing S5040 to S5070.

Subsequently, the first storage system 125 executes normal read processing to the restored P-VOL for reading the requested data, and sends the read data to the host computer 101 (S5090).

Moreover, the first storage system 125 sends information for notifying that the journal data has been migrated based on S5060 and S5070 to the management server 111 (S5095).

The catalog management program of the management server 111 updates the catalog management information table 311 in order to reflect the migration of the journal data based on S5060 and S5070 (S5100).

The processing for restoring journal data from an external storage system is thereby complete.

For instance, in the example illustrated in FIG. 9, a case where the data stored in the P-VOL 187P of the generation N was requested is now explained. In the foregoing case, if journal data of one or more generations including the journal data (journal data elements 2702A and 2702B in the example of FIG. 9) corresponding to at least the generation N+1 is stored in the second storage system 161, such journal data is transferred from the second storage system 161 to the first storage system 125 (S5060), and then stored (S5070).

By reflecting the journal data of one or more generations including the journal data corresponding to at least the generation N+1 in the current (i.e., online) P-VOL 187P, the first storage system 125 restores the data stored in the P-VOL 187P of the generation n (S5080), and executes the read processing (S5090).

According to FIG. 11 to FIG. 13 described above, only the journal data is migrated to the external storage system. Thus, in order to restore a logical volume using the journal data that was migrated to the external storage system, it was necessary to copy (i.e., return) that journal data to the first storage system.

Meanwhile, a replication of the P-VOL (provided that this is a replication of the P-VOL of a certain generation that was restored and not a replication of the current (i.e., online) P-VOL) may also be stored in the external storage system as the migration destination of the journal data. This kind of migration of the P-VOL replication is now explained with reference to FIG. 16 and other diagrams.

Figure 16:
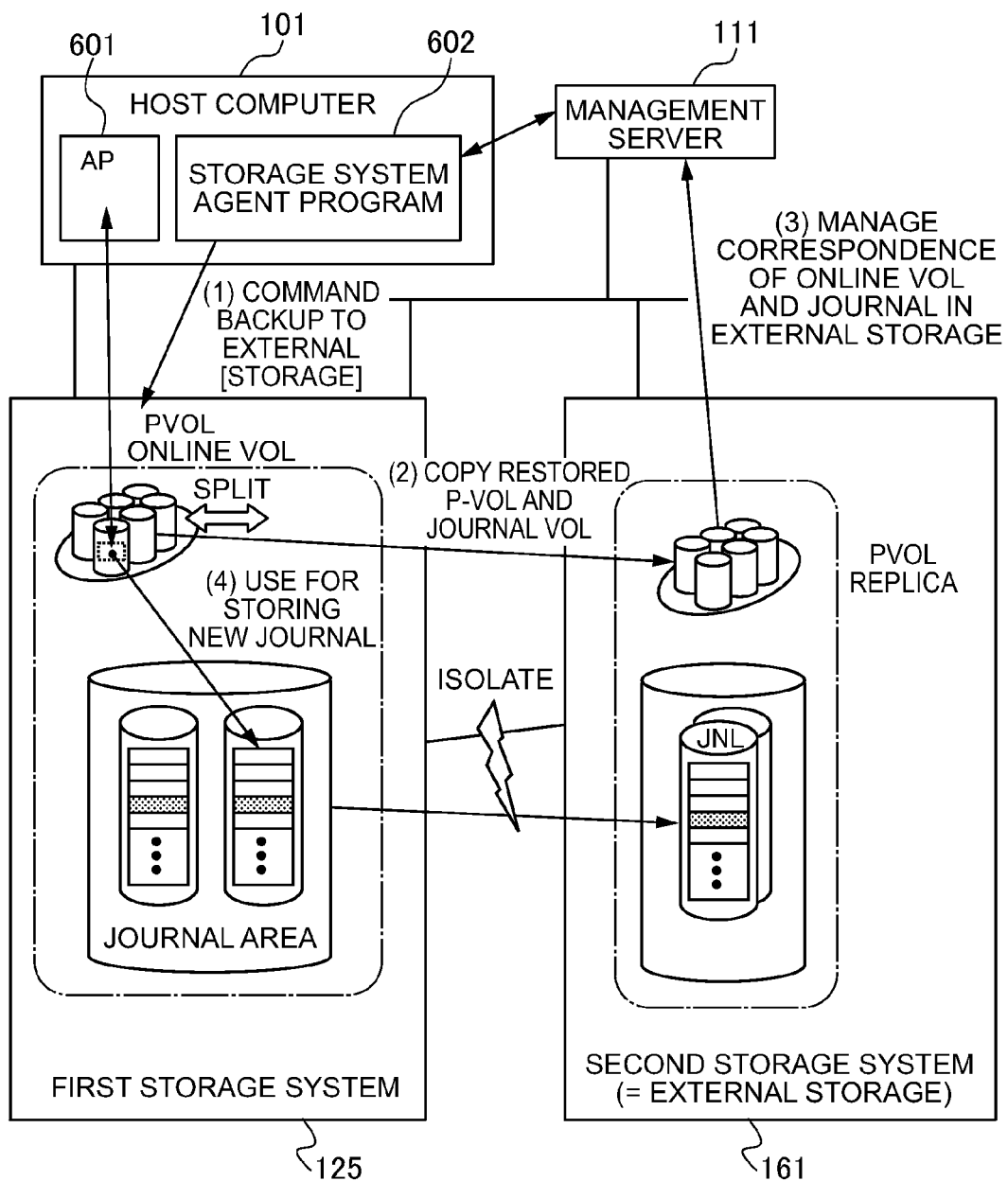
FIG. 16 is an explanatory diagram showing the outline of processing for migrating data to an external storage system to be executed according to the first embodiment of the present invention.

FIG. 16 is an explanatory diagram showing the outline of processing for migrating data to an external storage system to be executed according to the first embodiment of the present invention.

In the example illustrated in FIG. 16, as with the case of FIG. 11 and FIG. 12, if a prescribed condition is satisfied, the management server sends a journal data migration command to the storage system agent program 602 of the host computer 101.

The host computer 101 sends the journal data migration command to the first storage system 125.

The first storage system 125 sends a replication of the journal data (for instance, the oldest generation journal data) designated in the received command to the second storage system 161.

In addition, the first storage system 125 uses the sent journal data and sends a replication of the P-VOL that is necessary to restore the P-VOL.

The second storage system 161 stores the received replication of the journal data and the P-VOL.

When the replication of the journal data is stored in the second storage system 161, the first storage system 125 deletes the designated journal data from the journal-related area 188 of the first storage system 125. The area that became free as a result of the foregoing deletion can be used for storing journal data of a new generation.

Moreover, in the example illustrated in FIG. 16, the second storage system 161 can be isolated from the first storage system 125 after the replication of the journal data and the P-VOL is stored in the second storage system 161. Even if the second storage system 161 is isolated from the first storage system 125, the P-VOL can be restored by using only the data stored in the second storage system 161 (refer to FIG. 19A to FIG. 19D, etc.).

Figure 17:
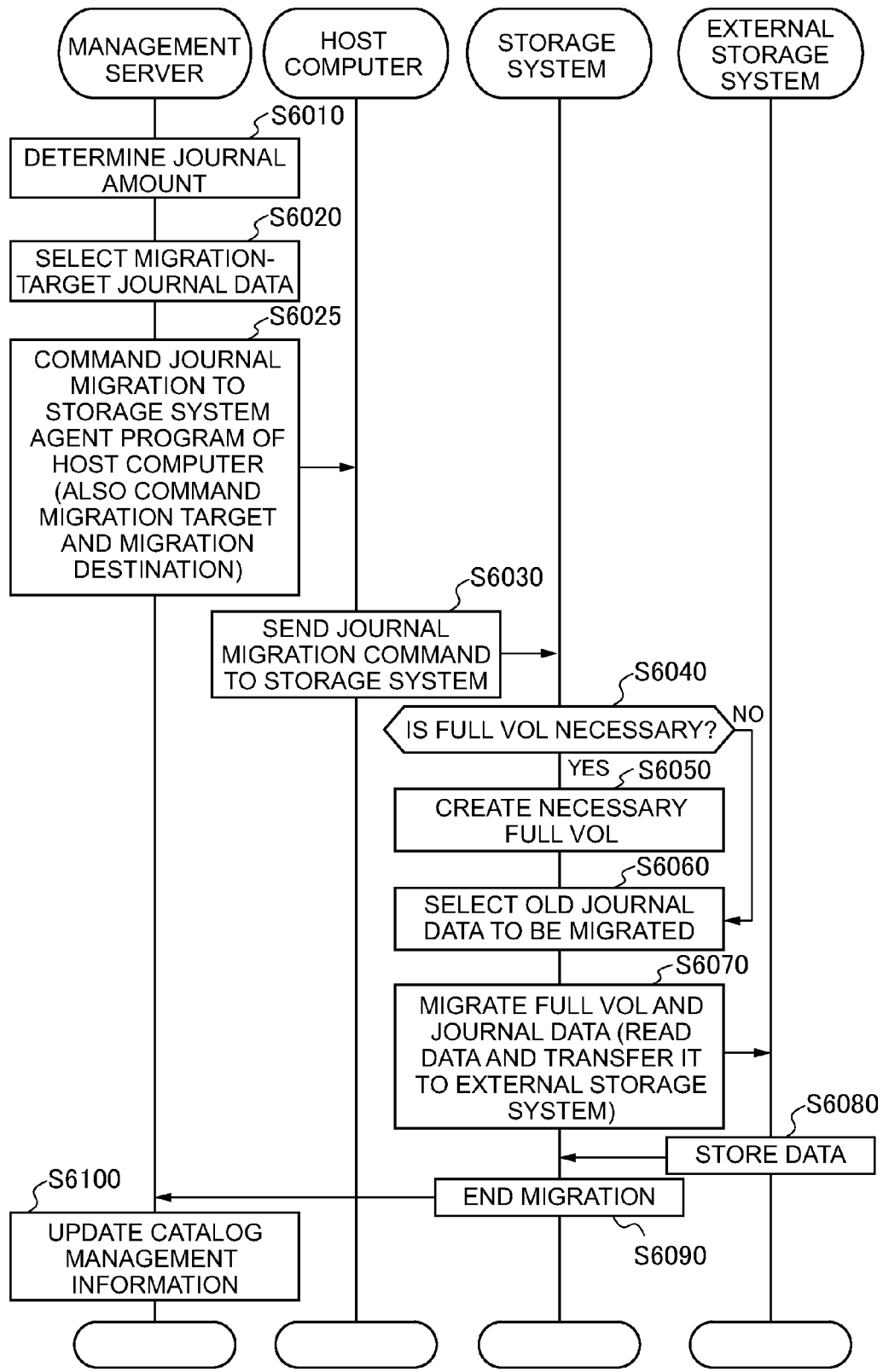
FIG. 17 is a flowchart showing the processing for migrating data to an external storage system to be executed according to the first embodiment of the present invention.

FIG. 17 is a flowchart showing the processing for migrating data to an external storage system to be executed according to the first embodiment of the present invention.

FIG. 17 is a diagram showing the details of the processing illustrated in FIG. 16.

Foremost, the migration availability determination program 301 of the management server 111 determines whether it is necessary to migrate journal data to an external storage system (S6010). This determination may be executed according to the same processing as S3010 of FIG. 12.

If it is determined at S3010 that a prescribed condition is satisfied (that is, if it is necessary to migrate journal data to an external storage system), the migration target decision program 302 of the management server 111 selects the journal data to be migrated and its migration destination (S6020). This selection may be executed according to the same processing as S3020 of FIG. 12.

Subsequently, the management server 111 sends a journal data migration command to the host computer 101 (S6025). The journal data migration command includes the designation of the journal data to be migrated and the migration destination (that is, the journal data and migration destination selected at S6020).

The host computer 101 sends the journal data migration command received from the management server 111 to the first storage system 125 (S6030).

When the first storage system 125 receives the command at S6030, it determines whether it is necessary to create (i.e., restore) the P-VOL (S6040). This determination is now explained.

Figure 18:
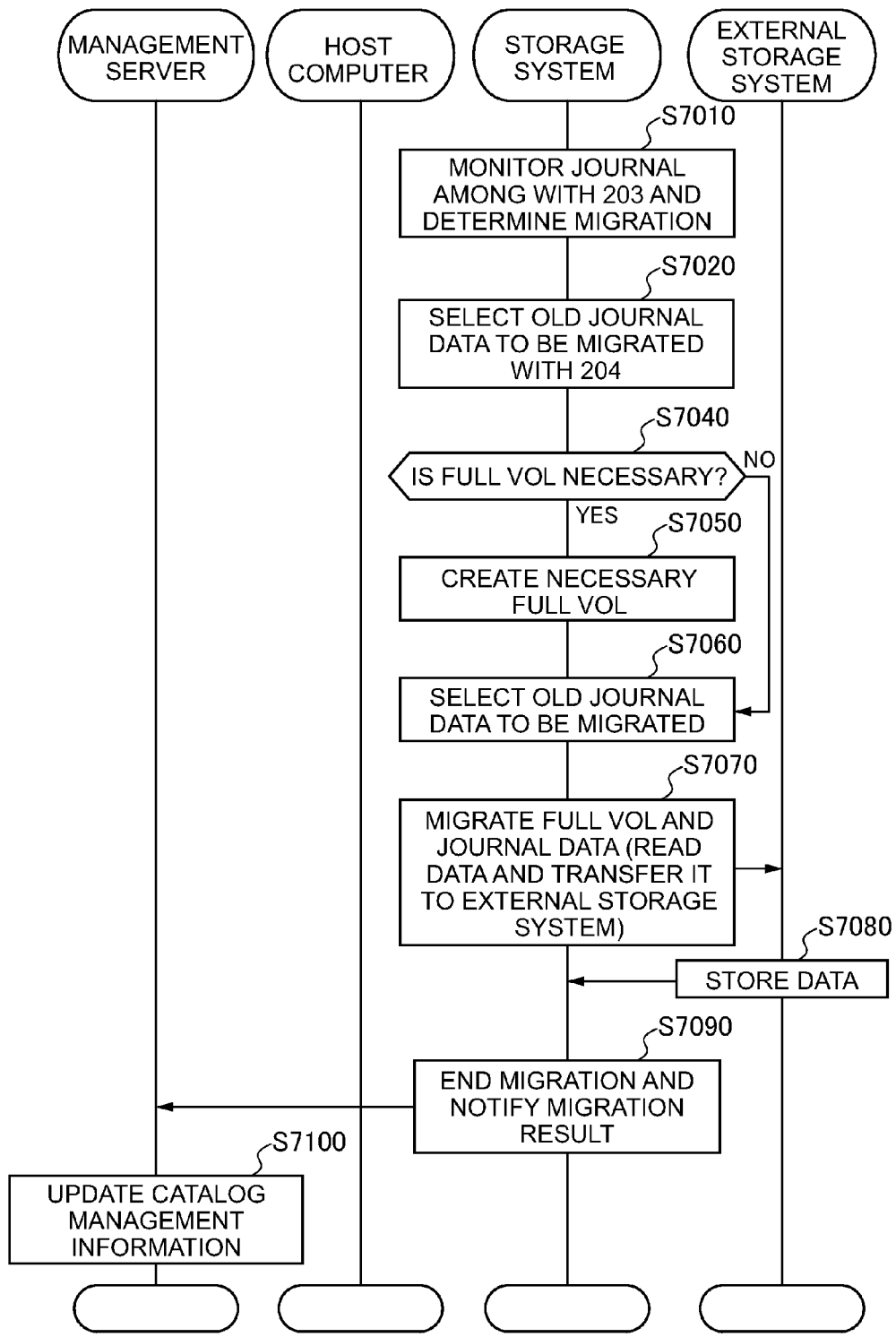
FIG. 18 is a flowchart showing another example of processing for migrating data to an external storage system to be executed according to the first embodiment of the present invention.

With the processing illustrated in FIG. 18, in addition to the journal data, a replication of the separate P-VOL that is necessary for restoring the P-VOL using that journal data is also migrated to the external storage system.

For example, in FIG. 9, when migrating the journal data of the generation N+1; that is, the journal data elements 2702A and 2702B, in order to restore the P-VOL 187P of the generation N using the foregoing journal data, the P-VOL 187P of the generation N+1 is necessary. This is because the P-VOL 187P of the generation N is restored by respectively substituting the data 2701E and 2701F of the P-VOL 187P of the generation N+1 with the journal data elements 2702A and 2702B.

Accordingly, if the command at S6030 designates the journal data of the generation N+1 as the journal data to be migrated, it is determined at S6040 regarding whether it is necessary to create the P-VOL 187P of the generation N+1.

For example, if the P-VOL 187P of the generation N+1 has already been created, it may be determined that it is not necessary to create the P-VOL 187P of the generation N+1, and, if the P-VOL 187P of the generation N+1 has not yet been created, it may be determined that it is necessary to create the P-VOL 187P of the generation N+1.

Otherwise, if the P-VOL 187P of the generation N+1 has already been copied to the second storage system 161, it may be determined that it is not necessary to create the P-VOL 187P of the generation N+1. Meanwhile, if the P-VOL 187P of the generation N+1 has not yet been copied to the second storage system 161 and the P-VOL 187P of the generation N+1 has not yet been created, it may be determined that it is necessary to create the P-VOL 187P of the generation N+1.

Incidentally, in the example illustrated in FIG. 9, if the journal data (i.e., journal data elements 2702C and 2702E) of the generation N+2 is also designated as journal data to be migrated in addition to the journal data of the generation N+1, the P-VOL that is necessary for restoring the P-VOL using such journal data is only the P-VOL 187P of the generation N+2. This is because the P-VOL 187P of the generation N+1 can be restored by substituting the data of the P-VOL 187P of the generation N+2 with the journal data of the generation N+2, and the P-VOL 187P of the generation N can be restored by substituting the P-VOL 187P of the restored generation N+1 with the journal data of the generation N+1.

If it is determined at S6040 that it is necessary to create the P-VOL, the first storage system 125 restores the P-VOL that was determined as necessary (S6050). This restoration is executed as explained with reference to FIG. 9.

Meanwhile, if it is determined at S6040 that it is not necessary to create the P-VOL, S6050 is not executed, and the processing proceeds to S6060.

Subsequently, the first storage system 125 selects the journal data that was designated as the migration target (S6060). Specifically, the journal data designated in the command at S6030 (that is, the journal data selected at S6020) is selected.

Subsequently, the first storage system 125 reads the selected journal data and all data of the P-VOL that was created at S6050, and sends such journal data and data to the second storage system 161 (S6070). If it is determined at S6040 that it is not necessary to create the P-VOL, all data of the previously created P-VOL is read and sent.

The second storage system 161 that received the data sent at S6070 stores the received P-VOL data and journal data. For example, the second storage system 161 may store the received P-VOL data in a logical volume designated as the migration destination, and store the received journal data in the journal-related area 188 that is related to that free logical volume. After this storage is complete, the second storage system 161 sends a storage completion report to the first storage system 125.

When the first storage system 125 confirms that the sent journal data has been stored in the second storage system 161 based on the foregoing report, it sends a journal data migration completion report to the management server 111 (S6090).

Moreover, after the first storage system 125 confirms that the sent journal data has been stored in the second storage system 161, it deletes the designated journal data from the journal-related area 188.

Further, the journal management program 205 of the first storage system 125 updates the journal information table 224. This update may be executed according to the same processing as S3080 of FIG. 12. In addition, the journal management program 205 in the example of FIG. 18 also updates the P-VOL/journal pair information table 225.

When the catalog management program 303 of the management server 111 receives the report of S6090, it updates the catalog management information table 311 so as to reflect the journal data migration that was executed from S6070 to S6080 (S6100). This update may also be executed according to the same processing as S3080 of FIG. 12.

The processing for migrating data to an external storage system is thereby complete.

FIG. 18 is a flowchart showing another example of processing for migrating data to an external storage system to be executed according to the first embodiment of the present invention.

FIG. 18 is a modified example of the processing shown in FIG. 16 and FIG. 17. In FIG. 16 and FIG. 17, the management server 111 determined whether to migrate journal data and selected the journal data to be migrated and the migration destination. Meanwhile, in FIG. 18, the first storage system 125 determines whether to migrate journal data, and selects the journal data to be migrated and the migration destination. The processing illustrated in FIG. 18 is now explained.

Foremost, the migration availability determination program 203 of the first storage system 125 determines whether it is necessary to migrate journal data to an external storage system (S7010). This determination may be executed according to the same processing as S6010 of FIG. 17.

Subsequently, the migration target decision program 204 of the first storage system 125 selects the journal data to be migrated (S7020). This selection may be executed according to the same processing as S6020 of FIG. 17.

Since subsequent processing from S7040 to S7100 is respectively the same as the processing from S6040 to S6100, the explanation thereof is omitted. When S7100 is completed, the processing for migrating data to the external storage system is complete.

As shown in FIG. 16 to FIG. 18, by also migrating a replication of the P-VOL of a certain point in time to the external storage system in addition to the journal data, it is possible to restore the P-VOL using only the data stored in the external storage system. Consequently, it is possible to isolate the second storage system 161 from the first storage system 125. This isolation may be executed by disconnecting the physical connection between the second storage system 161 and the first storage system 125, or be cancelling the external connection setting of the second storage system 161 to the first storage system 125.

The second storage system 161 isolated from the first storage system 125 may be directly connected to a new host computer. This host computer may be the host computer 101 connected to the first storage system, or it may be a different computer. Otherwise, the second storage system 161 may also be externally connected to a storage system (for instance, the third storage system 2201 shown in FIG. 22 described later) other than the first storage system.

In any case, the second storage system is able to provide the P-VOL of any one of the restored generations using the data that was migrated from the first storage system directly, or via the third storage system 2201, to the host computer.

FIG. 19A to FIG. 19D are explanatory diagrams showing the modes of isolating the storage system according to the first embodiment of the present invention.

Figure 19A:
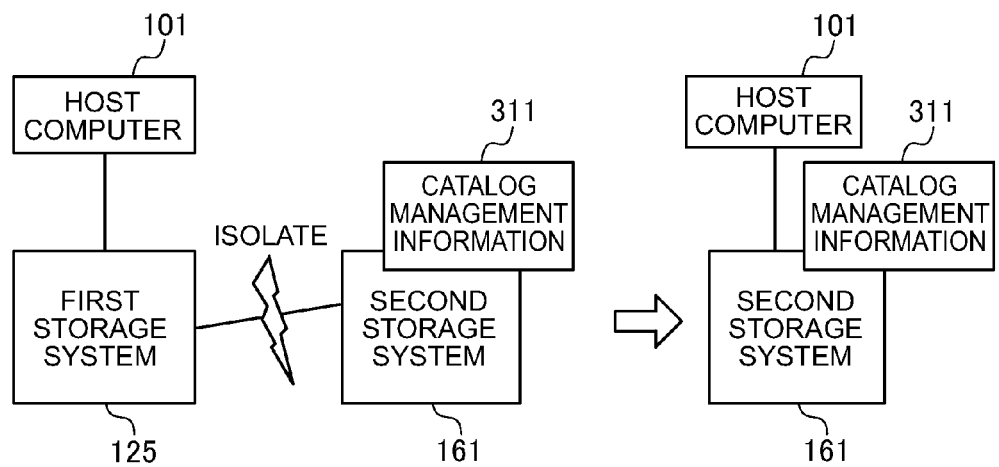
FIG. 19A is an explanatory diagram showing the first type of isolation of the storage system according to the first embodiment of the present invention.

The example illustrated in FIG. 19A shows a case where the second storage system 161 comprises functions that are equivalent to the first storage system 125, and additionally retains information (in FIG. 19A to FIG. 19D, this is referred to as the "catalog management information table 311") that is equivalent to the catalog management information table 311. In the foregoing case, a host computer 101 can be newly connected to the second storage system 161 (that is, without going through another storage system). Here, the second storage system 161 is able to provide to the host computer 101 the P-VOL that was restored using the catalog management information table 311, the P-VOL replication that was migrated from the first storage system 161, and the journal data.

Figure 19B:
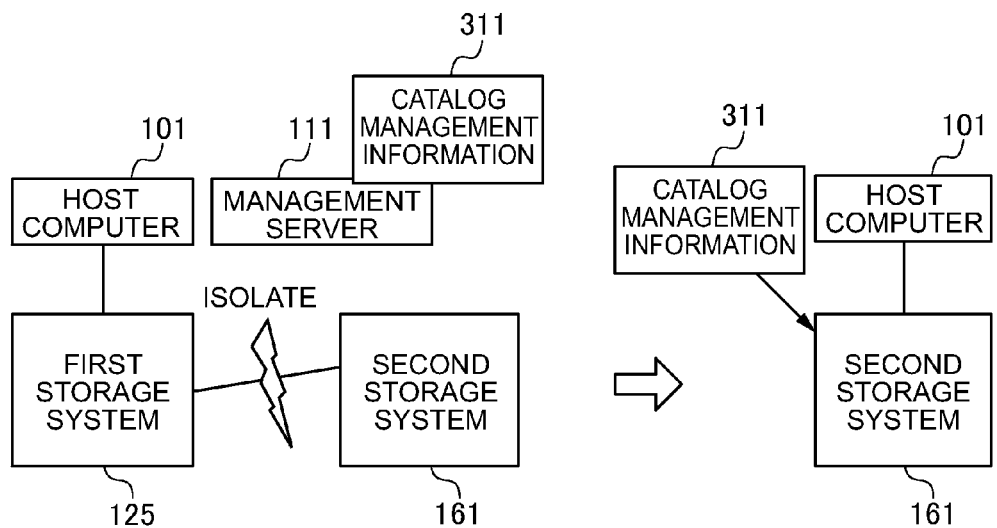
FIG. 19B is an explanatory diagram showing the second type of isolation of the storage system according to the first embodiment of the present invention.

In the example illustrated in FIG. 19B, although the second storage system 161 comprises functions that are equivalent to the first storage system 125, it does not retain the catalog management information table 311. In the foregoing case, by copying the catalog management information table 311 from the management server 111 to the second storage system 161, as with the case depicted in FIG. 19A, the second storage system 161 is able to provide the restored P-VOL to the host computer 101.

Figure 19C:
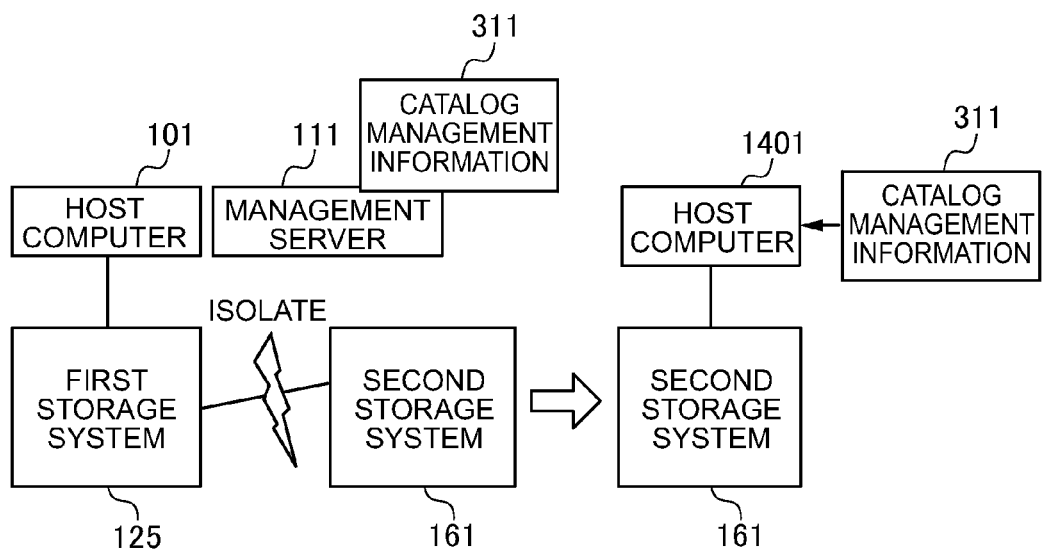
FIG. 19C is an explanatory diagram showing the third type of isolation of the storage system according to the first embodiment of the present invention.

The example illustrated in FIG. 19C shows a case where, after the second storage system 161 is isolated from the first storage system 125, it is connected to a host computer 1401 that is different from the host computer 101. In this example, the second storage system 161 does not comprise functions that are equivalent to the first storage system. In the foregoing case, as a result of the host computer 1401 retaining the catalog management information table 311, as with the case depicted in FIG. 19A, the second storage system 161 is able to provide the restored P-VOL to the host computer 1401.

The catalog management information table 311 may also be copied from the management server 111 to the host computer 1401. In the foregoing case, the host computer 1401 receives a request for reading data stored in the P-VOL of one of the generations. This read request may be sent from the management server 111, input by the user into the host computer 1401, or issued by the application program 601.

The host computer 1401 sends the received read request to the second storage system 161. The second storage system 161 that received the read request identifies the logical volume storing the P-VOL replication that is necessary for restoring data of the P-VOL of the requested generation, and the logical volume storing the journal data that is necessary for such restoration. This identification may be executed according to any one of the following methods.

For example, the host computer 1401 may identify the logical volume storing the P-VOL replication that is necessary for restoring data of the P-VOL of the requested generation, and the logical volume storing the journal data that is necessary for such restoration based on the catalog management information table 311, and send the designation of the identified logical volume by including it in the read request.

Otherwise, the second storage system 161 that received the read request may acquire the necessary information within the catalog management information table 311 (or the entire catalog management information table 311) from the host computer 1401, and identify the foregoing logical volumes based on such acquired information.

Figure 19D:
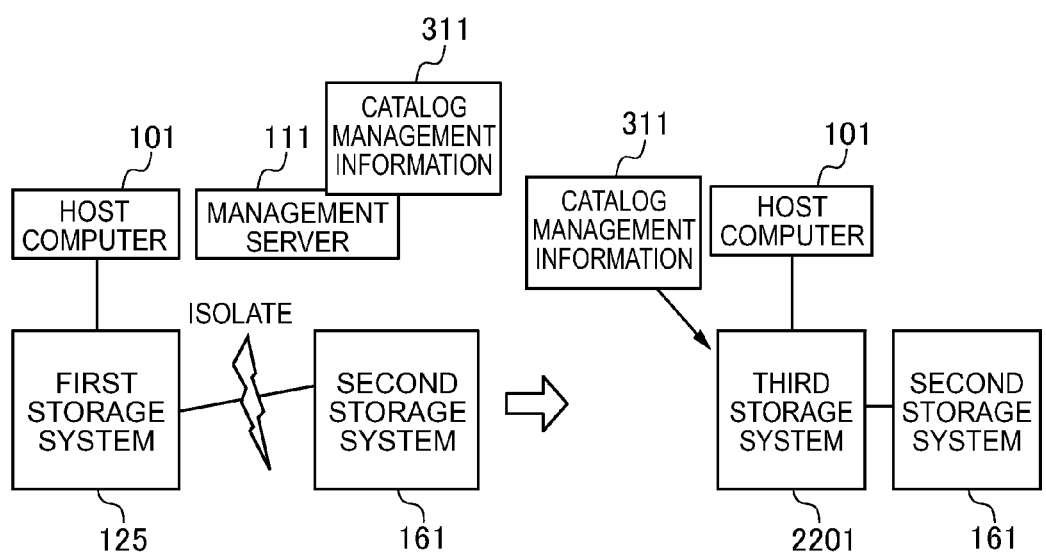
FIG. 19D is an explanatory diagram showing the fourth type of isolation of the storage system according to the first embodiment of the present invention.

In the example illustrated in FIG. 19D, the second storage system 161 is newly externally connected to the third storage system 2201 comprising functions that are equivalent to the first storage system 125. In the foregoing case, as a result of the third storage system 2201 retaining the catalog management information table 311, the second storage system 161 is able to provide the restored P-VOL to the host computer 101 via the third storage system 2201.

Incidentally, the example of restoring the P-VOL with the connection shown in FIG. 19D will be described later (refer to FIG. 22, etc.).

Figure 20:
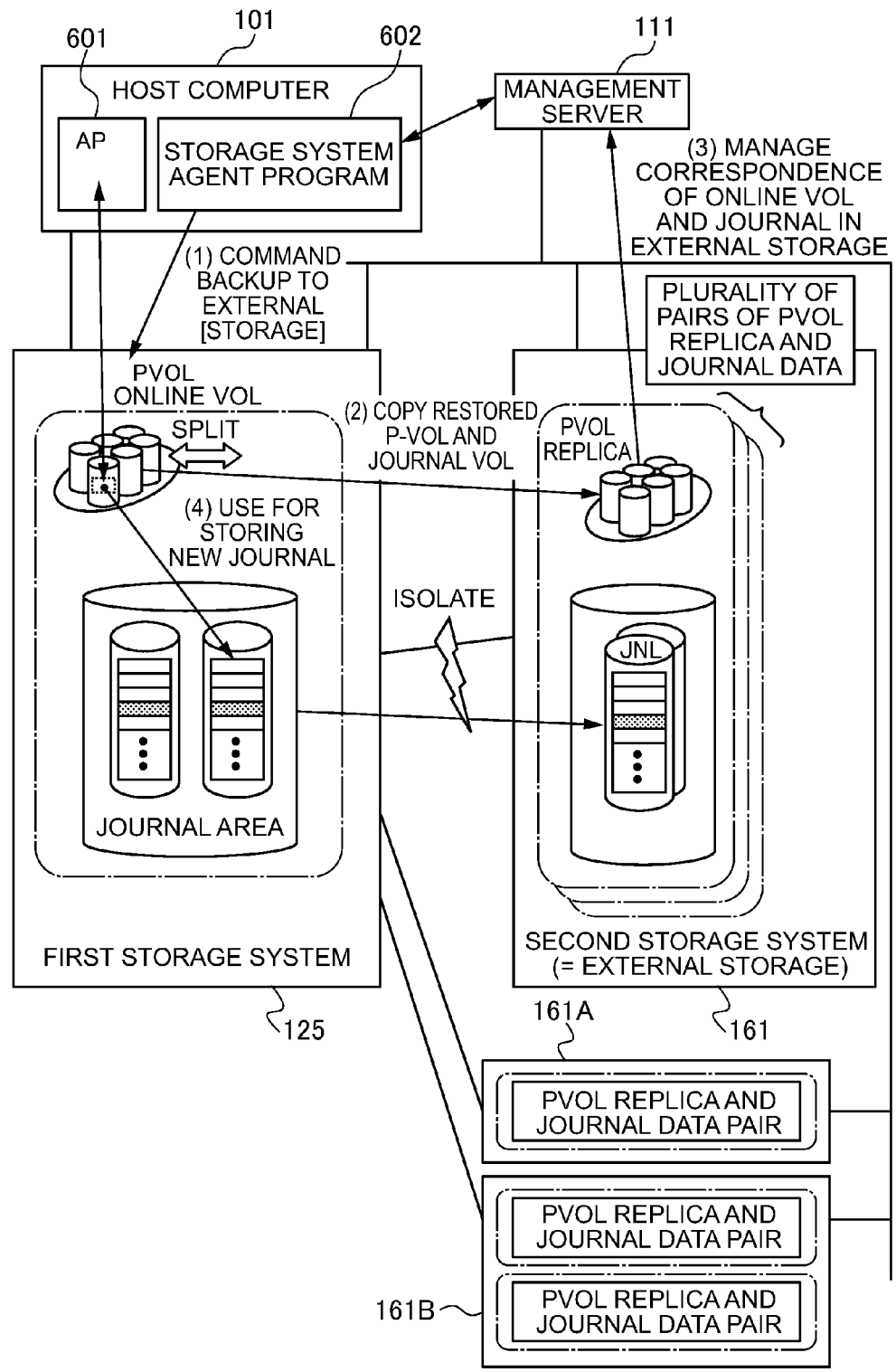
FIG. 20 is an explanatory diagram showing yet another example of processing for migrating data to an external storage system to be executed according to the first embodiment of the present invention.

FIG. 20 is an explanatory diagram showing yet another example of processing for migrating data to an external storage system to be executed according to the first embodiment of the present invention.

If the processing shown in FIG. 16 is repeatedly executed, there may be cases where a plurality of pairs configured from the journal data and the replication (replica) of the P-VOL that is necessary for restoring such journal data are stored in the second storage system 161 (refer to second storage system 161 of FIG. 20).

Otherwise, there may be cases where a plurality of external storage systems are connected to the first storage system 125. In the example illustrated in FIG. 20, the external storage systems 161A and 161B are externally connected to the first storage system 125 in addition to the second storage system 161. Incidentally, the external storage systems 161A and 161B may be configured the same as the second storage system 161.

In the foregoing case, if the processing shown in FIG. 16 is executed to each external storage system, there may be cases where one or more pairs configured from the journal data and the P-VOL replica are stored in each external storage system. Here, if the data of the P-VOL replica is substituted with the journal data belonging to a pair that is different from the pair to which that P-VOL replica belongs in order to restore the P-VOL of a certain generation, a wrong P-VOL will be restored.

In order to prevent this kind of erroneous restoration, it is necessary to manage the pair configured from the journal data and the P-VOL replica. Thus, the previous explained P-VOL/journal pair information table 225 is used (refer to FIG. 4E).

In the P-VOL/journal pair information table 225, the P-VOL #471 is an identifier of the online P-VOL of the replication source; that is, an identifier of the P-VOL that is stored in the first storage system 125 in the example illustrated in FIG. 20.

The replicated P-VOL #473 is an identifier of the replicated P-VOL (replication of the P-VOL created according to the processing shown in FIG. 16 based on the P-VOL and journal data stored in the first storage system 125) that was derived from the P-VOL stored in the first storage system 125.

The journal VOL #475 is an identifier of the logical volume storing the journal data belonging to the pair to which the replicated P-VOL that is identified with the replicated P-VOL #473 belongs.

FIG. 21 is an explanatory diagram showing a specific example of processing for migrating data to an external storage system to be executed according to the first embodiment of the present invention.

Foremost, a case where an After Journal is created is explained.

For example, if the current date and time is the point in time that April 30 has ended (that is, May 1 midnight), it is possible to restore the P-VOL 187P1 at the point in time that March 31 has ended (that is, April 1 midnight) by reflecting the journal data that was created during April 1 to April 30 among the journal data 233 in the current (i.e., online) P-VOL 187P (refer to FIG. 21A).

Subsequently, the first storage system 125 copies the journal data that was created during April 1 to April 30 among the journal data 233 as the journal data 233S1 to the second storage system 161, and additionally copies the restored P-VOL 187P1 as the P-VOL 187S to the second storage system 161.

Consequently, even if the second storage system 161 is isolated from the first storage system 125, it is possible to at least provide the P-VOL 187S of April 1 midnight and the P-VOL of May 1 midnight that is created by reflecting the journal data 233S1 therein.

The journal data that was created during April 1 to April 30 among the journal data 233 and the restored P-VOL 187P1 are deleted from the first storage system 125. Consequently, since free capacity in the first storage system 125 will increase, journal data of a new generation can be additionally stored.

After the lapse of another month, the first storage system 125 copies the journal data that was created during May 1 to May 31 among the journal data 233 as the journal data 233S2 to the second storage system 161 (refer to FIG. 21B). In the foregoing case, it is not necessary to additionally copy the restored P-VOL. This is because, as shown in FIG. 21A, since the P-VOL 187S of April 1 midnight and the journal data 233S1 that was created during April 1 to April 30 have already been stored, it is possible to restore the P-VOL of June 1 midnight by using the foregoing P-VOL 187S and the journal data 233S1, and the journal data 233S2.

However, when copying the journal data 233S2, if the P-VOL 187S and the journal data 233S1 are not stored in the second storage system 161, the first storage system 125 needs to restore the P-VOL of May 1 midnight and copy it to the second storage system 161 according to the same routine as FIG. 21A.

Otherwise, as shown in FIG. 21B, even in cases where the P-VOL 187S, the journal data 233S1 and the journal data 233S2 are stored in the second storage system 161, if the current date and time is August 1 midnight and the journal data 233 that was created during June 1 to June 30 has already been deleted from both the first storage system 125 and the second storage system 161, it is necessary to restore and copy the P-VOL according to the same routine as FIG. 21A.

Specifically, in the foregoing case, the first storage system 125 restores the P-VOL (not shown) of July 1 midnight and copies it to the second storage system 161 by reflecting the journal data 233 that was created during July 1 to July 31 in the online P-VOL 187P. Moreover, the journal data 233 that was created during July 1 to July 31 is also copied to the second storage system 161. In the foregoing case, the P-VOL replication of July 1 midnight and the journal data 233 that was created during July 1 to July 31 are managed as one pair (pair 2101B in the example of FIG. 21B) in the second storage system. Meanwhile, the P-VOL 187S, the journal data 233S1 and the journal data 233S2 are managed as a separate pair (pair 2101A in the example of FIG. 21B).

A case of creating a Before Journal is now explained.

For example, if the current date and time is May 11 midnight, it is possible to restore the P-VOL 187P1 at the point in time that April 30 has ended (that is, May 1 midnight) by reflecting the journal data (not shown) that was created during May 1 to May 10 among the journal data 233 in the current (i.e., online) P-VOL 187P (refer to FIG. 21A).

Subsequently, the first storage system 125 copies the journal data that was created during April 1 to April 30 among the journal data 233 as the journal data 233S1 to the second storage system 161, and additionally copies the restored P-VOL 187P1 as the P-VOL 187S to the second storage system 161.

Consequently, even if the second storage system 161 is isolated from the first storage system 125, it is possible to at least provide the P-VOL 187S of May 1 midnight and the P-VOL of April 1 midnight that is created by reflecting the journal data 233S1 therein.

The journal data that was created during April 1 to April 30 among the journal data 233 and the restored P-VOL 187P1 are deleted from the first storage system 125. Consequently, since free capacity in the first storage system 125 will increase, journal data of a new generation can be additionally stored.

After the lapse of another month, the first storage system 125 copies the journal data that was created during May 1 to May 31 among the journal data 233 as the journal data 233S2 to the second storage system 161 (refer to FIG. 21B). In the foregoing case, the first storage system 125 needs to restore the P-VOL 187P1 of June 1 midnight and copy it to the second storage system 161 according to the same routine as the one described above. This is because, if a Before Journal is created, the P-VOL 187P1 of June 1 midnight is necessary for restoring the P-VOL of May 1 midnight using the journal data 233S2.

In the foregoing case, the P-VOL 187S (that is, replication of the P-VOL 187P1 of May 1 midnight) and the journal data 233S1 that were copied first may be managed as the first pair (pair 2101A for instance), and the P-VOL replication 187P1 of June 1 midnight and the journal data 233S2 that were copied subsequently may be managed as the second pair (pair 2101B for instance).

Otherwise, the P-VOL 187P1 of June 1 midnight may also be copied as a new P-VOL 187S to the second storage system 161. In the foregoing case, the P-VOL 187S of May 1 midnight that was copied firs will be deleted. And the new P-VOL 187S, the journal data 233S1 and the journal data 233S2 may be managed as on one pair (pair 2101A for instance).

The processing of restoring the P-VOL and the journal data from the external storage system in a case where the restored P-VOL is copied to the external storage system as described above is now explained.

Figure 22:
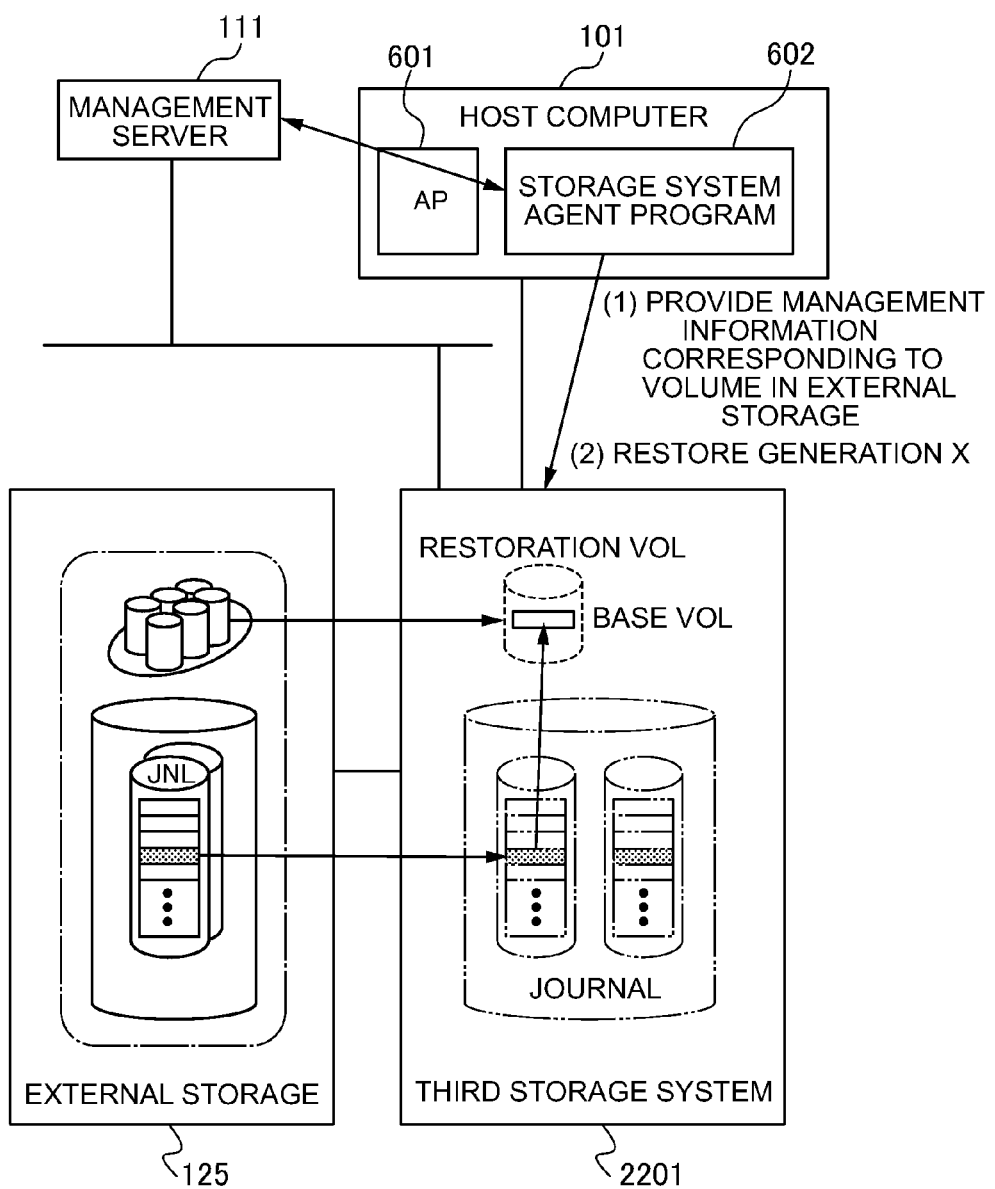
FIG. 22 is an explanatory diagram showing the outline of processing for restoring a P-VOL and journal data from an external storage system to be executed according to the first embodiment of the present invention.

FIG. 22 is an explanatory diagram showing the outline of processing for restoring a P-VOL and journal data from an external storage system to be executed according to the first embodiment of the present invention.

Specifically, FIG. 22 shows the restoration of the P-VOL and the journal data in a case where the second storage system 161 is isolated from the first storage system 125, and newly externally connected to the third storage system 2201 comprising functions that are equivalent to the first storage system 125.

In the foregoing case, the management server 111 provides at least the catalog management information table 311 to the third storage system 2201 via the host computer 101, and requests the third storage system 2201 to send data of the P-VOL of a certain generation in the past.

In order to restore the requested generation, the third storage system 2201 requests the second storage system 161 to send the necessary journal data and the P-VOL data. Then, the third storage system 2201 uses the journal data and the P-VOL data that were sent according to the foregoing request and restores the P-VOL of the requested generation, and then returns the requested data.

Figure 23:
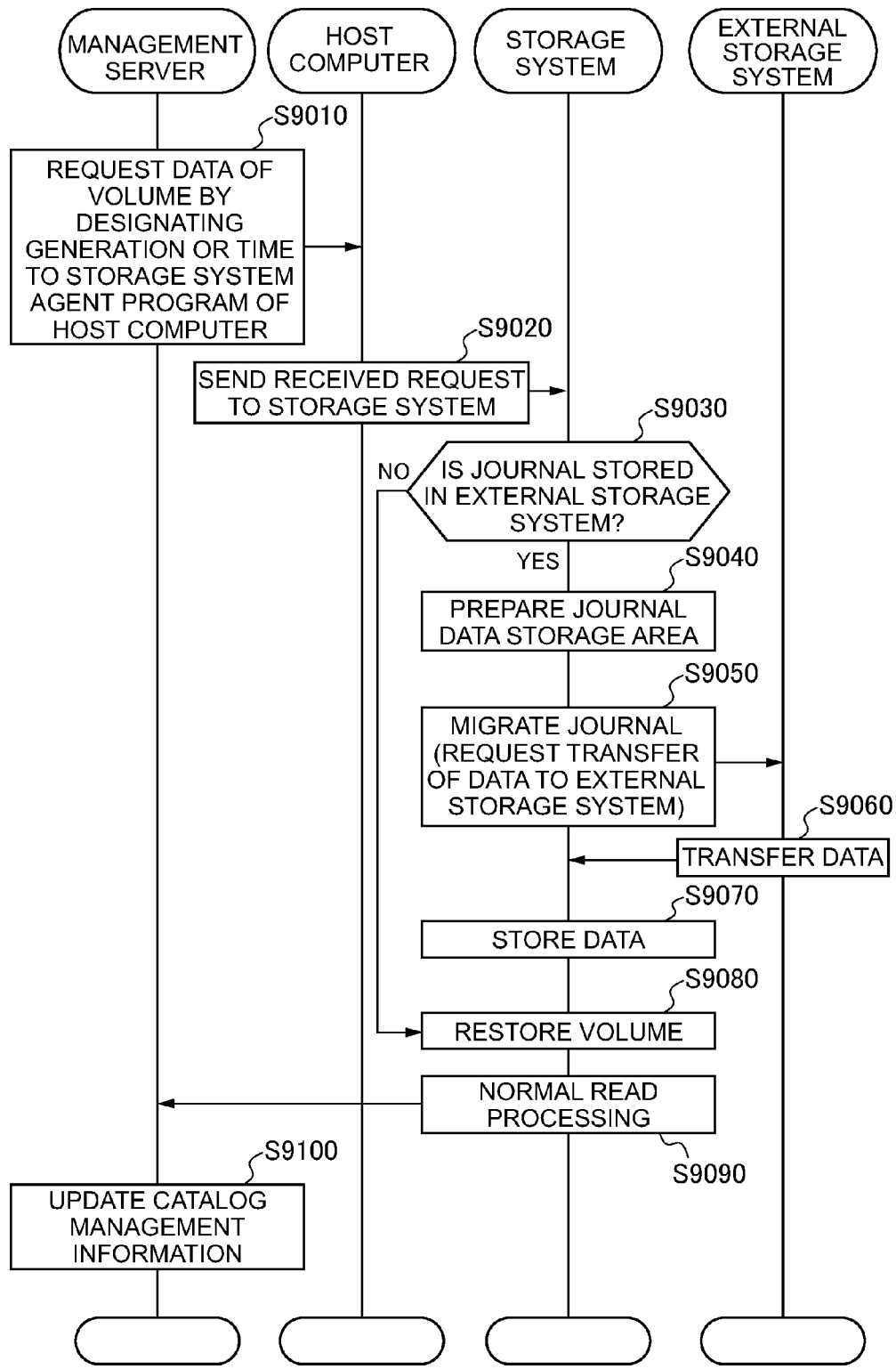
FIG. 23 is a flowchart showing the processing for restoring a P-VOL and journal data from an external storage system to be executed according to the first embodiment of the present invention.

FIG. 23 is a flowchart showing the processing for restoring a P-VOL and journal data from an external storage system to be executed according to the first embodiment of the present invention.

FIG. 23 is a diagram showing the details of the processing illustrated in FIG. 22.

The processing shown in FIG. 23 is basically the same as the processing explained with reference to FIG. 15. Specifically, S9010 to S9100 of FIG. 23 respectively correspond to S5010 to S5100 of FIG. 15.

However, while in FIG. 15 S5030 to S5090 (excluding S5060) are executed by the first storage system 125, in FIG. 23 S9030 to S9090 (excluding S9060) are executed by the third storage system 2201. Even in the foregoing case, the third storage system 2201 is able to know the location of the journal data based on the catalog management information table 311 retained by the management server 111.

Moreover, if the P-VOL/journal pair information table 225 is copied from the first storage system 125 to the third storage system 2201, the third storage system 2201 will be able to know the correspondence relationship between the journal data and the P-VOL that is necessary in restoring the P-VOL using that journal data based on the P-VOL/journal pair information table 225. Thus, at S9030, the third storage system 2201 is also able to identify the location of the P-VOL that is necessary for such restoration.

For example, the management server 111 may retain the P-VOL replication/journal pair information table 225, and send such replication of the P-VOL/journal pair information table 225 to the third storage system 2201 when the second storage system 161 is newly externally connected to the third storage system 2201. Consequently, the third storage system 2201 will be able to retain a replication of the P-VOL/journal pair information table 225.

Then, in addition to allocating an area for storing the necessary journal data, the third storage system 2201 also allocates an area for storing the necessary P-VOL that is to be transferred from the second storage system 161 (S9040).

Then, the third storage system 2201 requests the second storage system 161 to transfer the necessary journal data and the necessary P-VOL (S9050).

The second storage system 161 that received this request reads the requested journal data and P-VOL data and sends them to the third storage system 2201 (S9060).

The third storage system 2201 stores the journal data and P-VOL data received from the second storage system 161 (S9070), and uses such journal data and P-VOL data to restore the P-VOL (S9080).

For example, if the second storage system 161 is storing the journal data and P-VOL replication as shown in FIG. 21B, the third storage system 2201 is able to know that the P-VOL 187S is necessary in order to restore the P-VOL of June 1 using the journal data 233S1 and 233S2. Then, at S9060, the P-VOL 187S is transferred in addition to the journal data containing the journal data 233S1 and 233S2.

Incidentally, although FIG. 22 and FIG. 23 illustrate an example where the third storage system 2201 executes the processing for restoring the P-VOL of the requested generation by using the P-VOL and journal data that were transferred from the second storage system 161, the second storage system may also restore the P-VOL of the requested generation. In the foregoing case, the second storage system may copy the restored P-VOL to the third storage system 2201, or the third storage system 2201 may send only the requested data from the management server 111 to the third storage system 2201.

Specifically, the third storage system 2201 may send, at S9050, a request that is the same as the request that was received at S9020 to the second storage system 161. This request contains information showing the location of the necessary journal data and the necessary P-VOL. This information is created based on the catalog management information table 311.

As with the case depicted in FIG. 15, the third storage system 2201 may retain information that is equivalent to the catalog management information table 311. In the foregoing case, the information showing the location of the necessary journal data and the necessary P-VOL may be created based on the information retained in the third storage system 2201. The second storage system restores the P-VOL based on the received request.

When the second storage system 161 is to restore the P-VOL as described above, it is not necessary to execute S9040 and S9080.

By migrating the restored P-VOL replication to the external storage system in addition to the journal data as explained with reference to FIG. 16 to FIG. 23, the external storage system will be able to, after being isolated from the first storage system 125, provide the P-VOL of one or more generations to the host computer 101 directly or via the third storage system 2201. Consequently, the external storage system can be used as an offline backup or an archive.

Merging of the intergenerational differential data and the like is now explained.

As explained with reference to FIG. 24 and FIG. 25, in this embodiment, intergenerational differential data and differential BM of a plurality of generations can be merged. The consumed memory capacity can consequently be reduced. In the ensuing explanation, the intergenerational differential data after the merge is referred to as the "merged differential data."

Figure 24:
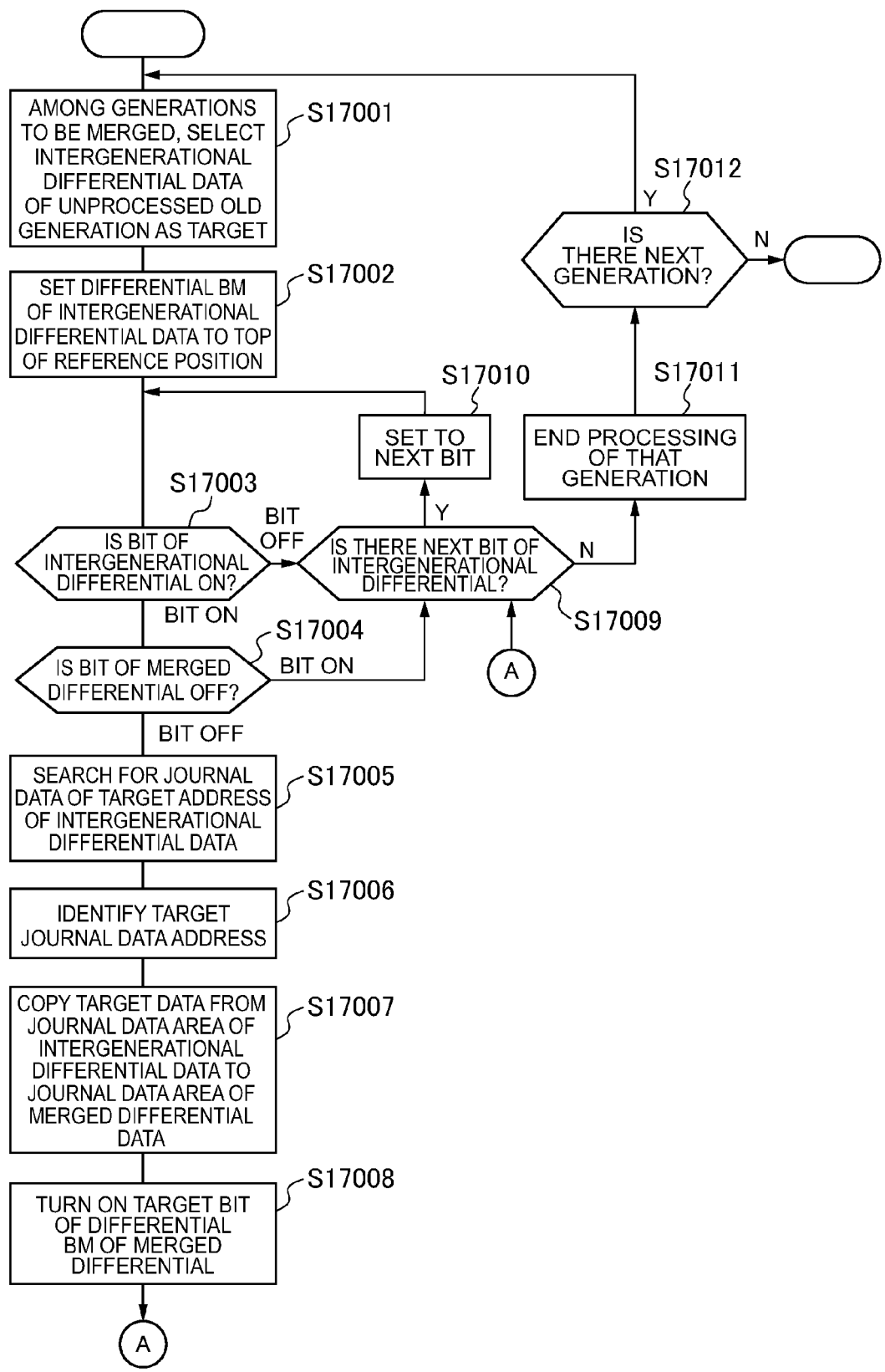
FIG. 24 is a flowchart showing the processing for merging intergenerational differential data to be executed according to the first embodiment of the present invention.

FIG. 24 is a flowchart showing the processing for merging intergenerational differential data to be executed according to the first embodiment of the present invention.

Figure 25:
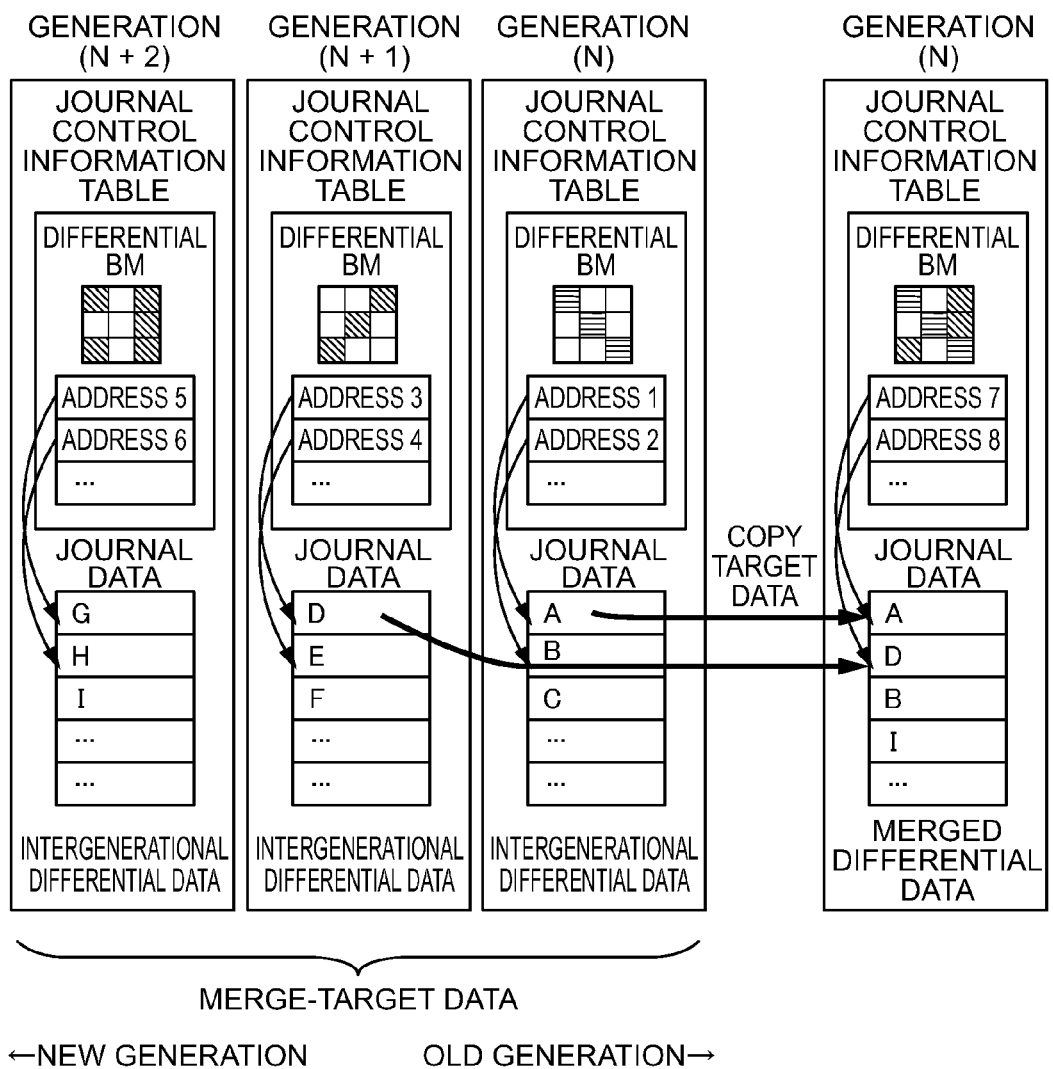
FIG. 25 is an explanatory diagram showing the movement of data elements in the merge processing to be executed according to the first embodiment of the present invention.

FIG. 25 is an explanatory diagram showing the movement of data elements in the merge processing to be executed according to the first embodiment of the present invention.

The merge processing is now explained with reference to FIG. 24 and FIG. 25.

As shown in FIG. 25, when the journal merge program 208 (refer to FIG. 2) detects that intergenerational differential data worth a certain number of generations (for instance, (m+1) generations; that is, the generations from generation (N) to generation (N+m)) is being stored, it starts the merge processing for converting the (m+1) generations worth of intergenerational differential data into merged differential data.

Incidentally, the merge processing may also be started with the detection of the accumulation of (m+1) generations worth of intergenerational differential data as the trigger. However, this trigger is merely an example, and the merge processing may also be started based on other triggers. For example, the merge processing may be started with the lapse of a prescribed period from the most recent merge processing as the trigger.

The journal merge program 208 updates the status (not shown) of the generation (N) to generation (N+m) to be merged as "merging" in the journal information table 231. Then, the journal merge program 208 selects the intergenerational differential data of the oldest generation (N) to be merged as the target (S17001).

The journal merge program 208 decides the top bit of the differential BM (N) (that is, the differential BM 443 of the (N)th generation) corresponding to the target intergenerational differential data as the reference position (S17002).

The journal merge program 208 executes S17004 if the bit that was decided as the reference position regarding the differential BM (N) is ON, and executes S17009 if that bit is OFF. In the following explanation of FIG. 24 and FIG. 25, the bit that was decided as the reference position is referred to as the "target bit," referred to as the "target ON bit" if that bit is ON, and referred to as the "target OFF bit" if that bit is OFF.

The journal merge program 208 executes S17005 if the bit located at the same position as the foregoing target bit regarding the differential BM (in the following explanation of FIG. 24 and FIG. 25, this is referred to as the "merged differential BM") corresponding to the merged differential data to be created this time around is OFF, and executes S17009 if that bit is ON.

The journal merge program 208 searches for a data storage address corresponding to the target ON bit in the differential BM (N) (S17005), and identifies that address (S17006). The journal merge program 208 copies the intergenerational differential data element stored in the segment indicated by that address from such segment to the segment (that is, segment subsequent to the segment of the most recent copy destination) in the journal sub area corresponding to the merged differential data to be created this time around (S17007). Then, the journal merge program 208 turns ON the bit that is located at the same position as the foregoing target bit in the merged differential BM (S17008).

The journal merge program 208 determines whether there is an unreferenced bit located at a subsequent position of the previous reference position in the differential BM (N) (S17009). If there is an unreferenced bit located at a subsequent position of the previous reference position (that is, if it is determined as "Y" at S17009), the next bit is decided as the new reference position (S17010), and then S17003 is executed.

Meanwhile, if there is no unreferenced bit in the subsequent position (that is, if it is determined as "N" at S17009), the processing regarding that generation (N) is ended (S17011). The journal merge program 208 then determines whether there is a subsequent generation. If there is a subsequent generation (that is, if it is determined as "Y" at S17012), the journal merge program 208 executes S17001 regarding the subsequent generation (N+1). If there is no subsequent generation (that is, if the generation that was most recently processed is (N+m) ("N" at S17012), then the merge processing is ended.

According to the foregoing processing flow, as shown in FIG. 25, the intergenerational differential data corresponding to the old generation among the generations (N) to (N+m) to be merged will be processed first. If the bit is an ON bit in the differential BM corresponding to the intergenerational differential data and the bit corresponding to that ON bit in the merged differential BM is an OFF bit, the intergenerational differential data element corresponding to that ON bit is copied to the journal sub area corresponding to the merged differential data. Meanwhile, if the bit is an ON bit in the differential BM corresponding to the intergenerational differential data and the bit corresponding to that ON bit in the merged differential BM is also an ON bit, the data element corresponding to the ON bit in the differential BM corresponding to the intergenerational differential data is not copied.

In other words, older the generation to which the intergenerational differential data element corresponds, that intergenerational differential data element will be preferentially copied to the journal sub area corresponding to the merged differential data. Specifically, for example, according to FIG. 25, there are intergenerational differential data elements "A" and "G" corresponding to the top block of the P-VOL regarding the two generations of generation (N) and generation (N+m) (if m=2, then generation (N+2)). In the foregoing case, as explained above, since the intergenerational differential data element corresponding to an older generation will be given priority, although the data element "A" regarding the generation (N) will be copied to the journal sub entry corresponding to the merged differential data, the data element "G" regarding the generation that is newer than that generation (N) will not be copied to the journal sub entry.

Incidentally, although the processing is performed from the older generation in this merge processing, the processing may also be performed from the newer generation. However, in the foregoing case, if the bit is an ON bit in the differential BM corresponding to the intergenerational differential data and the bit corresponding to that ON bit in the merged differential BM is also an ON bit, the data element corresponding to the ON bit in the differential BM corresponding to the intergenerational differential data may also be written over the merged differential data element corresponding to the ON bit and stored in the journal sub area corresponding to the merged differential data.

Moreover, when the merged differential data is created, the plurality of generations worth of intergenerational differential data that was the basis of that merged differential data may be deleted immediately after the creation of the merged differential data is completed, or in response to a command from the computer (for instance, the host computer 101 or the management server 111).

Moreover, the intergenerational differential data or the merged differential data may be deleted from the older generation. In the foregoing case, for example, a journal deletion program (not shown) releases the journal control information and journal data corresponding to the generation to be deleted, and manages the area that was storing such journal control information and journal data as a free area. In addition, the journal deletion program deletes an entry corresponding to the generation to be deleted from the first journal information table 224.

For instance, the first storage system 125 may merge the differential that it is storing in itself as described above, and then back up the merged differential (that is, the merged journal data) to the second storage system 161.

A specific example of merging the generations is now explained with reference to FIG. 9. In order to simplify the explanation, let it be assumed that the current time is the point in time that the generation N+2 was established. Specifically, the current online P-VOL 187P is the same as the P-VOL 187P of the established generation N+2.

The processing for merging the generation N+1 and the generation N+2 in the foregoing case is now explained.

At the point in time before the merge is executed, the journal data elements 2702C and 2702E are retained as the differential data corresponding to the generation N+2. This is differential data that is necessary for restoring the P-VOL 187P of the generation N+1 based on the P-VOL 187P of the generation N+2. Moreover, the journal data elements 2702A and 2702B are retained as the differential data corresponding to the generation N+1. This is differential data that is necessary for restoring the P-VOL 187P of the generation N based on the P-VOL 187P of the generation N+1.

The processing for merging the generation N+1 and the generation N+2 is the processing of leaving the differential data that is necessary for restoring the P-VOL 187P of the generation N based on the P-VOL 187P of the generation N+2 (in other words, the differential data of the P-VOL 187P of the generation N+2 and the P-VOL 187P of the generation N), and deleting the other data.

In the example illustrated in FIG. 9, two differential data; that is, the journal data element 2702E and the journal data element 2702A of the generation N+2 corresponding to the block storing the data 2701G are retained. In the foregoing case, the journal data element 2702A of an older generation will remain, and the journal data element 2702E will be deleted. This is because although the journal data element 2702E is necessary for restoring the P-VOL 187P of the generation N+1, it is not necessary for restoring the P-VOL 187P of the generation N.

Similarly, the journal data element 2702B and the journal data element 2702C will also remain.

As a result of merging the generations as described above, since the journal data element 2702E that is necessary only for restoring the P-VOL 187P of the generation N+1 is deleted, in exchange for the increase of a free storage area, it will not be possible to restore the P-VOL 187P of the generation N+1. Specifically, by merging the generations, it is possible to delete the journal data that is necessary only for restoring a generation with a low necessity for storage, and consequently reduce the storage area for storing the journal data.

Another example of migrating journal data to an external storage system is now explained with reference to FIG. 26 to FIG. 28.

Figure 26:
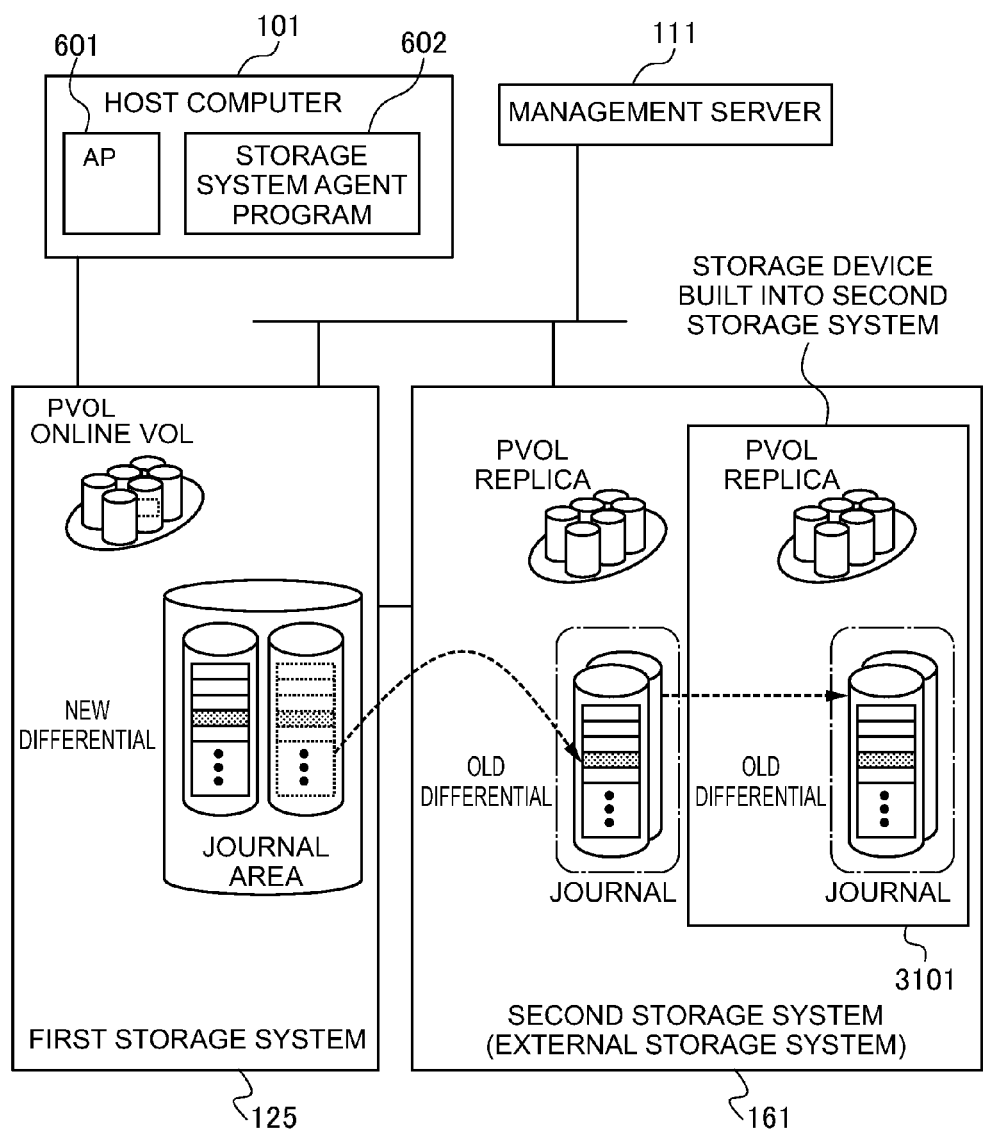
FIG. 26 is an explanatory diagram showing the migration of journal data in cases where the external storage system is to hierarchically manage the journal data according to the first embodiment of the present invention.

FIG. 26 is an explanatory diagram showing the migration of journal data in cases where the external storage system is to hierarchically manage the journal data according to the first embodiment of the present invention.

The second storage system 161 of this embodiment may comprise a different type of memory medium than the first storage system 125. For example, while the first storage system 125 comprises one or more HDDs, the second storage system 161 may comprise a magnetic tape storage apparatus (tape library for instance) 3101 in addition to an HDD. In the foregoing case, the second storage system 161 is able to hierarchically manage the journal data to be stored in the HDD and the journal data to be stored in the magnetic tape storage apparatus 3101.

Incidentally, the magnetic tape storage apparatus 3101 shown in the example of FIG. 26 is merely an example, and the magnetic tape storage apparatus 3101 may be substituted with a different type of storage device.

For example, as described above, if journal data having an access frequency that is lower than a prescribed value (first value) is to be migrated from the first storage system 125 to the second storage system 161, the journal data having an access frequency that is lower than a second value among the journal data that was migrated to the second storage system 161 is stored in the magnetic tape storage apparatus 3101. However, the second value shows an access frequency that is lower than the first value.

If journal data of an older generation has a lower access frequency, journal data of a relatively old generation among the journal data stored in the first storage system 125 is migrated to the second storage system, and journal data of a relatively old generation among the journal data that was migrated to the second storage system is stored in the magnetic tape storage apparatus 3101.

As explained with reference to FIG. 16, the P-VOL replication may also be stored in the second storage system 161. In the foregoing case, the P-VOL replication may also be stored in the magnetic tape storage apparatus 3101. Otherwise, the online P-VOL may also be stored in the second storage system 161.

Figure 27:
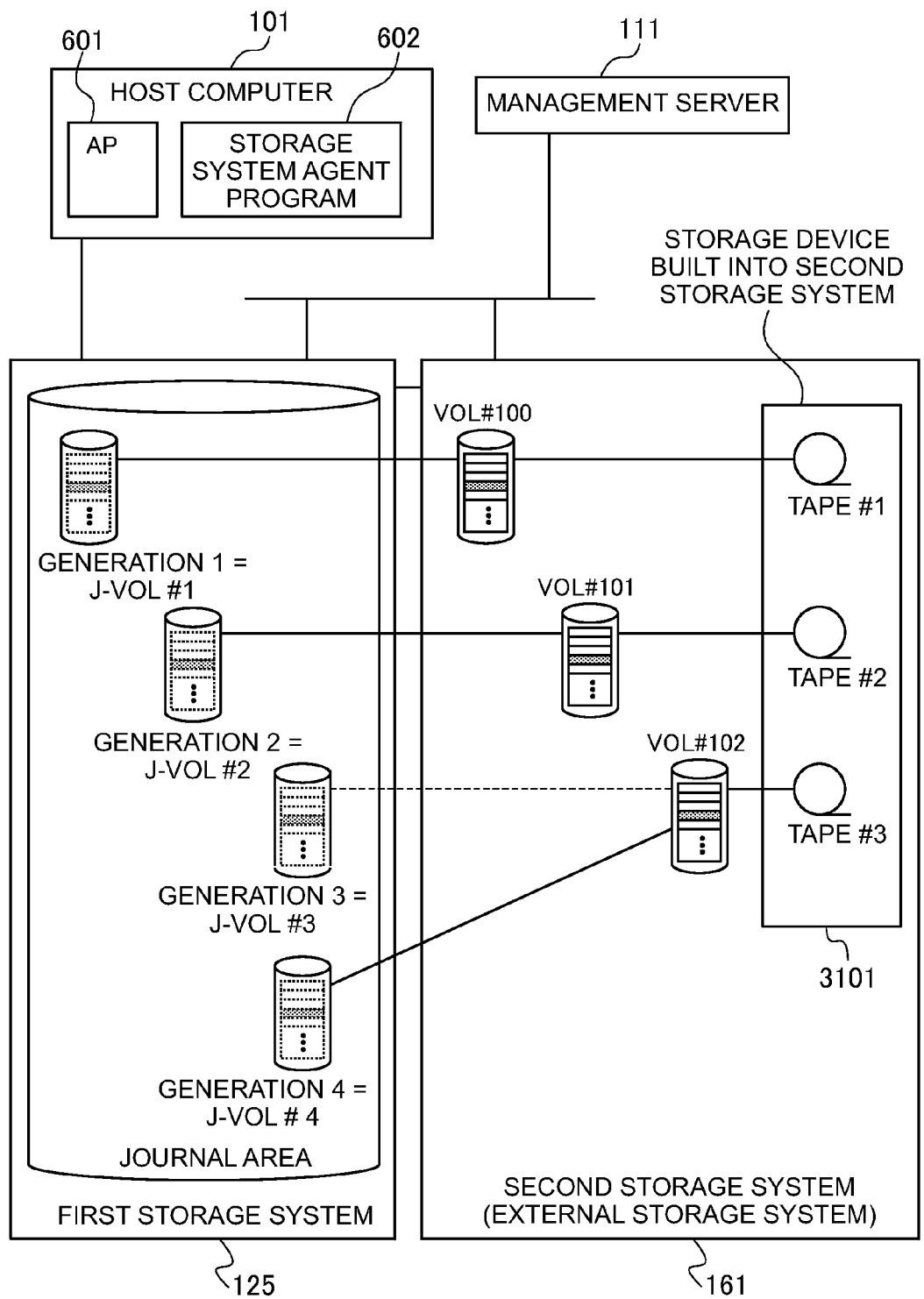
FIG. 27 is an explanatory diagram showing the migration of journal data in cases where the external storage system comprises a magnetic tape storage apparatus according to the first embodiment of the present invention.

FIG. 27 is an explanatory diagram showing the migration of journal data in cases where the external storage system comprises a magnetic tape storage apparatus according to the first embodiment of the present invention.

Specifically, FIG. 27 shows an example of storing journal data on a tape in a case where the storage device built into the second storage system in the example of FIG. 26 is the magnetic tape storage apparatus 3101.

In the example illustrated in FIG. 27, journal data of one generation is stored in one (i.e., one reel of a) tape storage medium. Specifically, in the example illustrated in FIG. 27, journal data of four generations from generation 1 to generation 4 are respectively stored in four logical volumes identified based on identification numbers (identifiers) "1" to "4" of the journal-related area 188 of the first storage system 125. In the ensuing explanation, these four logical volumes are respectively referred to as J-VOL #1 to J-VOL #4.

Journal data stored in one logical volume of the journal-related area 188 is migrated to one logical volume in the second storage system 161. Then, the journal data stored in one logical volume of the second storage system 161 is stored in one reel of the tape storage medium.

In the example illustrated in FIG. 27, three logical volumes; that is, the three logical volumes identified based on identification numbers "100" to "102" are stored as the migration destination of the journal data in the second storage system 161. In the ensuing explanation, these three logical volumes are respectively referred to as VOL #100 to VOL #102. Moreover, the magnetic tape storage apparatus 3101 of FIG. 27 comprises three tape storage mediums that are respectively identified based on identification numbers "1" to "3." In the following explanation, these three tape storage mediums are respectively referred to as tape #1 to tape #3.

However, there are cases where, after the journal data stored in the one logical volume of the journal-related area 188 is migrated to one logical volume in the second storage system 161, journal data stored in a separate logical volume in the journal-related area 188 is additionally migrated to the same logical volume in the second storage system 161.

In the example illustrated in FIG. 27, the journal data of generation 1 is migrated from J-VOL #1 to VOL #100, and additionally stored in tape #1. The journal data of generation 2 is migrated from J-VOL #2 to VOL #101, and additionally stored in tape #2. Similarly, the journal data of generation 3 is migrated from J-VOL #3 to VOL #102. However, the journal data of generation 4 is thereafter migrated from J-VOL #4 to VOL #102. Here, the journal data of generation 3 that was migrated first is deleted from VOL #102. Thus, tape #3 will store the journal data of generation 4.

The management server 111 also manages information showing which journal data of which generation is stored in which tape storage medium.

A memory are may also be dynamically allocated to the logical volumes in the second storage system 161. Specifically, among the respective logical volumes, a physical storage area may be allocated only to the area in which data has been written. In the foregoing case, there are cases where a capacity that is larger than the capacity of the physical storage area that is actually being used by the respective logical volumes is defined in the respective logical volumes. Even in the foregoing case, only the data that is actually stored in the respective logical volumes is stored in the tape storage medium.

Figure 28:
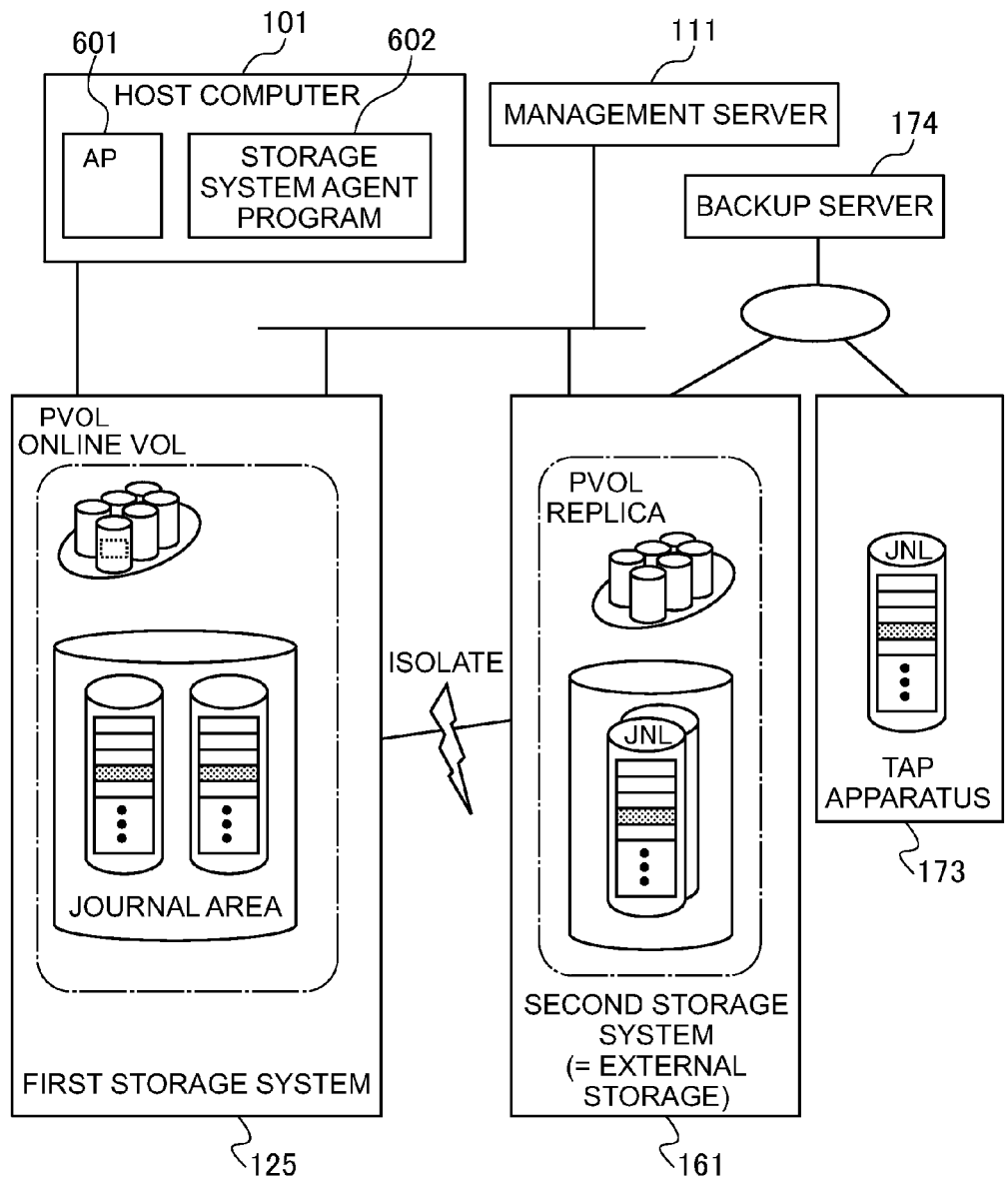
FIG. 28 is an explanatory diagram showing the migration of journal data in cases where a magnetic tape storage apparatus is to be connected to the external storage system according to the first embodiment of the present invention.

FIG. 28 is an explanatory diagram showing the migration of journal data in cases where a magnetic tape storage apparatus is to be connected to the external storage system according to the first embodiment of the present invention.

In FIG. 28, unlike the cases shown in FIG. 26 and FIG. 27, the magnetic tape storage apparatus 173 is connected to the second storage system 161 via a network. A backup server 174 is additionally connected to this network. The backup server 174 is a computer for controlling the backup of data stored in the logical volume of the second storage system 161 to the magnetic tape storage apparatus.

For example, as with the case shown in FIG. 26, journal data of a relatively old generation among the journal data stored in the first storage system 125 may be migrated to the second storage system, and journal data of a relatively old generation among the journal data that was migrated to the second storage system 161 may be stored in the magnetic tape storage apparatus 173.

The second storage system 161 additionally stores the P-VOL replication that is necessary in restoring the P-VOL by using the migrated journal data. If the second storage system 161 is isolated from the first storage system 125, the P-VOL can be restored by using the P-VOL replication and journal data stored in the second storage system 161 and the journal data stored in the magnetic tape storage apparatus 173.

The magnetic tape storage apparatus 173 may store only the journal data, or store the P-VOL replication or the logical volume of a certain generation in addition to the journal data.

Figure 29:
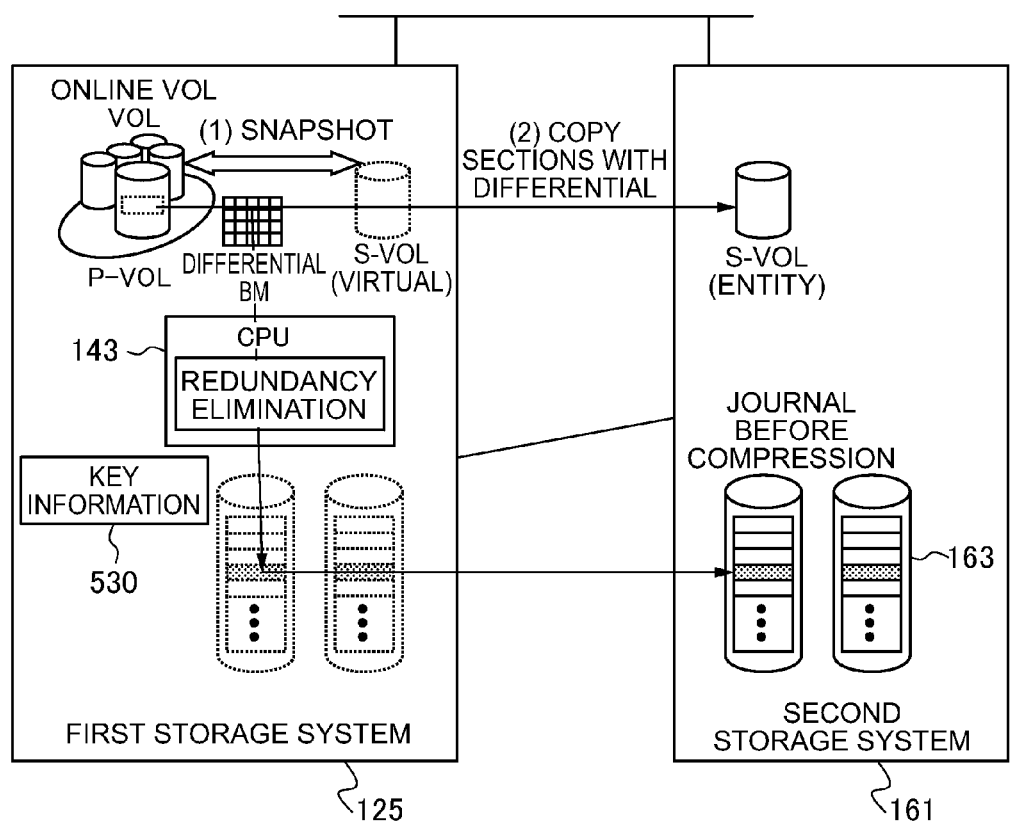
FIG. 29 is an explanatory diagram showing the first mode of data migration processing to be executed according to the first embodiment of the present invention.

Although this embodiment explained a first pattern of storing the journal data in the first storage system 125, and storing the journal data of the first storage system 125 in the second storage system 161 at the time of backup, there is also a second pattern where the first storage system 125 provides a virtual volume which is a virtualization of the volume of the second storage system 161 based on the external connection function and storing the journal data in the volume of the second storage system 161 from the very beginning. FIG. 29 onward are explained on the premise of using the second pattern.

The method of processing data according to the Post Process mode is now explained with reference to FIG. 29. In this embodiment, based on the premise that the second storage system 161 is provided with an entity of the S-VOL for storing the journal before compression (journal data) and an entity of the S-VOL for storing the journal after compression (journal data), and that the first storage system 125 is provided with a virtual VOL corresponding to the journal before compression and a virtual VOL corresponding to the journal after compression as the virtual VOLs that were virtualized with the external connection function, prior to compressing and encrypting the journal data before compression, on the condition that there is differential data, data is once copied and such data is thereafter compressed and encrypted.

Foremost, the control processor 143 that received a command from the host computer 101 issues a read/write request to the online VOL containing business data. Upon acquiring a snapshot of the online VOL, the snapshot S-VOL manages the S-VOLs in which the entity exists in the second storage system 161 as a pair based on the external connection function. The control processor 143 refers to the differential BM 443 and determines whether there is data in the journal of the online VOL. If the bit of the reference target in the differential BM 443 is "0," data of the online VOL is copied to the S-VOL since it means that data of the online VOL has not been updated.

Meanwhile, if the bit of the reference target in the differential BM 443 is "1," the control processor 143 performs processing on the assumption that the journal data has been stored in the journal-related area 188 and also stored in the second storage system 161.

As described above, by copying data with differential to the second storage system 161 prior to compressing and encrypting the journal data, it is possible to minimize the RTO (Recovery Time Objective), and minimize the response time to the host computer 1010 upon processing the online VOL.

Moreover, the control processor 143 employs a redundancy elimination function in order to compile the journal data among the journal data of the respective generations that have the same generation upon storing the journal data in the journal-related area 188.

Meanwhile, the control processor 143 processes the journal data before compression among the journal data stored in the S-VOL of the second storage system 161 as the journal before compression.

Figure 30:
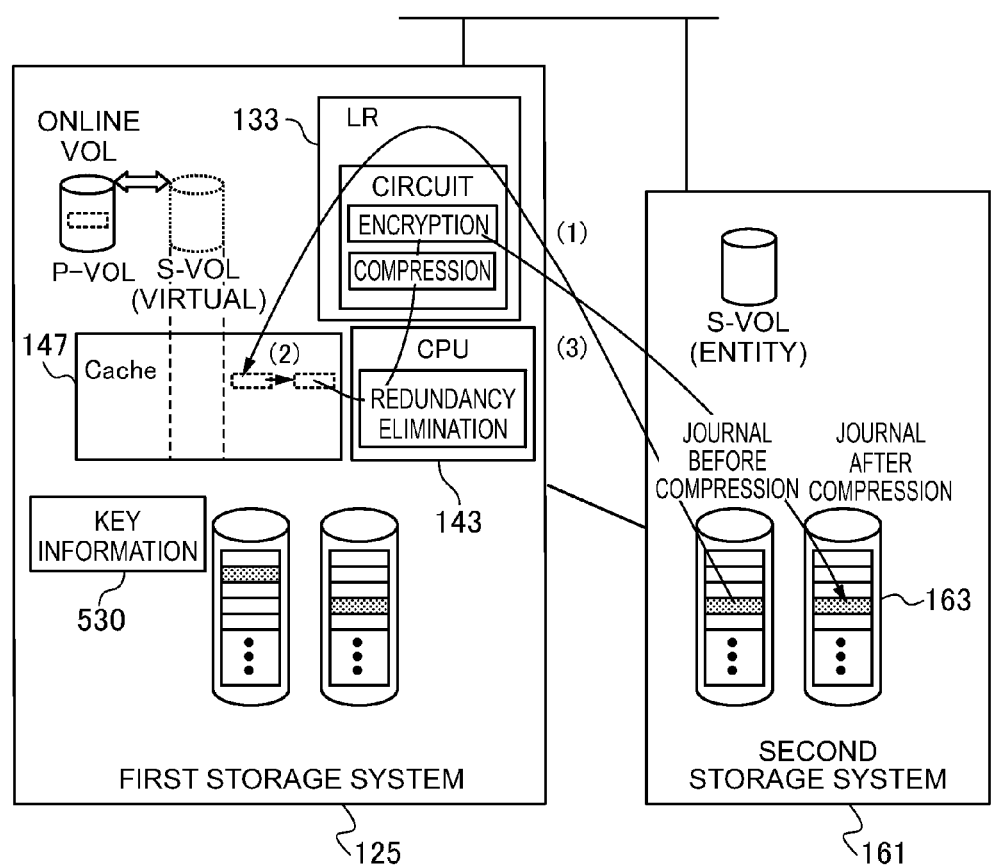
FIG. 30 is an explanatory diagram showing the first mode of data compression/encryption processing to be executed according to the first embodiment of the present invention.

Then, upon compressing and encrypting the journal before compression, the control processor 143 imports the journal before compression to the cache memory 147 via the LR 133 and copies the imported journal before compression between the cache memories 147 as shown in FIG. 30.

Subsequently, the control processor 143 performs redundancy elimination processing to the journal before compression that was copied in the cache memory 147, compiles the same intergenerational data, and transfers the compiled journal before compression to the LR 133.

The LR 133 compresses the journal before compression with the compression circuit 1333, encrypts the compressed journal with the encryption circuit 1331 using key information 530 including the encryption key 524, and transfers the journal data that was encrypted after compression as the journal after compression to the second storage system 161. Incidentally, upon compressing and encrypting the journal data, in substitute for the LR 133, the control processor 143 may also compress and encrypt the journal data by using the compression program 212 and the encryption/decryption program 231.

Figure 31:
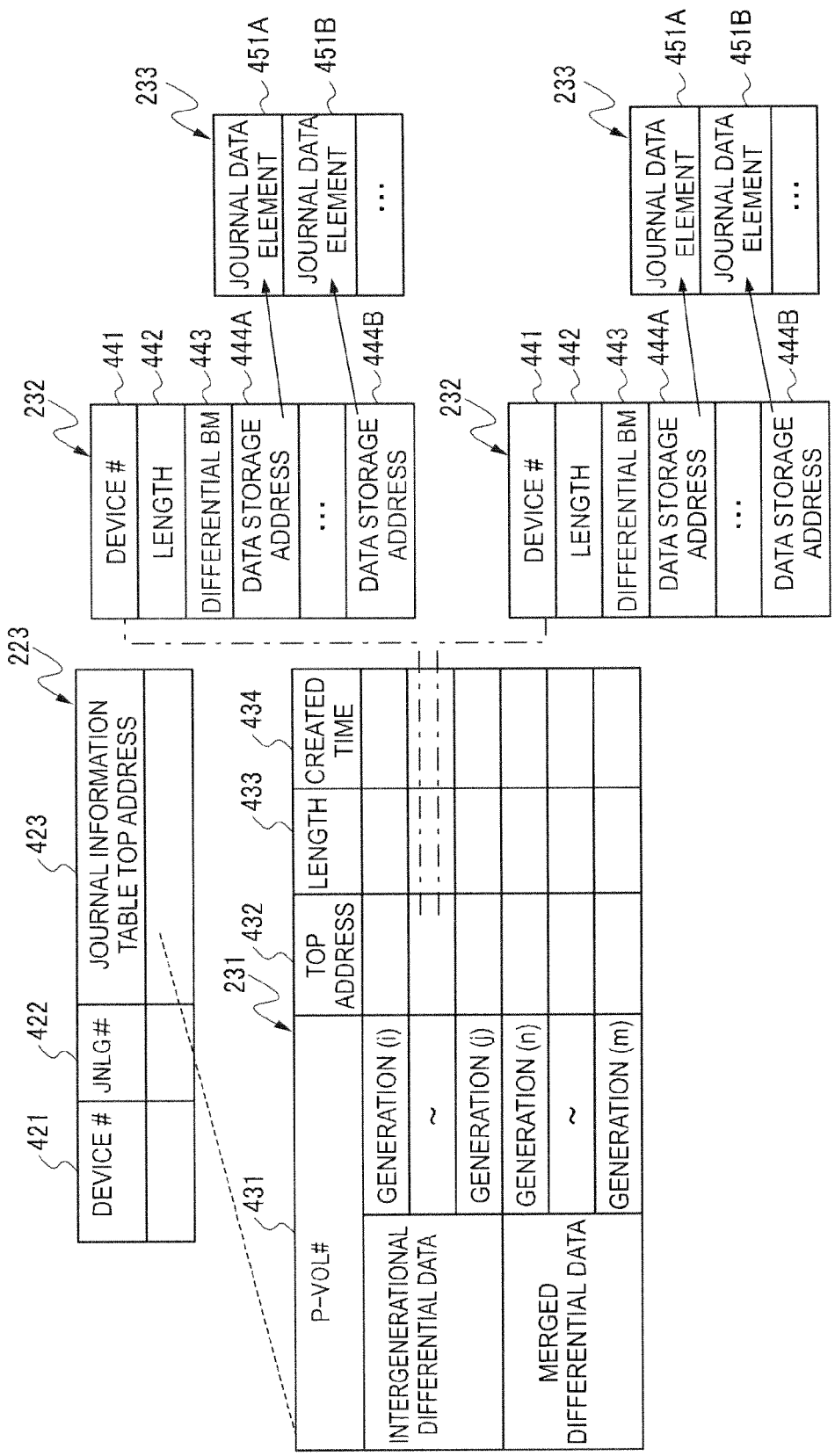
FIG. 31 is an explanatory diagram showing the update processing of a journal information table to be executed according to the first embodiment of the present invention.

Here, if all journal data of each generation is compressed and encrypted and stored as the journal after compression in the second storage system 161, the control processor 143 performs mapping change processing to the top address 432 of the journal information table 231 as shown in FIG. 31. In the foregoing case, the control processor 143 changes the mapping of the journal control information table 232 for the journal after compression, and thereafter deletes the differential BM 443 of the journal control information table 232 of the journal before compression.

Moreover, compression is performed for each generally fixed size; for instance, for each size that can be designated by the user. Thus, when compressing journal data, such compression will be performed a plurality of times for one generation. Here, decryption will also be performed a plurality of times for one generation.

Figure 32:
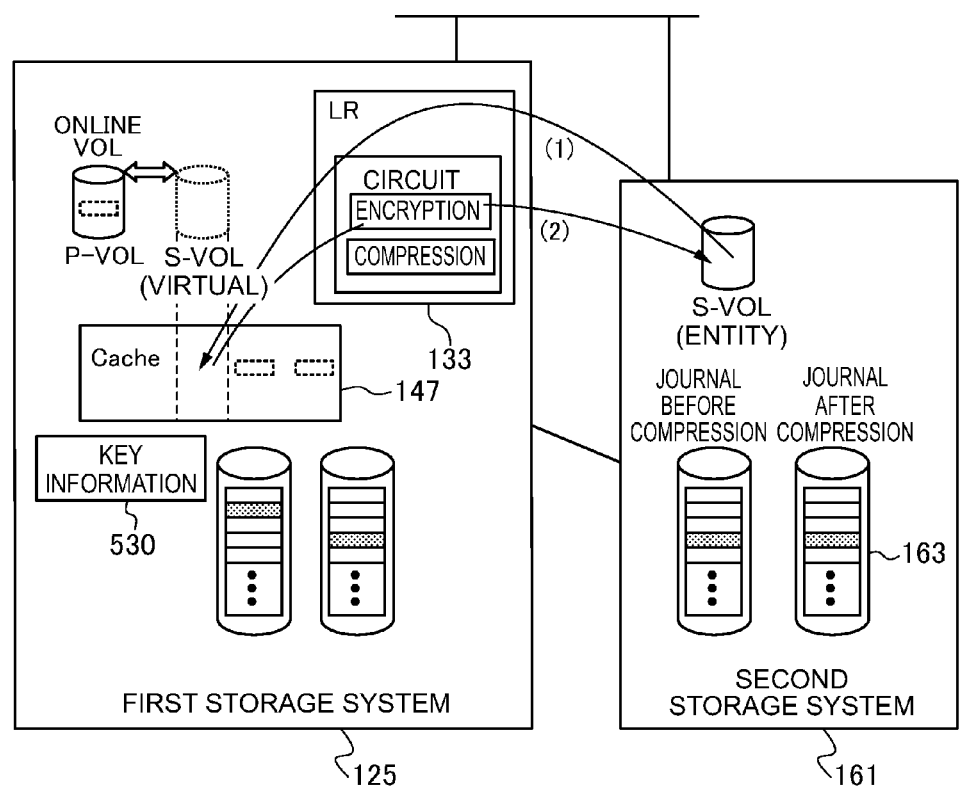
FIG. 32 is an explanatory diagram showing the data encryption processing of an S-VOL to be executed according to the first embodiment of the present invention.

Meanwhile, with respect to the data of the S-VOL stored in the second storage system 161, as shown in FIG. 32, the control processor 143 imports the data of the S-VOL into the cache memory 147 via the LR 133, and transfer the imported data of the S-VOL to the LR 133. The LR 133 encrypts the data of the S-VOL using the encryption circuit 1331 and the key information 530, and transfers the encrypted data of the S-VOL to the second storage system 161.

According to this embodiment, when once copying differential data from the first storage system 125 to the second storage system 161 and then compressing and encrypting the journal before compression stored in the second storage system 161, since the journal before compression stored in the second storage system 161 is transferred to the first storage system 125, and the journal data is compressed and encrypted with the first storage system 125 and the journal data that was encrypted after compression is stored in the second storage system 161, it is possible to reduce the capacity of the journal data to be stored in the second storage system 161, minimize the RTO, and also minimize the response time to the host computer 101.

Figure 33:
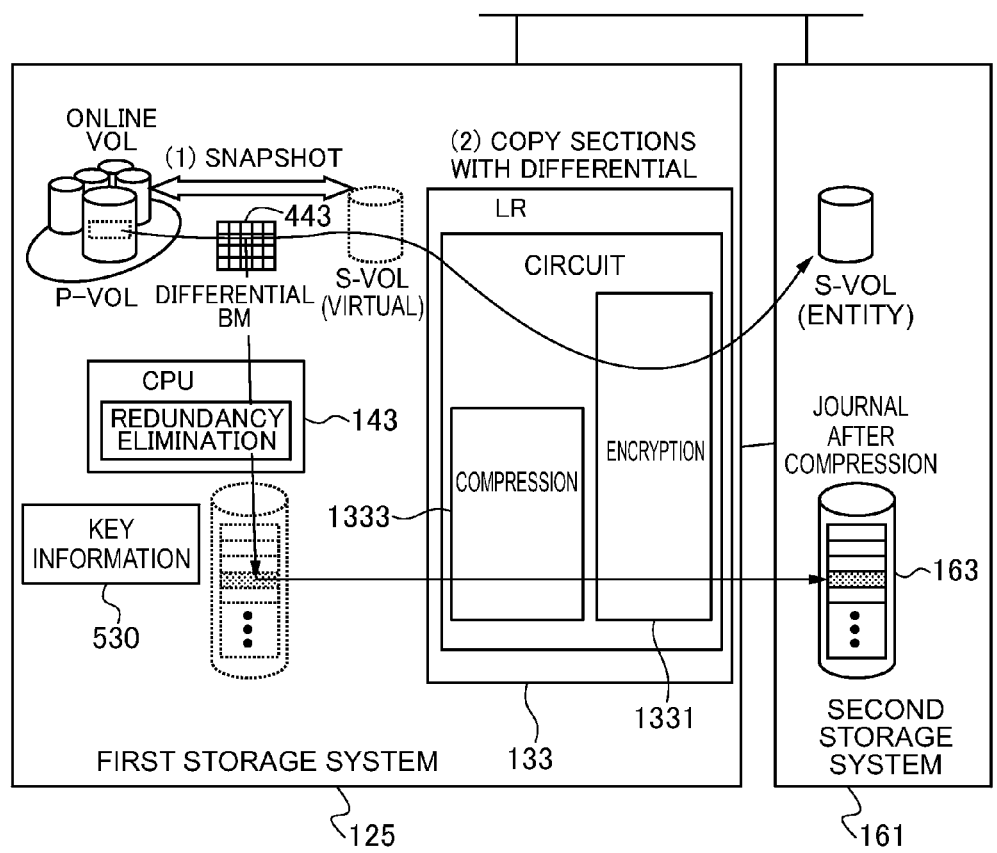
FIG. 33 is an explanatory diagram showing the second mode of data compression/encryption processing to be executed according to the first embodiment of the present invention.

The method of processing data according to the On The Fly mode, which is the second mode, is now explained with reference to FIG. 33. In this embodiment, journal data compressed and then encrypted, and the journal data that was encrypted after compression is transferred to the second storage system 161.

Foremost, the control processor 143 refers to the differential BM 443, and, if the bit of the reference target in the differential BM 443 is "0," it transfers data of the online VOL to the LR 133 upon copying data of the online VOL to the S-VOL. The LR 133 encrypts the data of the online VOL with the encryption circuit 1331 by using key information 530, and then transfers the encrypted data to the second storage system 161. Consequently, after the data of the online VOL is encrypted, it is copied as the data of the S-VOL to the second storage system 161.

Meanwhile, if the bit of the reference target in the differential BM 443 is "1," the control processor 143 performs redundancy elimination processing to the journal data, thereafter stores the journal data in the journal-related area 188 and then transfers it to the LR 133. The LR 133 compresses the journal data with the compression circuit 1333, encrypts the compressed journal data with the encryption circuit 1331 according to the key information 530, and transfers the journal data that was encrypted after compression to the second storage system 161. Consequently, the journal data that was encrypted after compression will be stored in the second storage system 161.

According to this embodiment, since the journal data compressed and then encrypted, and the journal data that was encrypted after compression is stored in the second storage system 161, it is possible to reduce the capacity of the journal data to be stored in the second storage system 161.

Moreover, according to this embodiment, since the journal data is compressed and encrypted and thereafter transferred to the second storage system 16, although the response time to the host computer 101 will be longer than the first mode, the user's operation will be simplified if there is leeway on the part of the control processor 143.

Incidentally, in this embodiment, since it is necessary to acquire the backup upon synchronizing with the host IO, the IO performance will be inferior in comparison to the embodiment using the first mode.

Figure 34:
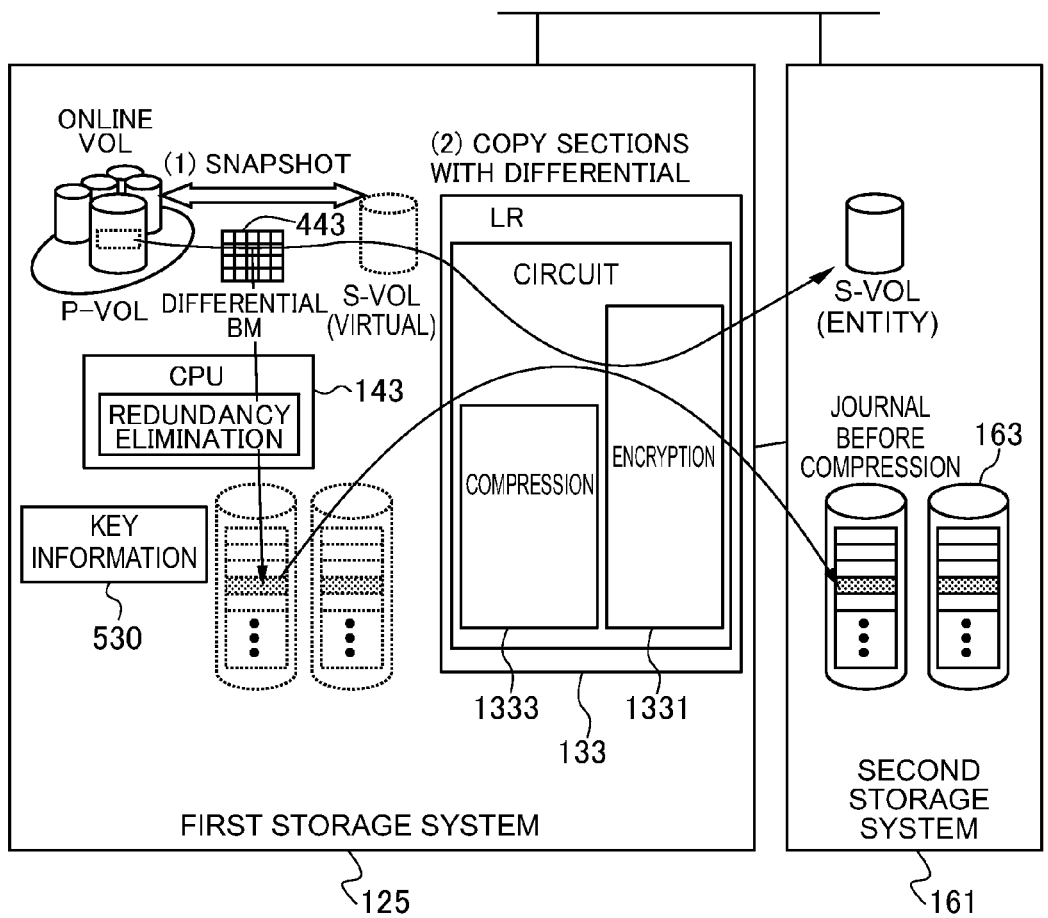
FIG. 34 is an explanatory diagram showing the third mode of data encryption processing to be executed according to the first embodiment of the present invention.
Figure 35:
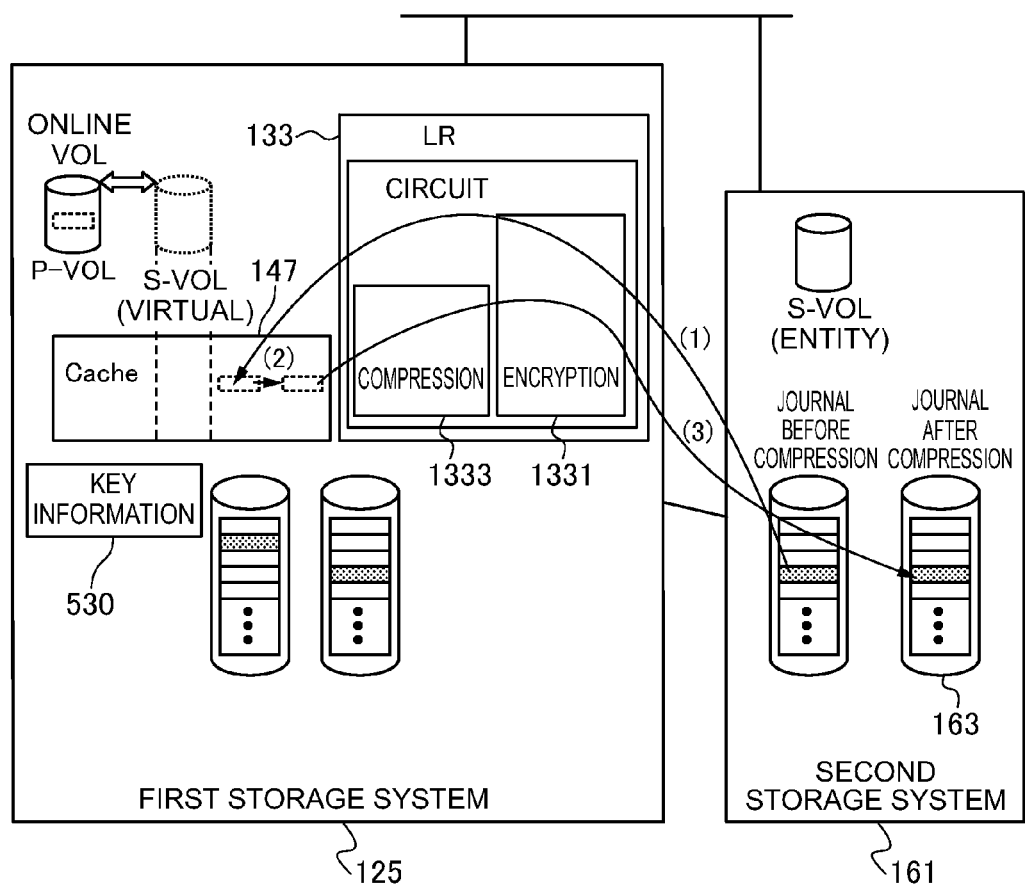
FIG. 35 is an explanatory diagram showing the third mode of data compression/encryption processing to be executed according to the first embodiment of the present invention.

The method of processing data by combining the first mode and the second mode is now explained, as the third mode, with reference to FIG. 34 and FIG. 35.

In this embodiment, the journal data is encrypted with the first storage system 125, thereafter transferred to the second storage system 161, the encrypted journal data is subsequently returned to the first storage system 125, the journal data is decrypted in the first storage system 125, the decrypted journal data is compressed and then encrypted, and the journal data that was encrypted after compression is once again stored in the second storage system 161.

Foremost, the control processor 143 refers to the differential BM 443, and, if the bit of the reference target is "0," it copies data of the online VOL as the data of the S-VOL (virtual) and transfers the copied data of the S-VOL to the LR 133. The LR 133 encrypts the data of the S-VOL with the encryption circuit 1331, and then transfers the encrypted data to the second storage system 161. Consequently, the data of the S-VOL is stored in the second storage system 161.

Meanwhile, if the control processor 143 refers to the differential BM 443 and the bit of the reference target is "1," the control processor 143 performs redundancy elimination processing to the journal data, thereafter stores the journal data in the virtual VOL corresponding to the journal before compression and then transfers it to the LR 133. The LR 133 encrypts the journal data with the encryption circuit 1331 according to the key information 530, and transfers the encrypted journal data as the journal before compression to the second storage system 161. Consequently, the journal before compression will be stored in the second storage system 161.

In the foregoing case, even if the reliability of the second storage system 161 is low, since the journal data is once encrypted and then stored in the second storage system 161, the journal data can be stored in the second storage system 161 more safely.

Subsequently, as shown in FIG. 35, the control processor 143 performs the processing for returning the journal before compression stored in the second storage system 161 to the LR 133. Here, the LR 133 decrypts the journal before compression with the decryption circuit 1332 according to the encryption/decryption program 213, and then transfers the decrypted journal data to the cache memory 147.

Subsequently, the control processor 143 copies the decrypted journal data between caches, and transfers the copied journal data to the LR 133.

Subsequently, the LR 133 compresses the decrypted journal data with the compression circuit 1333, encrypts the compressed journal data with the encryption circuit 1331, and then transfers the journal data that was encrypted after compression to the second storage system 161. Consequently, the journal data that was encrypted after compression is stored as the journal after compression in the second storage system 161.

Here, since the data length of the compressed journal data will change, it will be stored in an area that is different from the journal before compression. And if all journal data of each generation is compressed and stores as the journal after compression in the second storage system 161, the control processor 143 performs processing for changing the mapping of the journal information table 231.

According to this embodiment, since the journal data is compressed and then encryption, and the journal data that was encrypted after compression is stored in the second storage system 161, it is possible to reduce the capacity of the journal data to be stored in the second storage system 161.

Moreover, according to this embodiment, even if the reliability of the second storage system 161 is low, the journal data can be stored in the second storage system 161 more safely.

Figure 36:
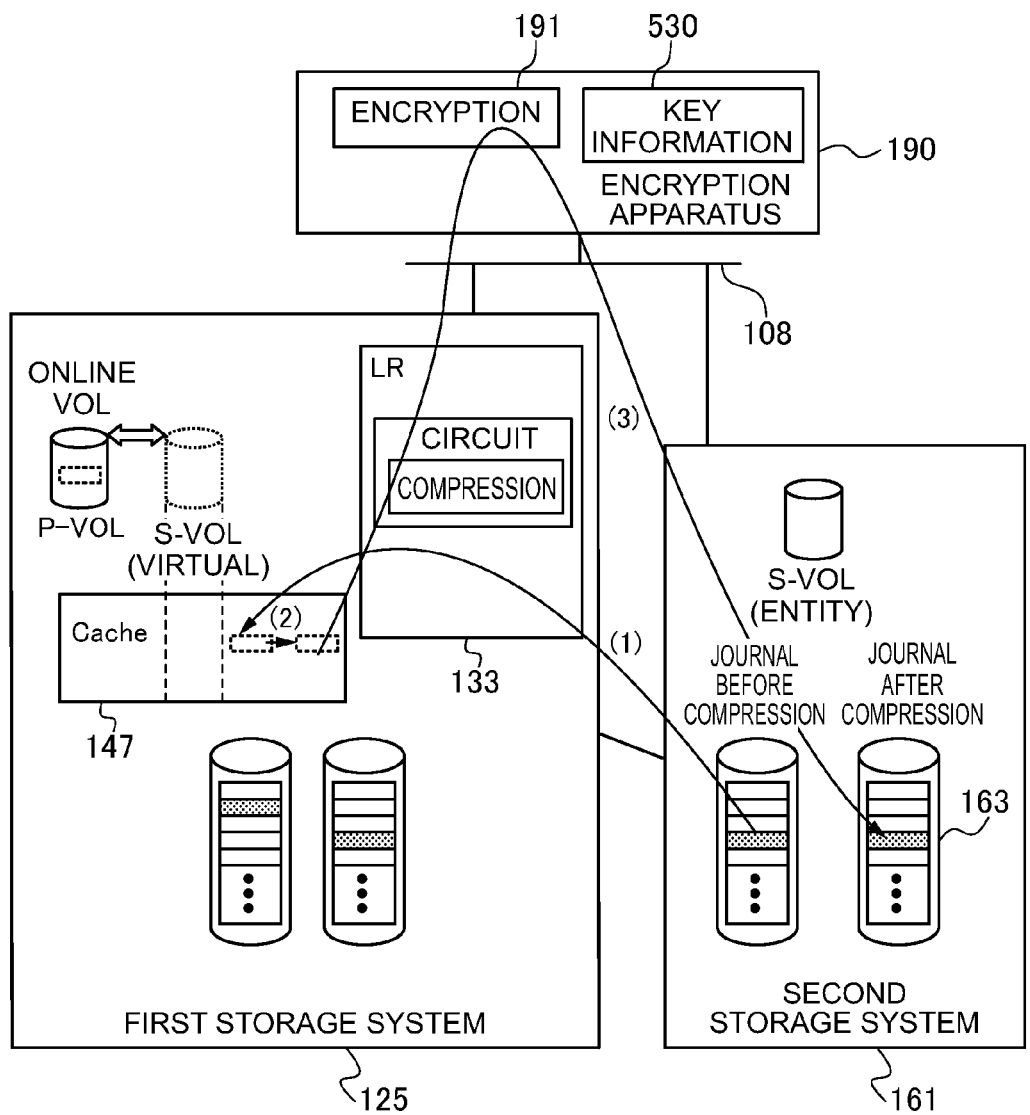
FIG. 36 is an explanatory diagram showing the processing for encrypting data with the external encryption apparatus using the first mode.

The processing method of encrypting data using an encryption apparatus arranged outside the first storage system 125 upon processing data using the first mode is now explained with reference to FIG. 36.

In this embodiment, when processing data using the first mode, the encryption apparatus 190 arranged outside of the first storage system 125 is used to encrypt the data. The encryption apparatus 190 as the external apparatus comprises an encryption circuit 191 comprising the same functions as the encryption circuit 1331, and is connected to the first storage system 125 and the second storage system 161 via the third network 108.

Foremost, upon processing data using the first mode, the control processor 143 returns the journal before compression stored in the second storage system 161 to the cache memory 147 via the LR 133, copies the journal before compression between caches, and thereafter returns the copied journal before compression to the LR 133.

The LR 133 compresses the journal before compression with the compression circuit 1333, and then transfers the compressed journal data to the encryption apparatus 190.

The encryption apparatus 190 encrypts the compressed journal data with encryption circuit 191, and then transfers the journal data that was encrypted after compression to the second storage system 161. Consequently, the journal data that was encrypted after compression is stored as the journal after compression in the second storage system 161.

Here, if all data of each generation is encrypted after being compressed, the control processor 143 performs processing for changing the mapping of the journal information table 231.

According to this embodiment, since the external encryption apparatus 190 encrypts the journal data, the processing load of the control processor 143 can be alleviated.

Figure 37:
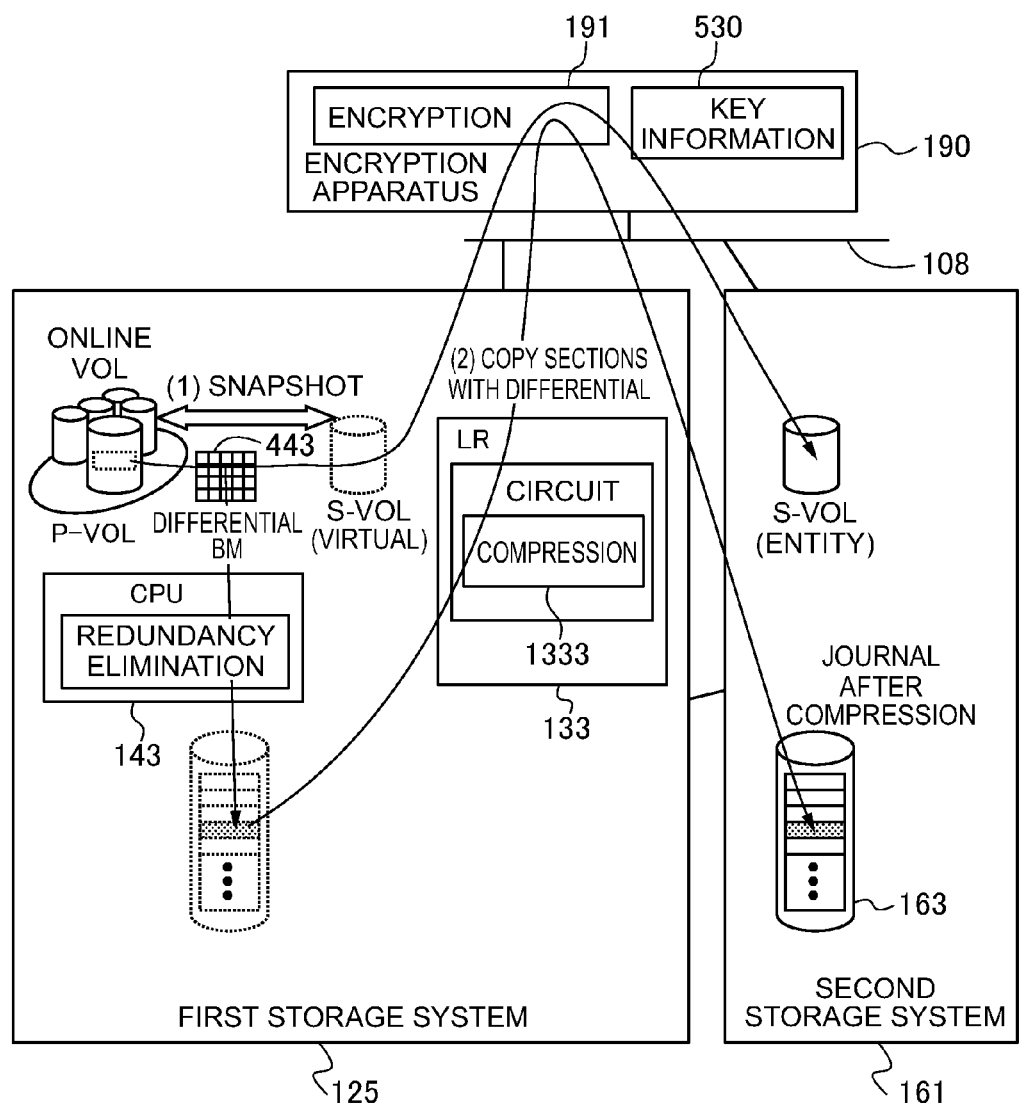
FIG. 37 is an explanatory diagram showing the processing for encrypting data with the external encryption apparatus using the second mode.

The processing method of encrypting data with the external encryption apparatus 190 upon processing data using the second mode is now explained with reference to FIG. 37.

In this embodiment, in the course of compressing and encrypting the journal data using the second mode, the encryption processing of the journal data is performed with the external encryption apparatus 190.

Foremost, the control processor 143 refers to the differential BM 443 and, if the bit of the reference target is "0," it copies the data of the online VOL to the S-VOL (virtual), and then transfers it to the encryption circuit 190.

The encryption apparatus 190 encrypts the data of the S-VOL with the encryption circuit 191, and transfers the encrypted data of the S-VOL to the second storage system 161. Consequently, the data of the S-VOL will be stored in the second storage system 161.

Subsequently, the control processor 143 refers to the differential BM 443, and, if the bit of the reference target is "1," it performs redundancy elimination processing to the journal data, thereafter stores the journal data in a virtual VOL corresponding to the journal after compression and then transfers it to the LR 133. The LR 133 compresses the journal data with the compression circuit 1333, and then transfers the compressed journal data to the encryption apparatus 190.

The encryption apparatus 190 encrypts the compressed journal data with the encryption circuit 191, and then transfers the journal data that was encrypted after compression to the second storage system 161. Consequently, the journal data that was encrypted after compression will be stored as the journal after compression in the second storage system 161.

According to this embodiment, since the external encryption apparatus 190 encrypts the journal data, the processing load of the control processor 143 can be alleviated.

Figure 38:
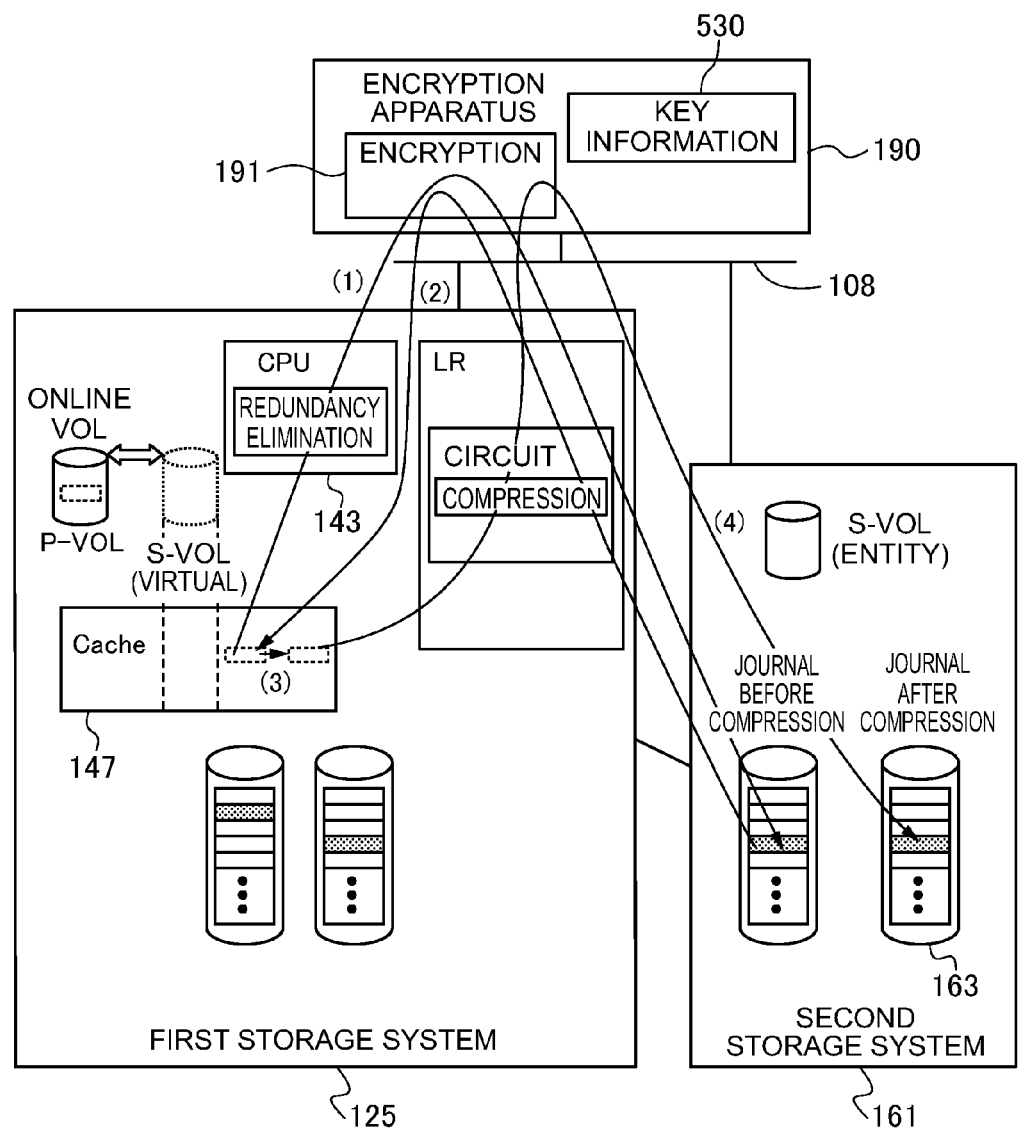
FIG. 38 is an explanatory diagram showing the processing for encrypting data with the external encryption apparatus using the third mode.

The processing method of encrypting data with the external encryption apparatus 190 upon processing data using the third mode is now explained with reference to FIG. 38.

In this embodiment, during the course of processing data using the third mode, the journal data is encrypted with the external encryption apparatus 190.

Foremost, the control processor 143 imports the journal data from the cache memory 147 and performs redundancy elimination processing, and thereafter transfers the journal data that was subject to the redundancy elimination processing to the encryption apparatus 190. The encryption apparatus 190 encrypts the journal data with the encryption circuit 191, and then transfers the encrypted journal data to the second storage system 161. Consequently, the encrypted journal data will be stored as the journal before compression in the second storage system 161.

Subsequently, the control processor 143 performs processing for returning the journal before compression stored in the second storage system 161 to the first storage system 125 via the encryption apparatus 190. Here, the encryption apparatus 190 decrypts the journal before compression with a decryption circuit (not shown), and transfers the decrypted journal data to the cache memory 147.

Subsequently, the control processor 143 copies the decrypted journal data between caches in the cache memory 147, and transfers the copied journal data to the LR 133.

The LR 133 compresses the decrypted journal data with the compression circuit 1333, and transfers the compressed journal data to the encryption apparatus 190.

The encryption apparatus 190 encrypts the compressed journal data with the encryption circuit 191, and transfers the encrypted journal data to the second storage system 161. Consequently, the journal data that was encrypted after compression will be stored as the journal after compression in the second storage system 161.

Incidentally, the first storage system 125 manages whether the journal data should be transferred to the second storage system 161 via the encryption apparatus 190.

According to this embodiment, since the external encryption apparatus 190 encrypts the journal data, the processing load of the control processor 143 can be alleviated.

Figure 39:
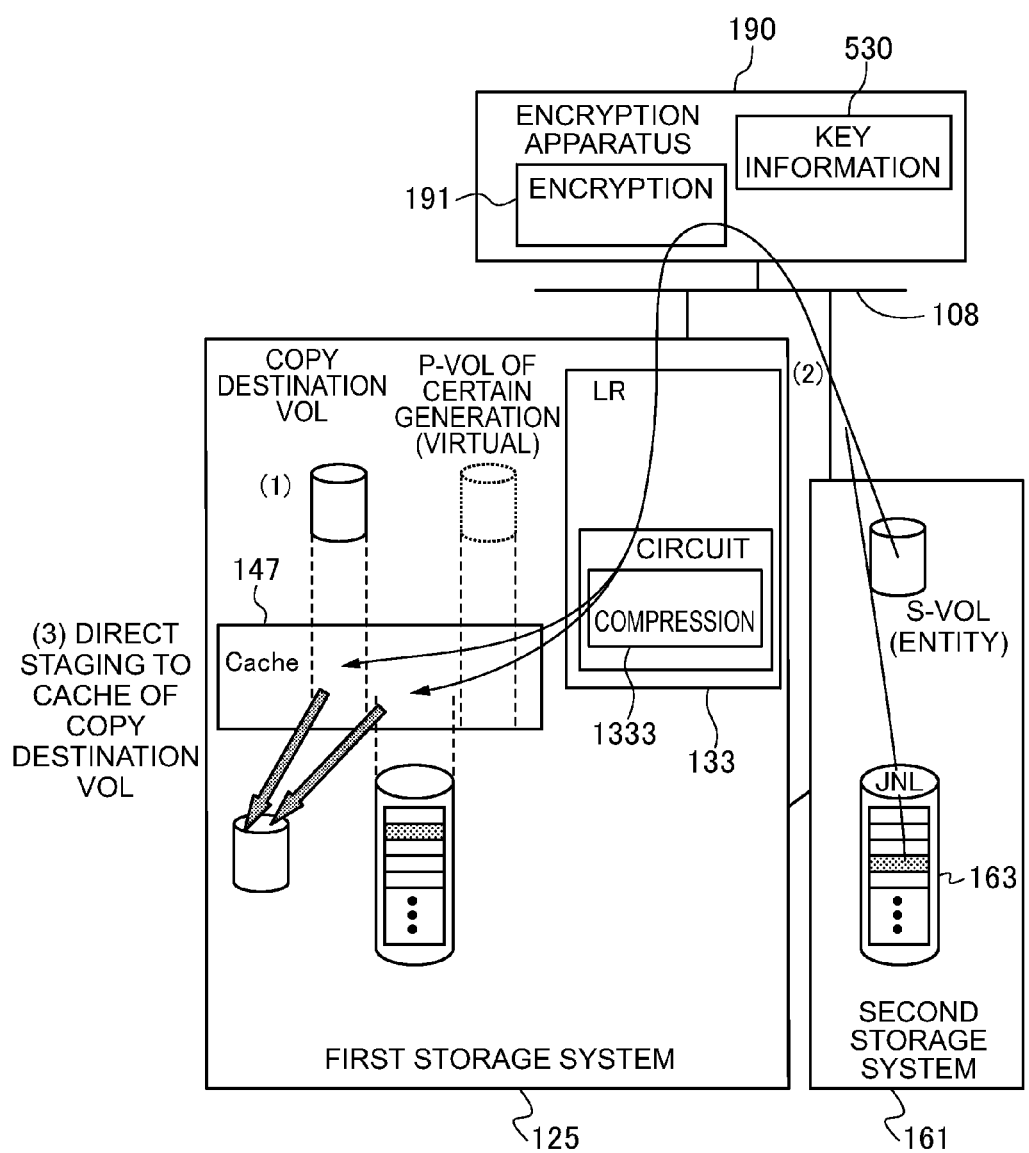
FIG. 39 is an explanatory diagram showing the restoration processing to be performed using the external encryption apparatus.

The restoration processing is now explained with reference to FIG. 39. In this embodiment, the data stored in the second storage system 161 is restored to the first storage system 125 via the encryption apparatus 190.

Foremost, upon allocating an area of the data restoration destination in the first storage system 125, the control processor 143 allocates an area for storing the journal data and a VOL of a certain generation (copy destination VOL capable of storing the online VOL (=P-VOL) worth of data at such point in time.

Subsequently, the control processor 143 decrypts the data of the S-VOL of a certain generation stored in the second storage system 161 as the data corresponding to the generation to be restored with the decryption circuit of the encryption apparatus 190, thereafter decompresses such data with the decompression circuit 1334 of the LR 133, and returns the decompressed S-VOL data to the cache memory 147. Here, the decompressed S-VOL data is returned to an area corresponding to the return destination VOL in the cache memory 147.

Moreover, the control processor 143 returns the journal after compression stored in the second storage system 161 to the encryption apparatus 190. The encryption apparatus 190 decrypts the journal after compression with the decryption circuit, and transfers the decrypted journal data to the LR 133. The LR 133 decompresses the decrypted journal data with the decompression circuit 1334, and thereafter transfers it to the cache memory 147. Here, the control processor 143 performs processing using an area corresponding to the return destination VOL among the areas in the cache memory 147.

Subsequently, the processor 143 recreates data of the VOL of the point in time that was requested by the user based on the data and journal data of the online VOL of a certain generation.

Incidentally, if the data acquired as the S-VOL is a snapshot, since there are cases where the data of the current P-VOL is referred to, the P-VOL is necessary. However, if a replica of the S-VOL is acquired, data of the P-VOL is not necessary. Specifically, if a replica of the S-VOL is acquired, it is possible to recreate the data of the VOL of a point in time that was requested by the user based on the data and journal data of the S-VOL.

According to this embodiment, it is possible to recreate the data of the VOL of a point in time that was requested by the user based on the data and journal data of the online VOL of a certain generation.

Figure 40:
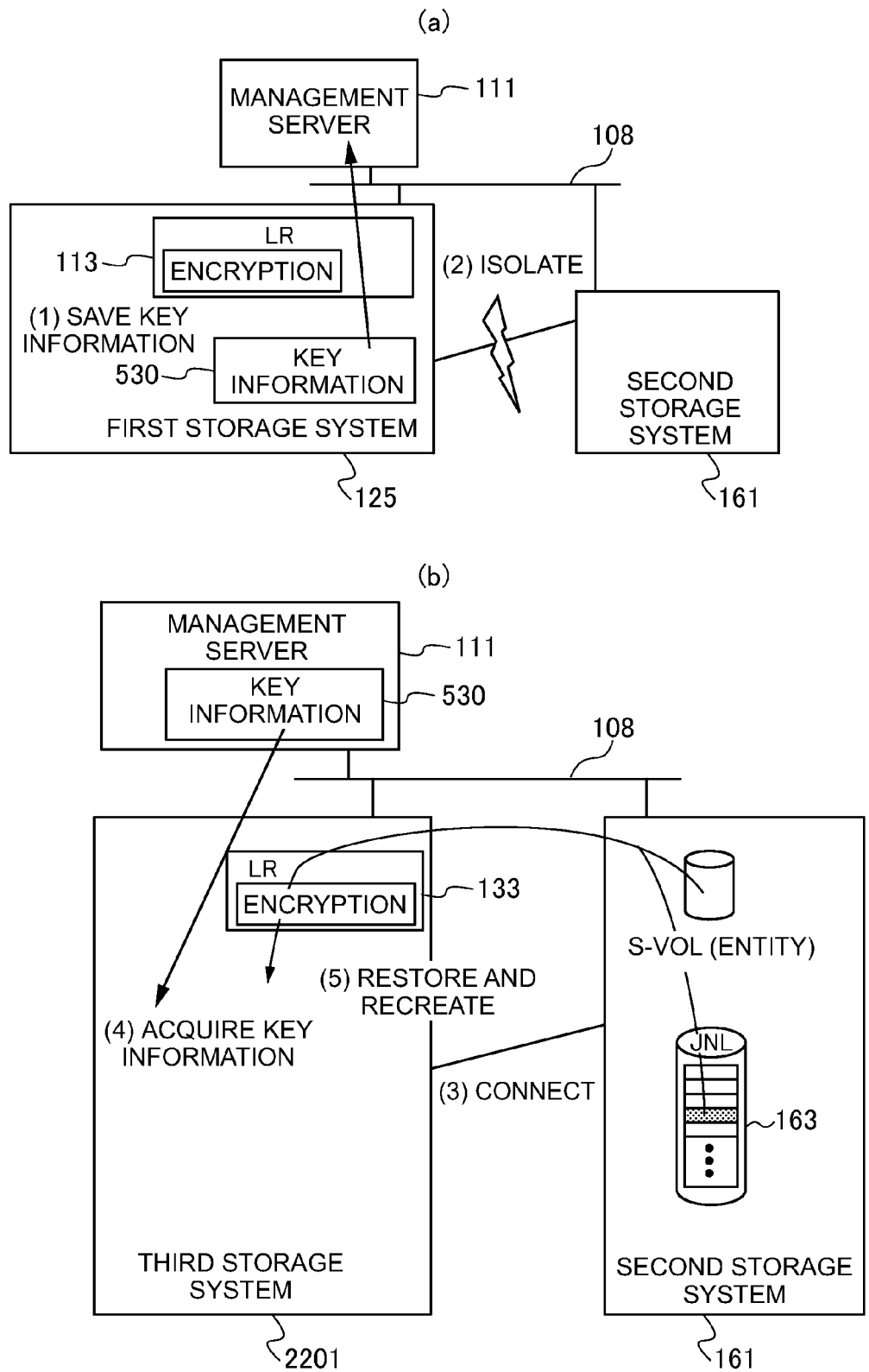
FIG. 40 is an explanatory diagram showing the processing for creating an online VOL and journal data after isolating the first storage system from the external storage.

The method of isolating the first storage system 125 from the second storage system 161, and thereafter creating the online VOL and the journal data is now explained with reference to FIG. 40.

In this embodiment, after saving the key information 530 containing the encryption key in the management server 111 without isolating the first storage system 125 from the second storage system 161, the third storage system 2201 is connected to the second storage system 161 after the first storage system 125 is isolated from the second storage system 161, and the online VOL and the journal data are created with the third storage system 2201 based on the key information 530.

Specifically, prior to isolating the first storage system 125 from the second storage system 161, as shown in FIG. 40A, the key information 530 is saved in the management server 111 via the LR 133. This processing may be performed by the management server 111 or the first storage system 125.

Subsequently, the first storage system 125 is isolated from the second storage system 161, and the first storage system 125 is replaced with the third storage system 2201 having the same functions as the first storage system 125.

Subsequently, as shown in FIG. 40B, the third storage system 2201 and the second storage system 161 are connected. Then, the control processor of the third storage system 2201 acquires the key information 530 from the save destination management server 111. The management server 111 thereafter performs setting processing to the third storage system 2201 so that the third storage system 2201 will be able to recognize the data in the second storage system 161.

Subsequently, the control processor of the third storage system 2201 imports the data of an old online VOL or old journal data stored in the second storage system 161 via the LR 133, and creates the online VOL data and journal data based on the imported data.

Incidentally, upon saving the key information 530 in the management server 111, such saving may be executed at the time of starting the encryption, before the timing of isolating the first storage system 125 from the second storage system 161, periodically, or at the time of updating the key information table as the trigger.

According to this embodiment, even when isolating the first storage system 125 from the second storage system 161 and thereafter connecting the third storage system 2201 to the second storage system 161, the third storage system 2201 is able to create the online VOL and journal data based on the key information 530.

Figure 41:
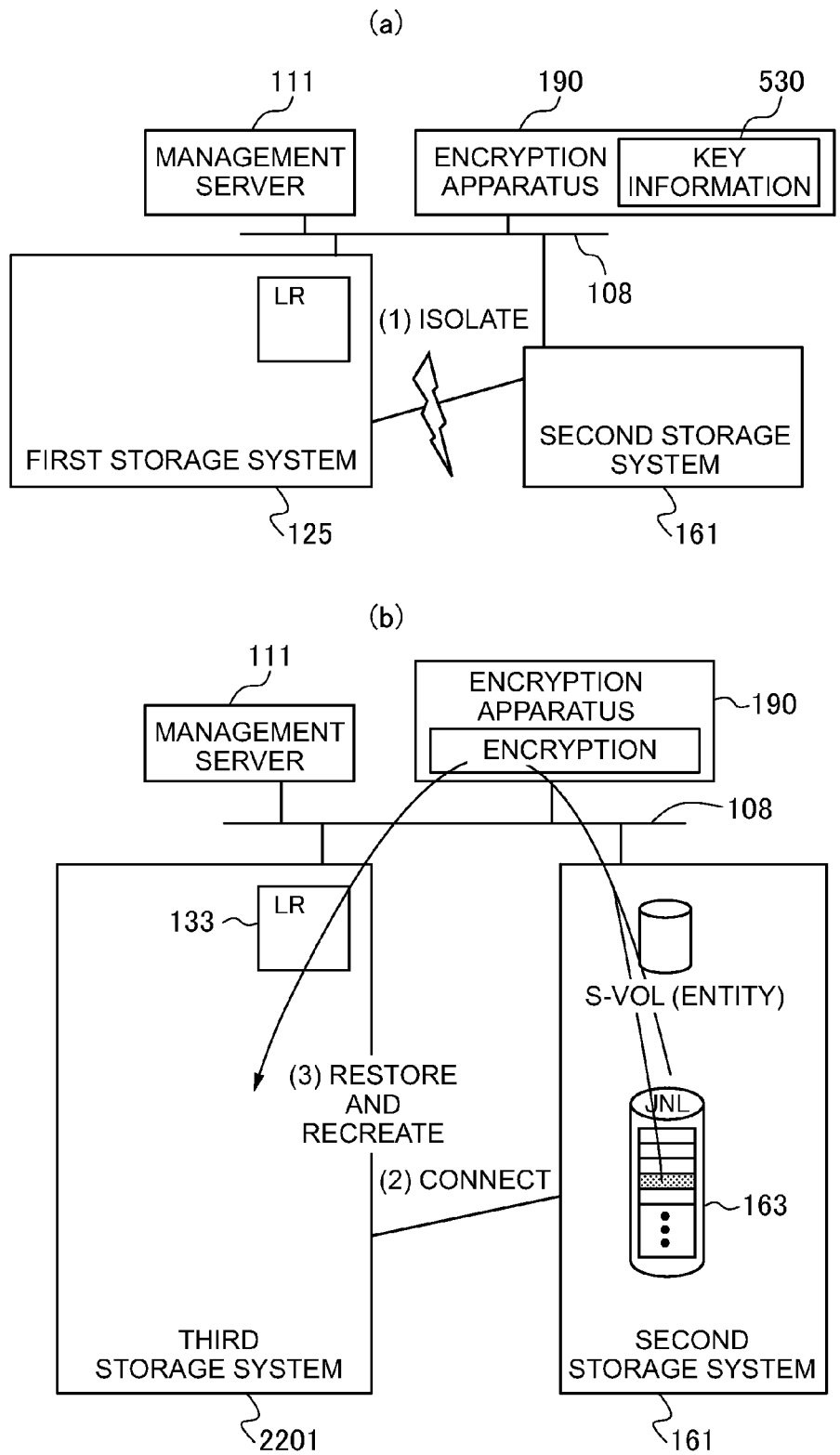
FIG. 41 is an explanatory diagram showing the processing for creating data using the external encryption apparatus after isolating the first storage system from the external storage.

Another processing method of creating the online VOL and journal data after isolating the first storage system 125 from the second storage system 161 is now explained with reference to FIG. 41.

In this embodiment, after isolating the first storage system 125 from the second storage system 161, in substitute for the first storage system 125, for example, the third storage system 2201 having the same functions as the first storage system 125 is used to return the data in the second storage system 161 to the third storage system 2201 via the encryption apparatus 190.

Specifically, as shown in FIG. 41A, the first storage system 125 and the second storage system 161 are isolated on the condition that catalog information showing which data of which generation is stored in the second storage system 161 has been stored in a location outside of the first storage system 125.

Subsequently, as shown in FIG. 41B, the third storage system 2201 is connected to the second storage system 161 in substitute for the first storage system 125. The control processor of the third storage system 2201 thereafter acquires the saved catalog information. Subsequently, the management server 11 performs setting processing so that the third storage system 2201 is able to recognize the data in the second storage system 161.

Subsequently, the control processor of the third storage system 2201 performs processing for importing the data of an old online VOL or old journal data stored in the second storage system 161, and creating the online VOL and journal data based on the catalog information.

According to this embodiment, after isolating the first storage system 125 from the second storage system 161, since the third storage system 2201 is used in substitute for the first storage system 125 to return the data in the second storage system 161 to the third storage system 2201 via the encryption apparatus 190, the third storage system 2201 is able to create the online VOL and journal data.

Figure 42:
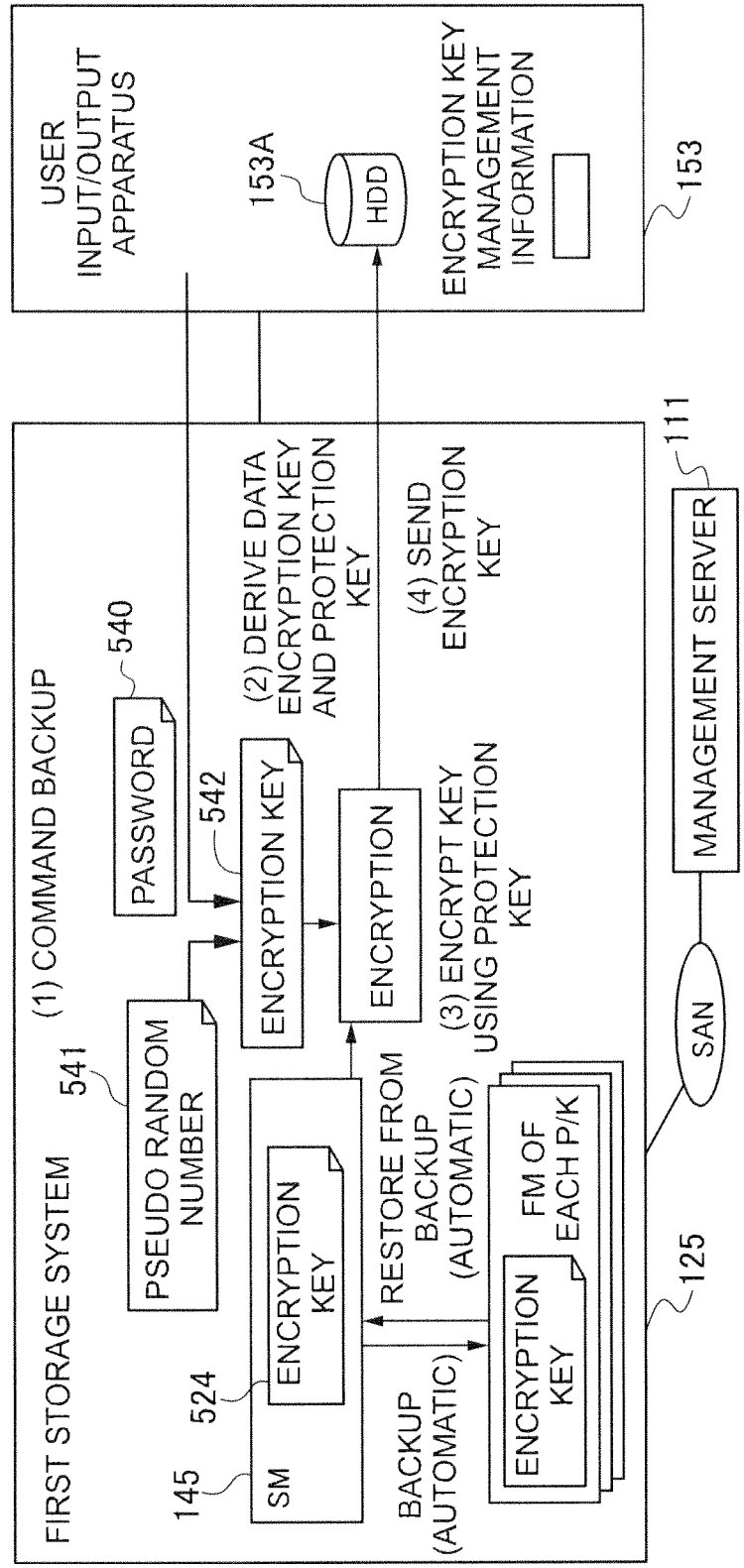
FIG. 42 is an explanatory diagram explaining the key information management method and shows the processing for saving key information outside the first storage system.

The key information management method is now explained with reference to FIG. 42 and FIG. 43.

In this embodiment, in a case where the key information 530 retained in the first storage system 125 is lost, the key information 530 is backed up outside of the first storage system 125 in order to recover the data. As another objective, even if the second storage system 161 is isolated from the first storage system 125, the key information is managed so that the data in the second storage system 161 can be restored in other storage systems.

In this processing, the key information 530 is stored in the HDD of the user input/output apparatus 153 based on the operation of the user input/output apparatus 153 with the replacement of the first storage system 125 as the trigger. Incidentally, the management server 111 may also be used as the storage destination of the key information 530.

Foremost, when encrypting data with the first storage system 125, the authority to implement the backup of data is set so that a user having a security authority that is higher than a certain level, for instance, a setting level is only able to perform such backup.

Foremost, the user input/output apparatus 153 sends, as a backup command, a password 540 for data encryption key/ protection key derivation to the first storage system 125.

When the first storage system 125 receives the password 540, it derives the data encryption key/protection key 542 from the password 540 and a pseudo random number 541. Here, the encryption key 524 stored in the control memory 145 is encrypted with a fixed key. Thus, the control processor 143 once decrypts the encryption key 524, re-encrypts the decrypted encryption key 524 with the data encryption key/protection key 542, creates the encryption key 524, and outputs the encrypted encryption key 524 and the key attribute information to the user input/output apparatus 153. Consequently, the encrypted encryption key 524 and the key attribute information will be stored in the HDD 153A of the user input/output apparatus 153.

Upon outputting the encryption key 524 to the user input/output apparatus 153, it can be set in online VOL (P-VOL) units. Moreover, the encryption key 524 may be stored in the control memory 145, and it may also be backed up to another storage area such as in the flash memory (FM) of the package.

The processing of restoring the encryption key 524 to the first storage system 125 using the key information backed up in the user input/output apparatus 153 in a case where the fixed key conversion encryption key 524 stored in the first storage system 125 could not be acquired from the storage destination, or when the second storage system 161 is isolated from the first storage system 125 is now explained.

Figure 43:
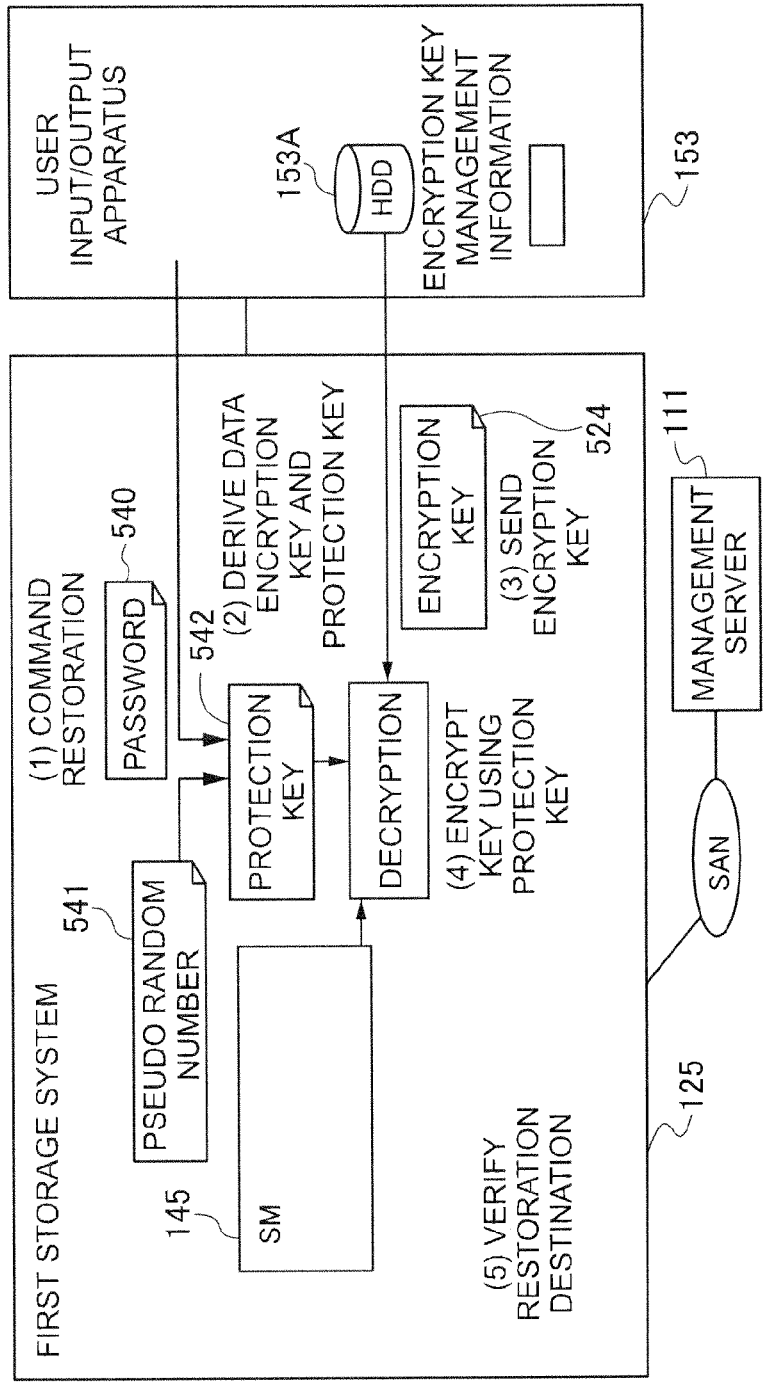
FIG. 43 is an explanatory diagram explaining the key information management method and shows the processing for restoring the encryption key to the first storage system using the user input/output apparatus.

Specifically, when the first storage system 125 needs to restore the encryption key 524, as shown in FIG. 43, the user uses the user input/output apparatus 153 to issue a restoration command of the encryption key 524. Here, the authority allowed to issue the restoration command shall be the same level of authority as the backup authority. Then, the storage administrator uses the user input/output apparatus 153 and sends the backup file and the password 540 that was designated at the time of backup to the first storage system 125.

The control processor 143 of the first storage system 125 uses the password 540 and the pseudo random number 541 to derive the data encryption key/protection key 542. Moreover, the control processor 143 imports the encryption key 524 stored in the HDD 153A of the user input/output apparatus 153, and uses the imported encryption key 524 to decrypt the data encryption key/protection key 542 and then decrypt the encryption key 524.

Subsequently, the control processor 143 restores the decrypted encryption key 524 to the control memory 145.

Here, in order to prevent the encryption key 524 from being restored erroneously to an apparatus that is different from the backed up apparatus, the control processor 143 checks whether the apparatus number stored in the backup information and the apparatus number of the apparatus to execute the restoration coincide. Then, the control processor 143 performs the restoration processing if the apparatus numbers coincide, and discontinue the restoration processing if the apparatus numbers do not coincide. However, in consideration of the recovery based on apparatus replacement, an operation of the maintenance worker may be used to perform restoration processing in a forced mode without conducting the apparatus number check.

According to this embodiment, the encryption key 524 can be restored to the first storage system 125 by using the key information backed up in the user input/output apparatus 153 even in a case where the fixed key conversion encryption key 524 stored in the first storage system 125 could not be acquired from the storage destination, or even when the second storage system 161 is isolated from the first storage system 125.

Figure 44:
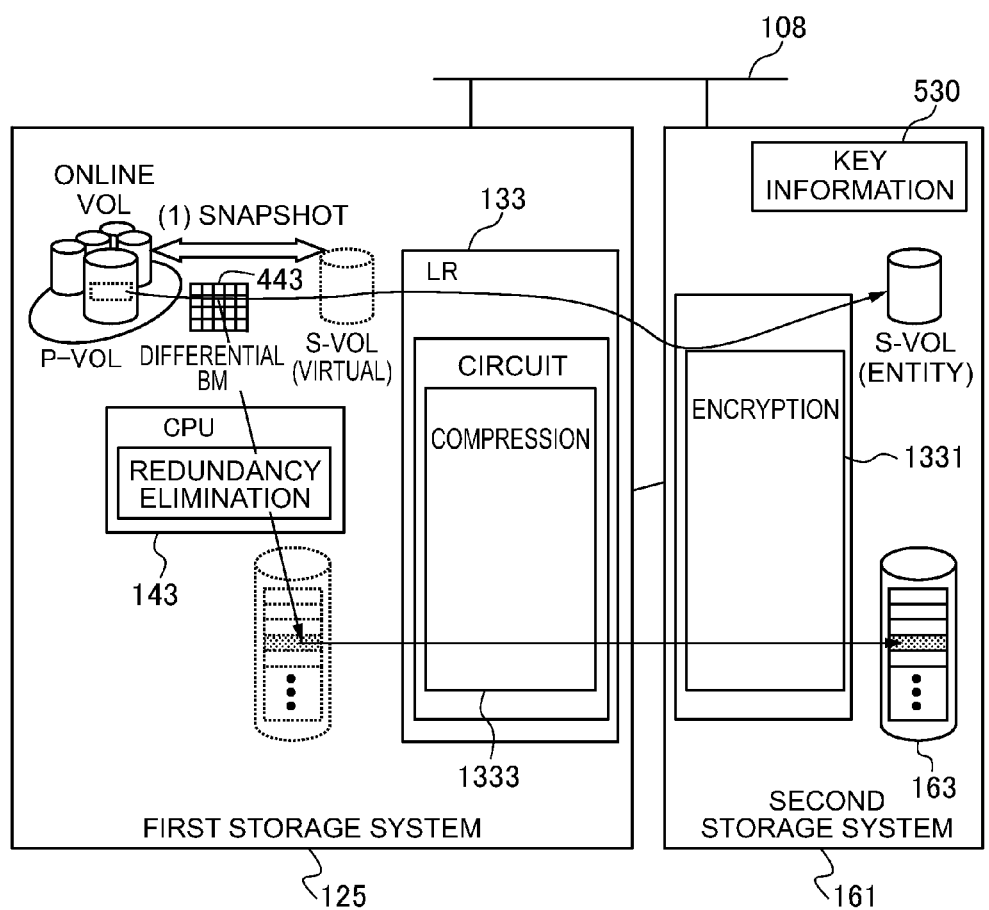
FIG. 44 is an explanatory diagram showing the processing for compressing data with the first storage system and encrypting data with the second storage system.
Figure 45:
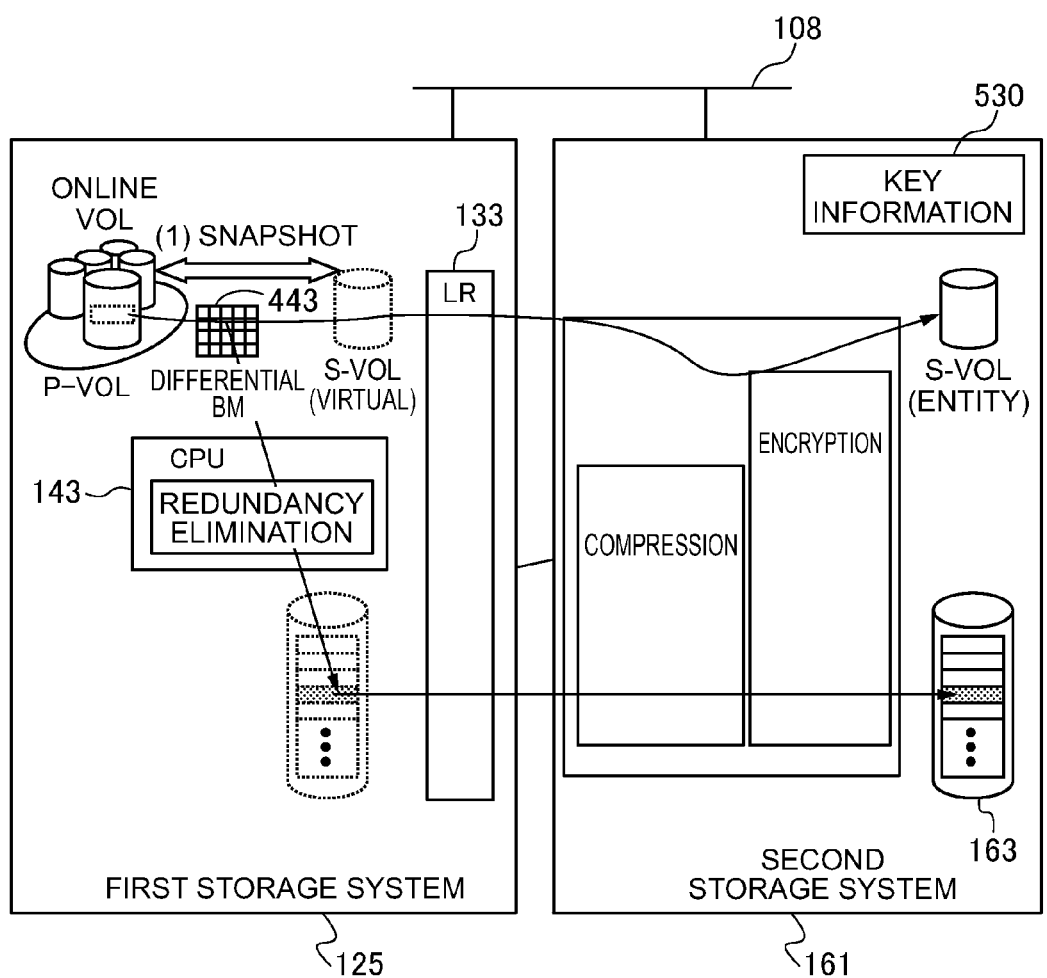
FIG. 45 is an explanatory diagram showing the processing for compressing and encrypting data with the second storage system.
Figure 46:
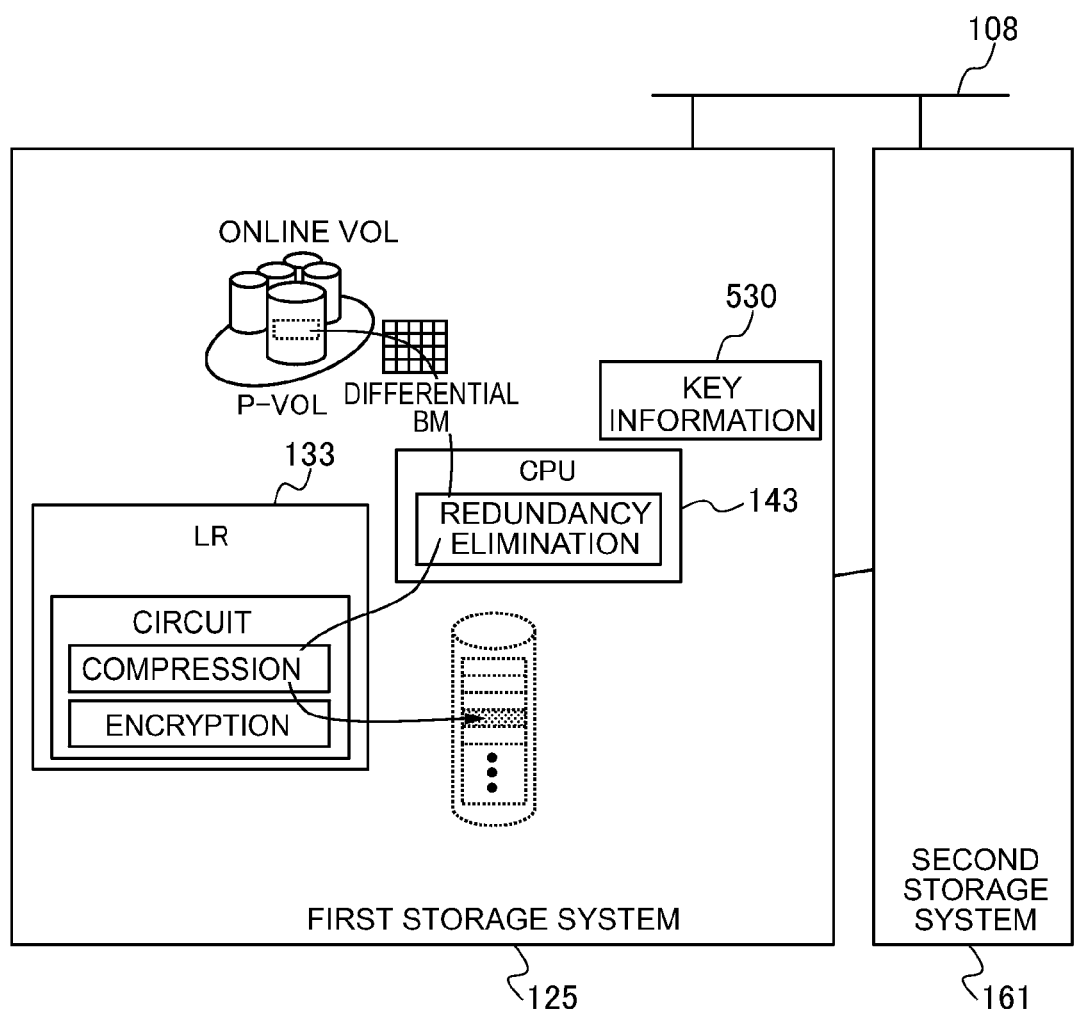
FIG. 46 is an explanatory diagram showing the processing for compressing and encrypting data with the first storage system and storing such data in the first storage system.

Moreover, when compressing and encrypting data, as shown in FIG. 44, the data may be compressed with the first storage system 125 and then the data may be encrypted with the second storage system 161. Moreover, as shown in FIG. 45, upon compressing and encrypting data, the data compression/encryption processing may be performed with the second storage system 161 without performing such data compression/encryption processing with the first storage system 125. Moreover, as shown in FIG. 46, upon performing the data compression/encryption processing, the configuration may be such that the data compression/encryption processing is performed with the first storage system 125, and the data that was encrypted after compression is stored in the first storage system 125.

Figure 47:
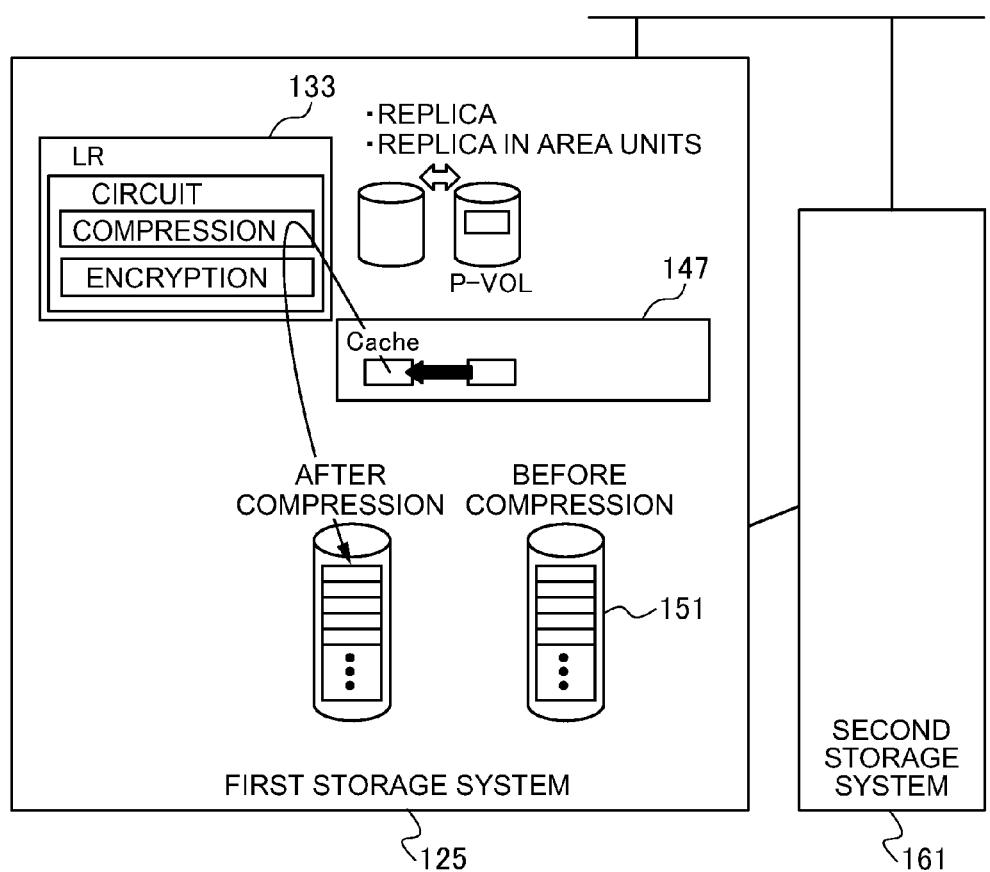
FIG. 47 is an explanatory diagram showing the processing for compressing and encrypting replicated data.

A case of compressing and encrypting data of replications in volume units and area units is now explained with reference to FIG. 47.

Upon compressing and encrypting data of replications in volume units and area units, after compressing the data that was copied to the cache memory 147 with the LR 133, such data is encrypted, and the data that was encrypted after compression is stored in the physical storage device 151. Here, the S-VOL is a real VOL in relation to the online VOL (P-VOL).

Figure 48:
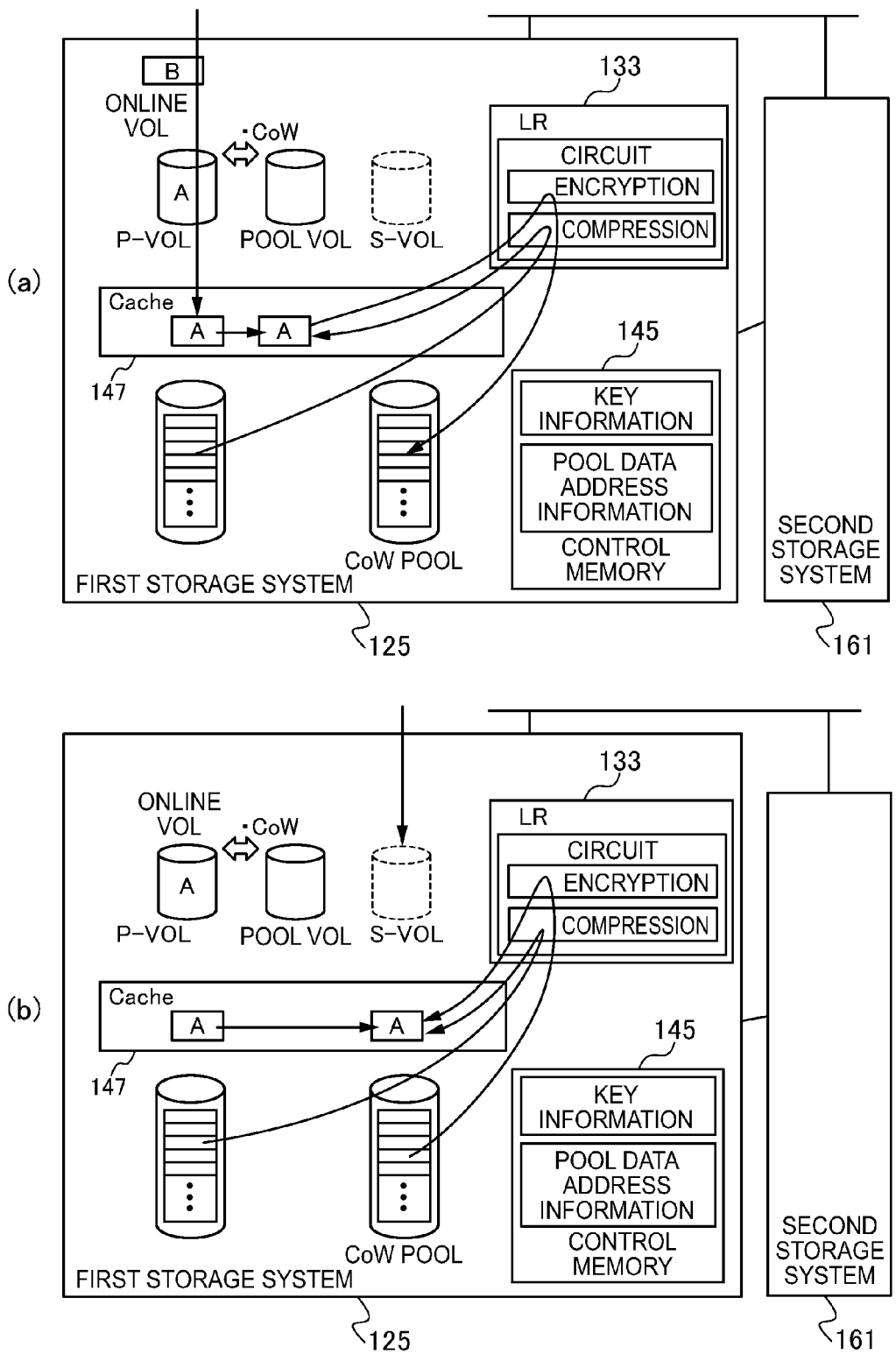
FIG. 48 is an explanatory diagram explaining the data compression/encryption processing to be performed during the Copy on Write.

An example of compressing and encrypting data during the course of Copy On Write is shown in FIG. 48. The COW operation is carried out when the host computer 101 is able to recognize the P-VOL and S-VOL (virtual VOL) of the first storage system 125.

For example, as shown in FIG. 48A, if the control processor 143 receives a write request for writing data into the P-VOL that was issued from the host computer 101 to the first storage system 125, it determines whether the write location is a location where data has previously been saved in a pool. If it is determined that the write location has not been saved in the pool, the control processor 143 allocates a pool area. The control processor 143 thereafter determines whether it is a cache hit, and, if it is a cache hit, copies data in the cache memory 147. If it is a cache miss, the control processor 143 reads the data from the disk device of the P-VOL into the cache area of the pool VOL. Existing data is saved to the pool area as described above.

Once the data is saved, the control processor 143 stores the write data in the disk device of the P-VOL, and stores the cache data of the pool VOL in the disk device of the pool VOL. Upon storing the data in a disk device, the control processor 143 compresses and then encrypts the data of the pool VOL on the one hand, and only compresses the data of the online VOL on the other hand.

Subsequently, upon receiving a read request from the host computer 101 for reading data from the S-VOL, as shown in FIG. 48B, the control processor 143 determines whether the read location is a location where data has already been saved in the pool. Here, since the S-VOL is a virtual VOL, the real data is stored in the P-VOL or the pool VOL. Thus, the control processor 143 searches to find which VOL is storing the data subject to the read request. If the P-VOL is storing the read-target data, the control processor 143 copies the data from the disk device area of the P-VOL, and, if the pool VOL is stored in the data, copies the data from the pool VOL.

The control processor 143 thereafter determines whether there is a hit in the cache memory 147, and, if there is a cache hit, copies data between caches in the cache memory 147, and, if it is a cache miss, reads data from the disk device of the P-VOL to the cache area of the pool VOL. Subsequently, the control processor 143 transfers the data designated in the read request as read data to the host computer 101.

Figure 49:
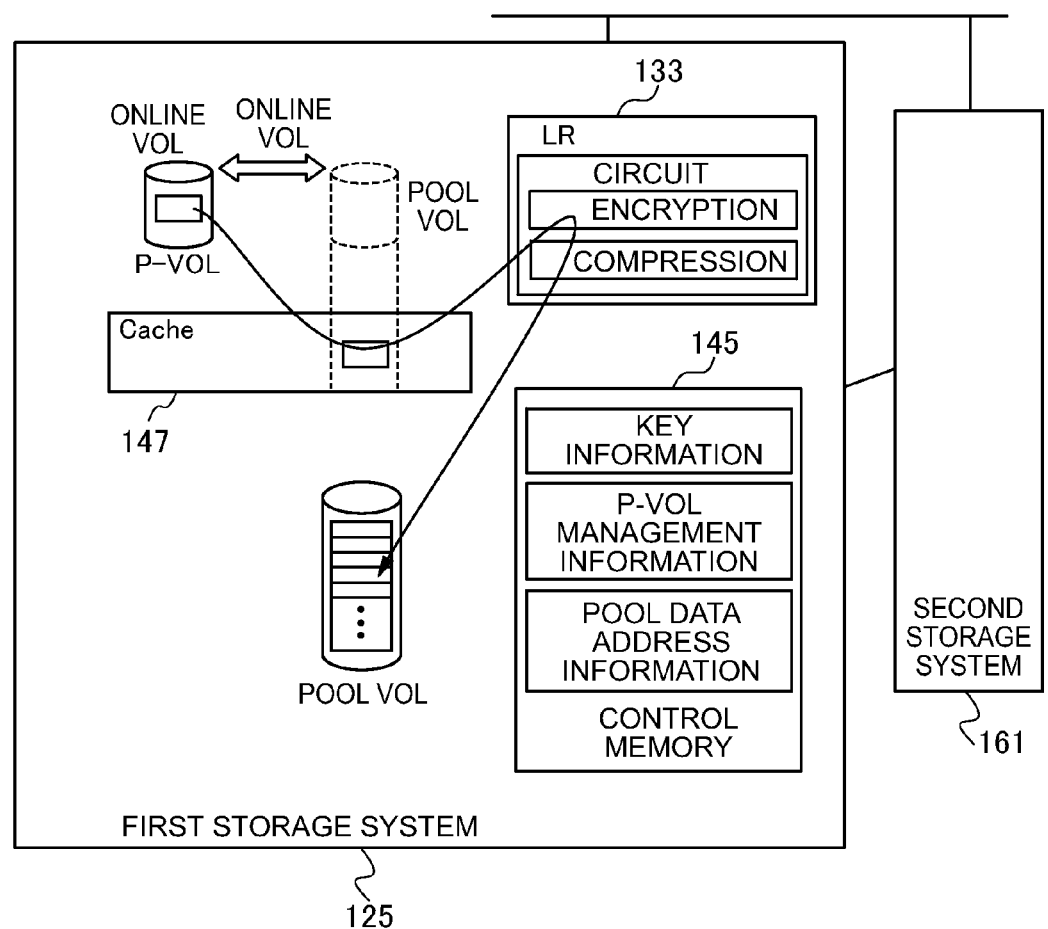
FIG. 49 is an explanatory diagram explaining the processing for compressing and encrypting data using the thin provisioning technology.

FIG. 49 shows a case where the P-VOL is thin provisioning. Thin provisioning is generally based on the premise of the thin provisioning technology, and in this example, a case of compressing and encrypting data is explained.

Figure 50:
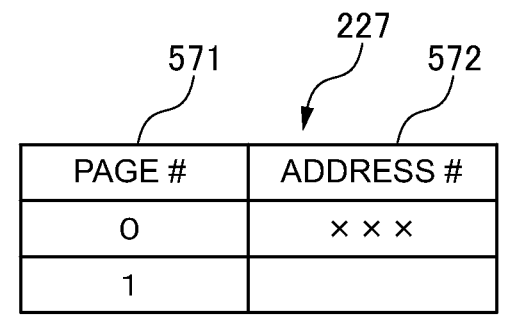

Upon storing the data of the P-VOL in the pool VOL, the control processor 143 directly writes the data of the P-VOL into an area corresponding to the pool VOL among the areas of the cache memory 147, compresses the data of the P-VOL that was written into the cache memory 147 with the LR 133, thereafter encrypts such data, and then stores the data that was encrypted after compression in the thin provisioning pool VOL. Here, as shown in FIG. 50, the control processor 143 performs processing for updating the mapping destination of the P-VOL management information table 227.

The P-VOL management information table 227 is configured from a page #571 and an address #572. The P-VOL management information table 227 stores, for each page number 571 of the P-VOL, the location where the data is actually stored; that is, the address of the area in that pool (address showing where in which pool VOL).

The second embodiment of the present invention is now explained.

Figure 51:
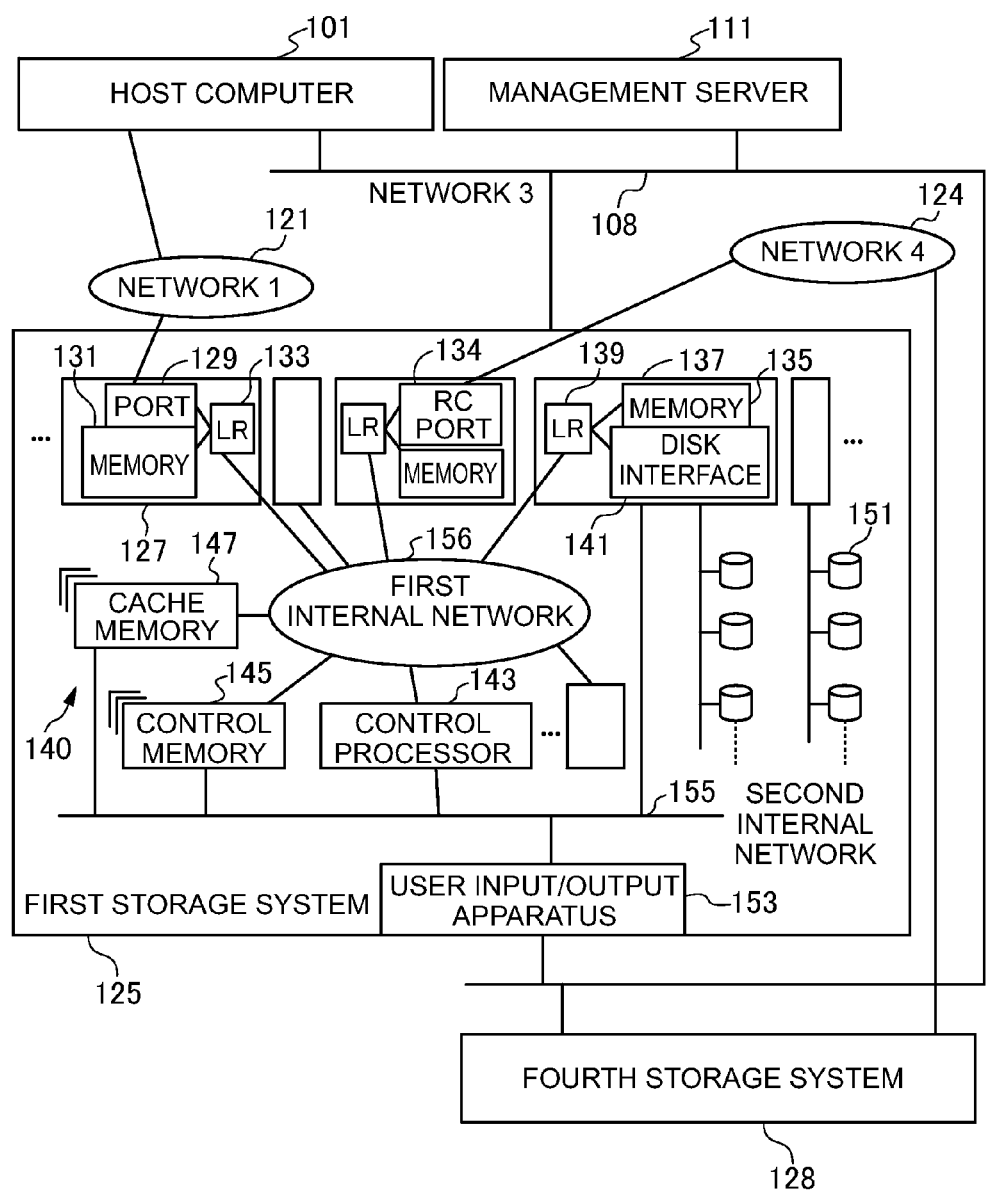
FIG. 51 is a block diagram showing the configuration of a computer system according to the second embodiment of the present invention.

FIG. 51 is a block diagram showing the configuration of a computer system according to the second embodiment of the present invention.

The computer system of the second embodiment is the same as the computer system of the first embodiment excluding the following points; namely, the second storage system 161 is replaced by a fourth storage system 128, the first storage system 125 comprises a remote copy (RC) port 134, and the first storage system 125 and the fourth storage system 128 are connected via a fourth network 124.

The fourth storage system 128 is a storage system comprising the configuration and functions that are equivalent to the first storage system 125. The RC port 134 of the first storage system 125 is connected to an RC port (not shown) of the fourth storage system 128 via the fourth network 124.

The first storage system 125 and the fourth storage system 128 of this embodiment comprise a so-called remote copy function. Specifically, the logical volume in the first storage system 125 and the logical volume in the fourth storage system 128 can be configured as a copy pair. When data is written into the logical volume of the first storage system 125 belonging to a copy pair, that data is copied to the logical volume in the fourth storage system 128 belonging to that copy pair. Consequently, the same data is stored in two logical volumes belonging to one copy pair.

Even in a computer including a storage system comprising the foregoing remote copy function, by treating the fourth storage system 128 as the external storage system of the first embodiment, the same migration and restoration of the journal data as the first embodiment can be realized.

Moreover, if remote copy is executed between the first storage system 125 and the fourth storage system 128, the fourth storage system 128 also retains the catalog management information 311. Thus, when the fourth storage system 128 is isolated from the first storage system 125, the isolation processing shown in FIG. 19A can be executed. In the foregoing case, the second storage system 161 of FIG. 19A is replaced by the fourth storage system 128.

In each of the embodiments described above, although a case was explained where the journal data is compressed and then encrypted, and the journal data that was encrypted after compression is stored in the second storage system 161, the configuration may also be such as that journal data as backup data is sent from the first storage system 125 to the second storage system 161, the journal data is compressed and encrypted in the second storage system 161, and the journal data that was encrypted after compression is stored in the second storage system 161. Even with this configuration, the capacity of the journal data to be stored in the second storage system 161 can be reduced.

EXPLANATION OF REFERENCE NUMERALS

101 Host Computer
111 Management Server
125 First Storage System
140 First Controller
161 Second Storage System
165 Second Controller
187 P-VOL
188 Journal-related Area
221 Device Configuration Information Table
222 Logical Unit Information Table
223 P-VOL Configuration Information Table
224 Journal Information Table
225 P-VOL/Journal Pair Information Table
231 Journal Information Table
232 Journal Control Information Table
233 Journal Data
311 Catalog Management Information Table
443 Differential BM
451 Journal Data Element
2201 Third Storage System

The invention claimed is:

1. A computer system, comprising:
a first storage system connected to a network; and
a second storage system connected to the first storage system;
wherein the first storage system includes a first physical storage device configured to store data and a first controller configured to manage a storage area of the first physical storage device as a plurality of logical volumes, including a first logical volume and a second logical volume, and to control writing and reading of data into and from the first physical storage device,
wherein the second storage system includes a second physical storage device configured to store data and a second controller configured to manage a storage area of the second physical storage device as a plurality of logical volumes, including a third logical volume and a fourth logical volume, and to control writing and reading of data into and from the second physical storage device,
wherein the first controller is configured to manage a first virtualized logical volume virtualized in correspondence with the third logical volume, and a second virtualized logical volume virtualized in correspondence with the fourth logical volume,
wherein the first logical volume is configured to store data that are designated in an access request from a host computer connected to the network, the second logical volume is configured to store journal data related to the first logical volume, including first differential data as a differential of data that are stored in the first logical volume at a first time as a first generation of a plurality of generations and data that are stored in the first logical volume at a second time that is later than the first time as a second generation of the plurality of generations,
wherein the first controller is configured to perform de-duplication process on the journal data stored in the second logical volume by eliminating same journal data included over the plurality of generations, and to send the de-duplicated journal data as backup data to the second storage system, wherein the second controller is configured to store the de-duplicated journal data in the third logical volume, as pre-compression journal data, wherein the second controller is configured to send the pre-compression journal data to the first storage system, wherein, upon subsequently receiving the pre-compression journal data from the second storage system, the first controller is configured to compress the pre-compression journal data and to encrypt the compressed journal data thereafter, wherein the first controller is configured to send the encrypted journal data encrypted after the compression to the second storage system, and wherein, upon receiving the encrypted journal data from the first storage system, the second controller is configured to store the encrypted journal data in the fourth logical volume, as post-compression journal data.

2. The computer system according to claim 1, wherein the first controller is configured to perform de-duplication, compress, and encrypt the journal data, and send the journal data that are encrypted after compression and de-duplication as backup data to the second storage system; and wherein, upon receiving the backup data from the first storage system, the second controller is configured to store the backup data in the third logical volume.

3. The computer system according to claim 1, wherein the first controller is configured to perform de-duplication on the journal data, to encrypt the de-duplicated journal data, and to send the encrypted journal data to the second storage system, wherein, upon receiving the encrypted journal data from the first storage system, the second controller is configured to store once the encrypted journal data in the fourth logical volume that is different from the third logical volume, thereafter to send the encrypted journal data stored in the fourth logical volume to the first storage system, wherein, upon subsequently receiving the encrypted journal data from the second storage system, the first controller is configured to decrypt the received data, to compress the decrypted data, to encrypt the compressed data, and to send the encrypted data that are encrypted after compression to the second storage system, and wherein, upon receiving the encrypted data that are encrypted after compression from the first storage system, the second controller is configured to store the received data in the third logical volume.

4. The computer system according to claim 1 further comprising an external apparatus configured to connect the first storage system and the second storage system and transfer data to and from the first storage system and the second storage system;

wherein the first controller is configured to send the backup data to the second storage system, and, upon subsequently receiving the backup data from the second storage system, compress the received data, and send the compressed data to the external apparatus;

wherein, upon receiving the compressed data from the first storage system, the external apparatus is configured to encrypt the received data and send the data that are encrypted after compression to the second storage system; and wherein, upon receiving the backup data from the first storage system, the second controller is configured to store once the backup data in the third logical volume, thereafter send the backup data stored in the third logical volume to the first storage system, and upon receiving the data that are encrypted after compression from the first storage system, store the received data in the third logical volume.

5. The computer system according to claim 1 further comprising an external apparatus configured to connect the first storage system and the second storage system and transfer data to and from the first storage system and the second storage system;

wherein the first controller is configured to perform de-duplication, to compress, and to send the compressed backup data to the external apparatus;

wherein, upon receiving the compressed backup data from the first storage system, the external apparatus is configured to encrypt the received data and send the backup data that are encrypted after compression to the second storage system; and wherein, upon receiving the data that are encrypted after compression from the external apparatus, the second controller is configured to store the received data in the third logical volume.

6. The computer system according to claim 1 further comprising an external apparatus configured to connect the first storage system and the second storage system and transfer data to and from the first storage system and the second storage system;

wherein the first controller is configured to send the backup data to the external apparatus, and, upon subsequently receiving decrypted backup data from the external apparatus, compress the received backup data, and send the compressed backup data to the external apparatus;

wherein, upon receiving the backup data from the first storage system, the external apparatus is configured to encrypt the received backup data, send the encrypted backup data to the second storage system, and, upon subsequently receiving data that are encrypted before compression from the second storage system, decrypt the received data, send the decrypted data to the first storage system, and, upon subsequently receiving the compressed data from the first storage system, encrypt the received data, and send the data that are encrypted after compression to the second storage system;

and wherein, upon receiving the data that are encrypted before compression from the first storage system, the second controller is configured to store once the data that are encrypted before compression in a fourth logical volume that is different from the third logical volume, thereafter send the data that are encrypted before compression stored in the fourth logical volume to the external apparatus, and upon receiving the data that are encrypted after compression from the external apparatus, store the received data in the third logical volume.

7. The computer system according to claim 1, wherein the first controller is configured to save key information for decrypting data stored in the third logical volume in a save destination that is different from the first storage system before a third storage system is connected to the second storage system in substitute for the first storage system;

wherein, upon being connected to the second storage system, the third storage system is configured to acquire the data stored the third logical volume from the second storage system, acquire the key information from the save destination, and create data that are stored in the first storage system based on the acquired key information and the acquired data.

8. The computer system according to claim 1 further comprising an external apparatus configured to connect the first storage system and the second storage system and transfer data to and from the first storage system and the second storage system;

wherein the first controller is configured to save key information for decrypting data stored in the third logical volume in the external apparatus before a third storage system is connected to the second storage system in substitute for the first storage system;

wherein, when the third storage system is connected to the second storage system, the external apparatus is configured to acquire the data stored the third logical volume from the second storage system, decrypt the acquired data according to the key information, and send the decrypted data to the third storage system; and wherein, upon receiving the decrypted data from the external apparatus, the third storage system is configured to create data that are stored in the first storage system based on the received data.

* * * * *